US009364115B2

(12) United States Patent
Remo et al.

(10) Patent No.: US 9,364,115 B2
(45) Date of Patent: Jun. 14, 2016

(54) BREWING UNIT FOR PREPARATION OF BEVERAGES, AND MACHINE COMPRISING SAID BREWING UNIT

(75) Inventors: Gianni Remo, Pistoia (IT); Giuseppe Fin, Venezia (IT); Roland Kalin, Einsiedel (IT)

(73) Assignee: KONINKLIJKE PHILIPS N.V., Eindhoven (NL)

(*) Notice: Subject to any disclaimer, the term of this patent is extended or adjusted under 35 U.S.C. 154(b) by 1705 days.

(21) Appl. No.: 12/671,937

(22) PCT Filed: Jul. 1, 2008

(86) PCT No.: PCT/IT2008/000445
§ 371 (c)(1),
(2), (4) Date: Nov. 9, 2011

(87) PCT Pub. No.: WO2009/022364
PCT Pub. Date: Feb. 19, 2009

(65) Prior Publication Data
US 2012/0055343 A1    Mar. 8, 2012

(30) Foreign Application Priority Data
Aug. 10, 2007 (IT) .................. FI2007A0188

(51) Int. Cl.
*A47J 31/44* (2006.01)
*A47J 31/36* (2006.01)

(52) U.S. Cl.
CPC .......... *A47J 31/3614* (2013.01); *A47J 31/3619* (2013.01); *A47J 31/3633* (2013.01); *A47J 31/3638* (2013.01)

(58) Field of Classification Search
CPC .............. A47J 31/3614; A47J 31/3619; A47J 31/3633; A47J 31/3638; A47J 31/20
USPC ....... 219/289 P, 289 R; 99/289 P, 289 R, 287, 99/290, 302 P, 302 R, 318, 323, 279, 289 D
See application file for complete search history.

(56) References Cited

U.S. PATENT DOCUMENTS

| 4,681,028 | A | 7/1987 | Schmed et al. |
| 5,259,296 | A | 11/1993 | Mikael et al. |
| 5,551,988 | A | 9/1996 | Reyhanloo et al. |
| 6,101,923 | A | 8/2000 | Karg et al. |
| 6,382,083 | B2 | 5/2002 | Schmed |
| 6,779,436 | B2 | 8/2004 | Guindulain Vidondo |

(Continued)

FOREIGN PATENT DOCUMENTS

| EP | 0380450 A2 | 8/1990 |
| EP | 0486433 A1 | 5/1992 |

(Continued)

Primary Examiner — Dana Ross
Assistant Examiner — James Sims, III

(57) ABSTRACT

A brewing unit includes a seat capable of a rotation movement, in which a piston is slidably received. A counter-piston co-operates with the seat and the piston to define a brewing chamber. Moreover, cam members are provided to control movements of the seat, the piston, and the counter-piston. The seat, the piston and the counter-piston can assume with respect to one another at least one position of charging of a product for preparation of the beverage, at least two distinct brewing positions which correspond two different volumes of the brewing chamber, and a position for discharging the spent product.

40 Claims, 35 Drawing Sheets

(56) References Cited

U.S. PATENT DOCUMENTS

| | | |
|---|---|---|
| 6,807,898 B2 | 10/2004 | De Koning et al. |
| 7,024,985 B2 * | 4/2006 | Park ............................. 99/302 P |
| 7,571,674 B2 * | 8/2009 | Wang ........................... 99/302 P |
| 2005/0139080 A1 * | 6/2005 | De'Longhi ..................... 99/275 |
| 2005/0193891 A1 | 9/2005 | Garson et al. |

FOREIGN PATENT DOCUMENTS

| | | |
|---|---|---|
| EP | 0937432 A1 | 8/1999 |
| EP | 1459663 A1 | 9/2004 |
| ES | 2156668 A1 | 7/2001 |
| FR | 2663216 A1 | 12/1991 |
| WO | 2007060694 A1 | 5/2007 |

* cited by examiner

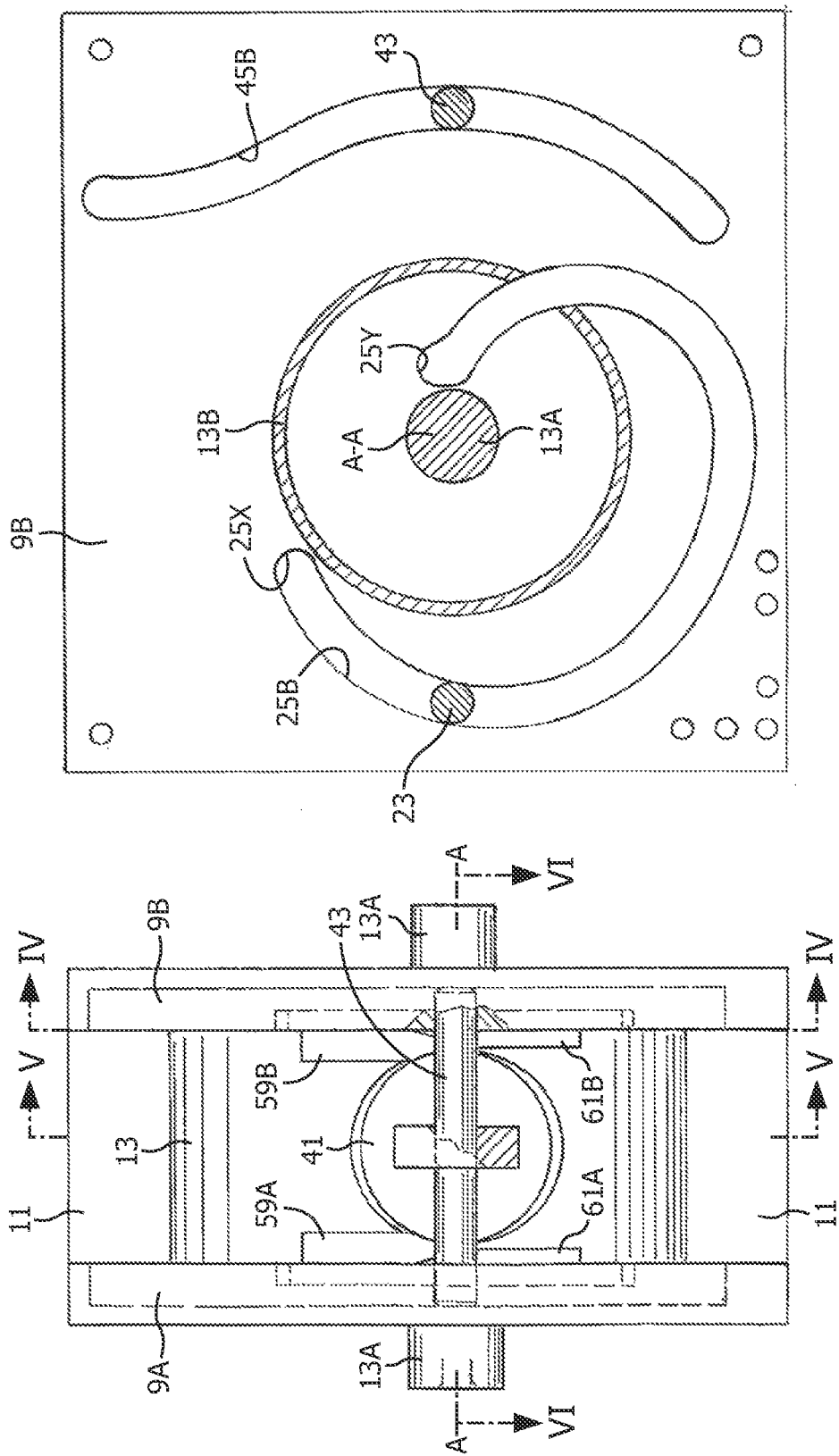

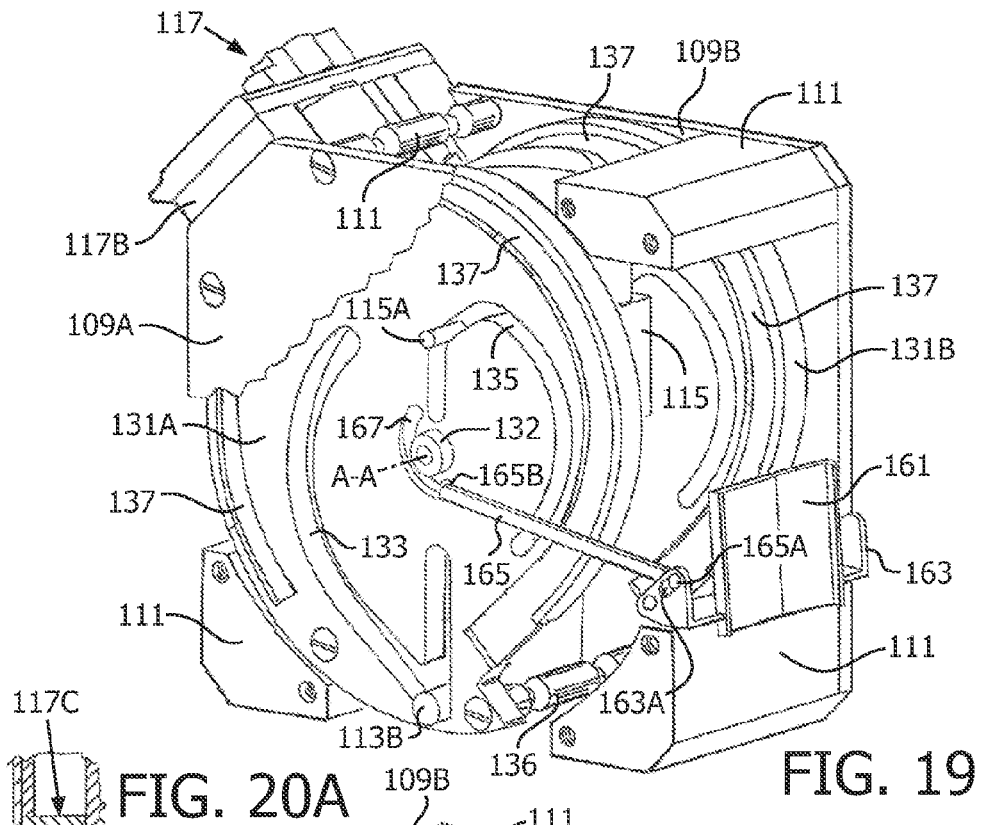
FIG. 20A
FIG. 19
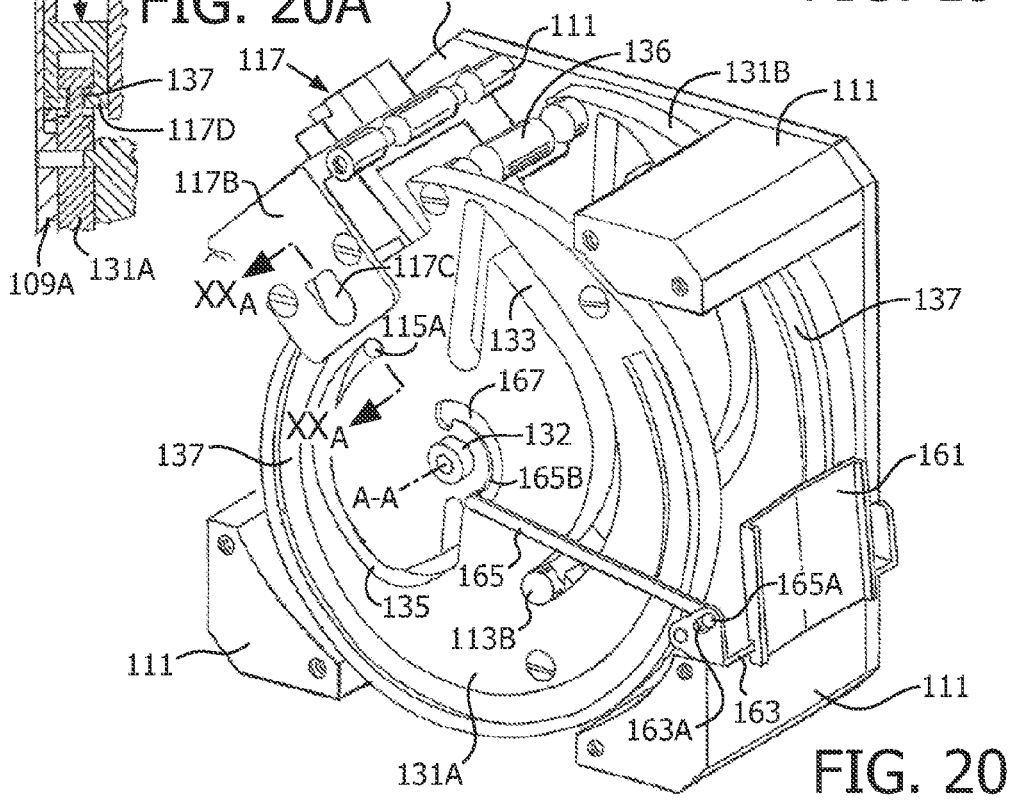
FIG. 20

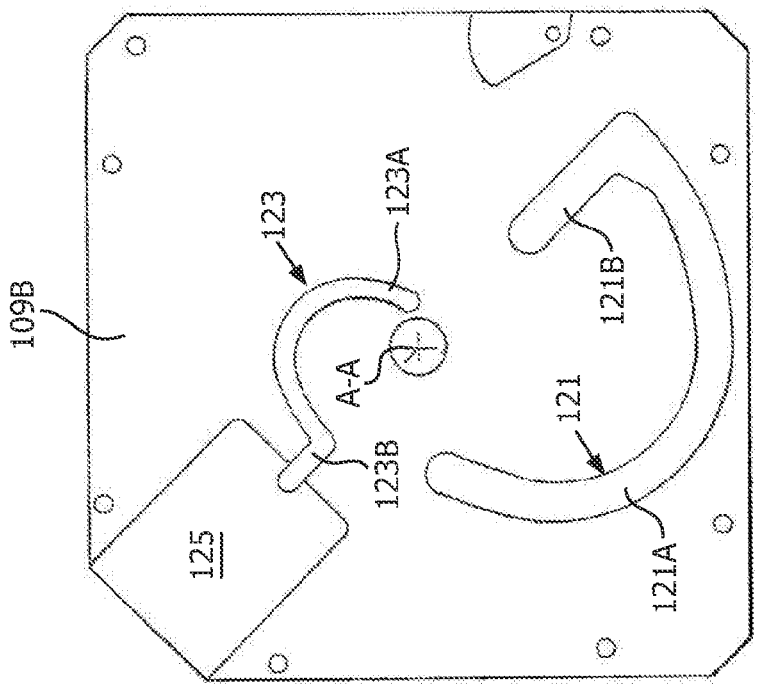
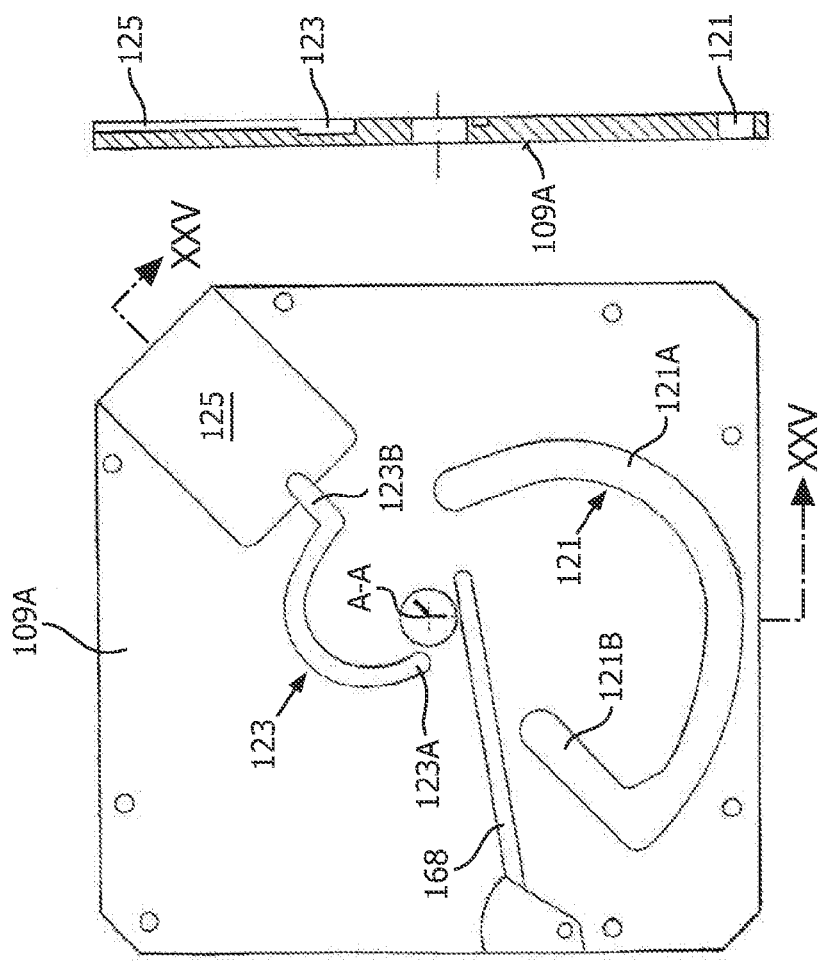

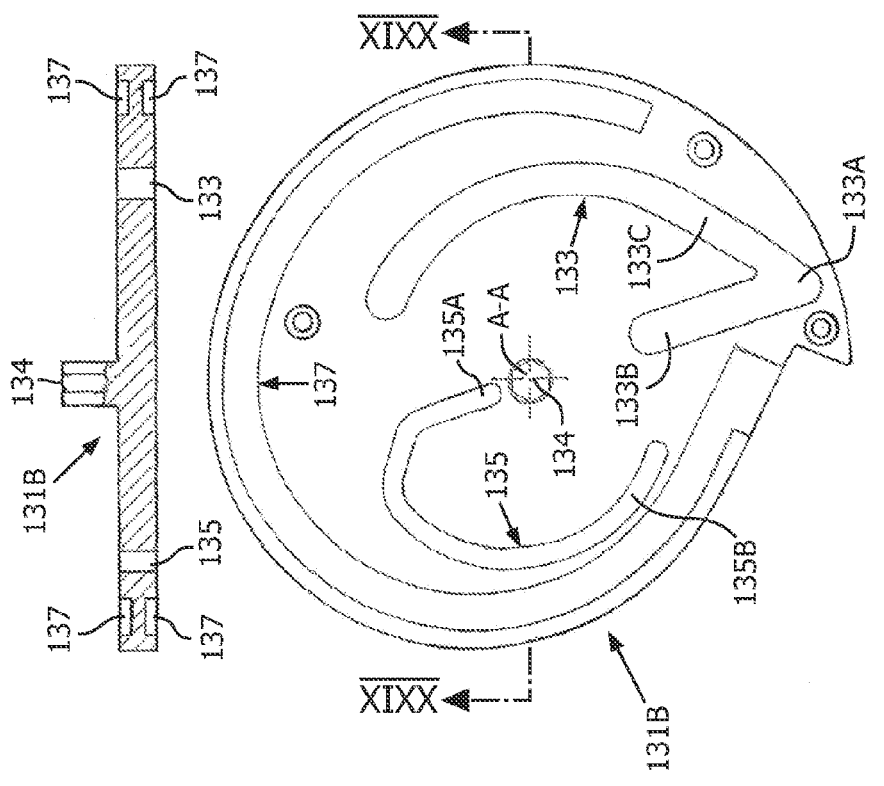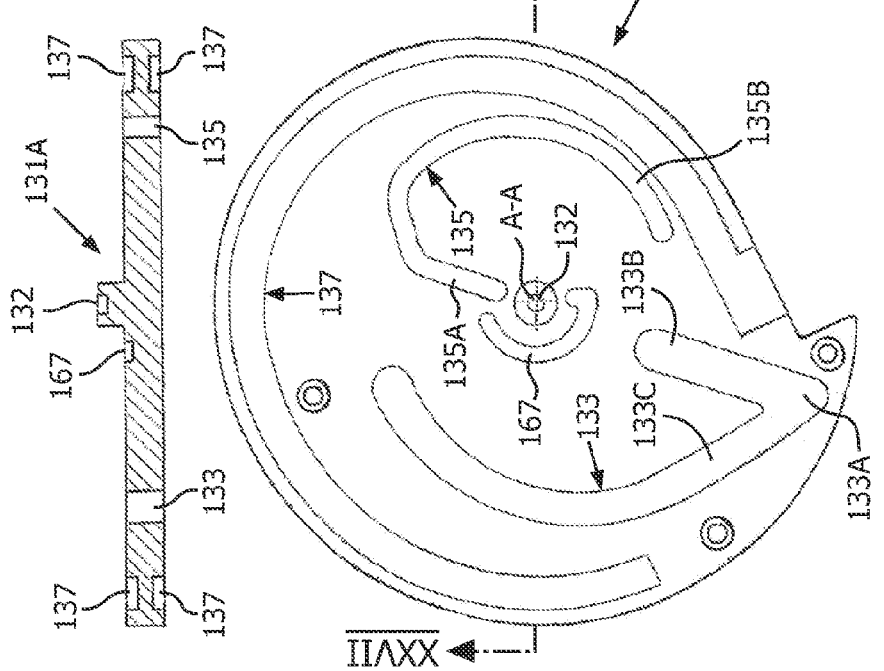

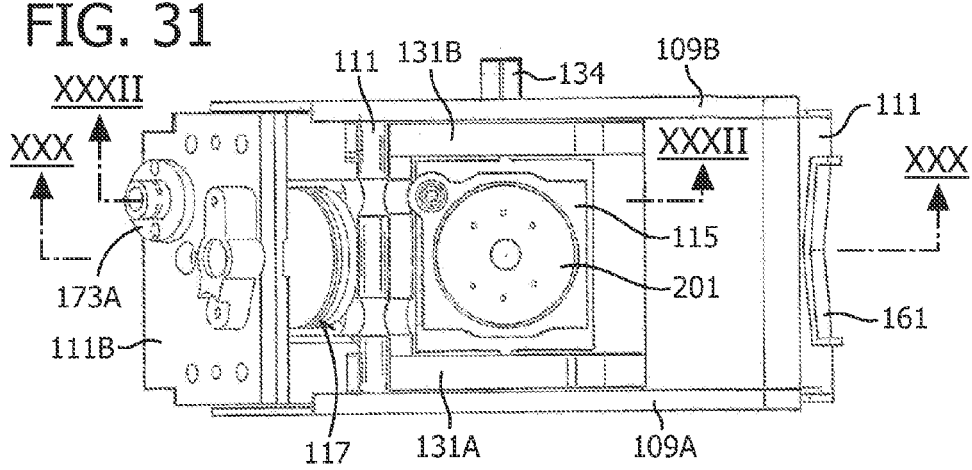
FIG. 31
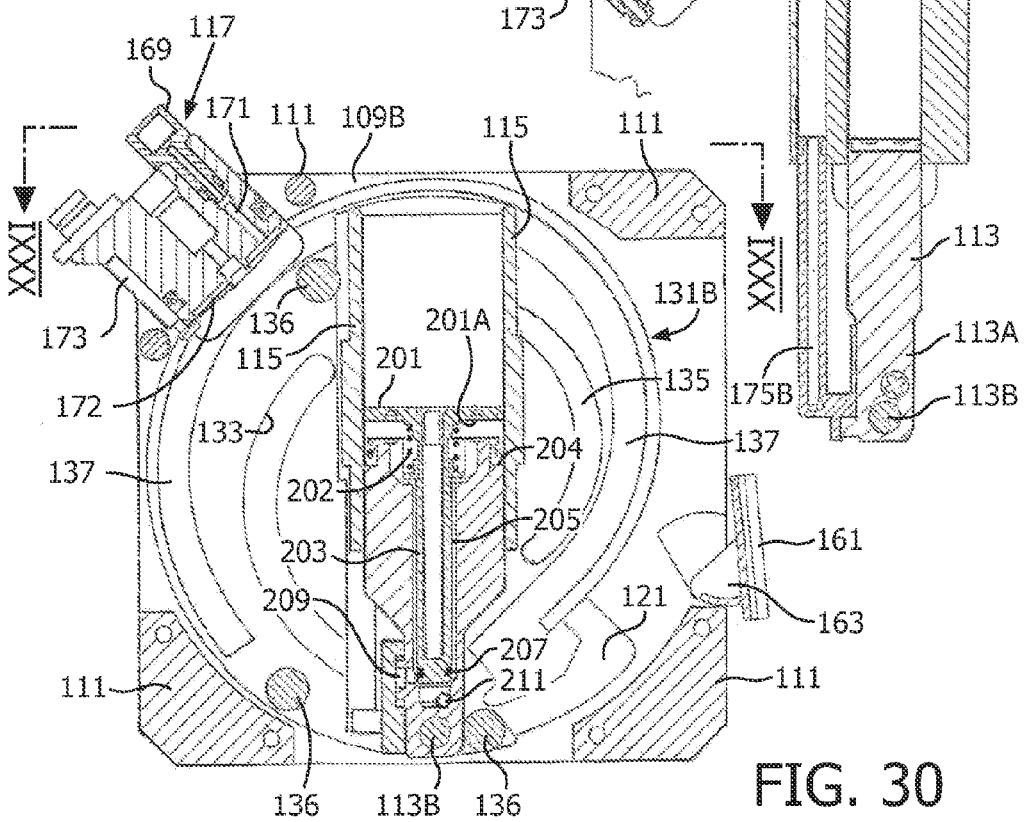
FIG. 32
FIG. 30

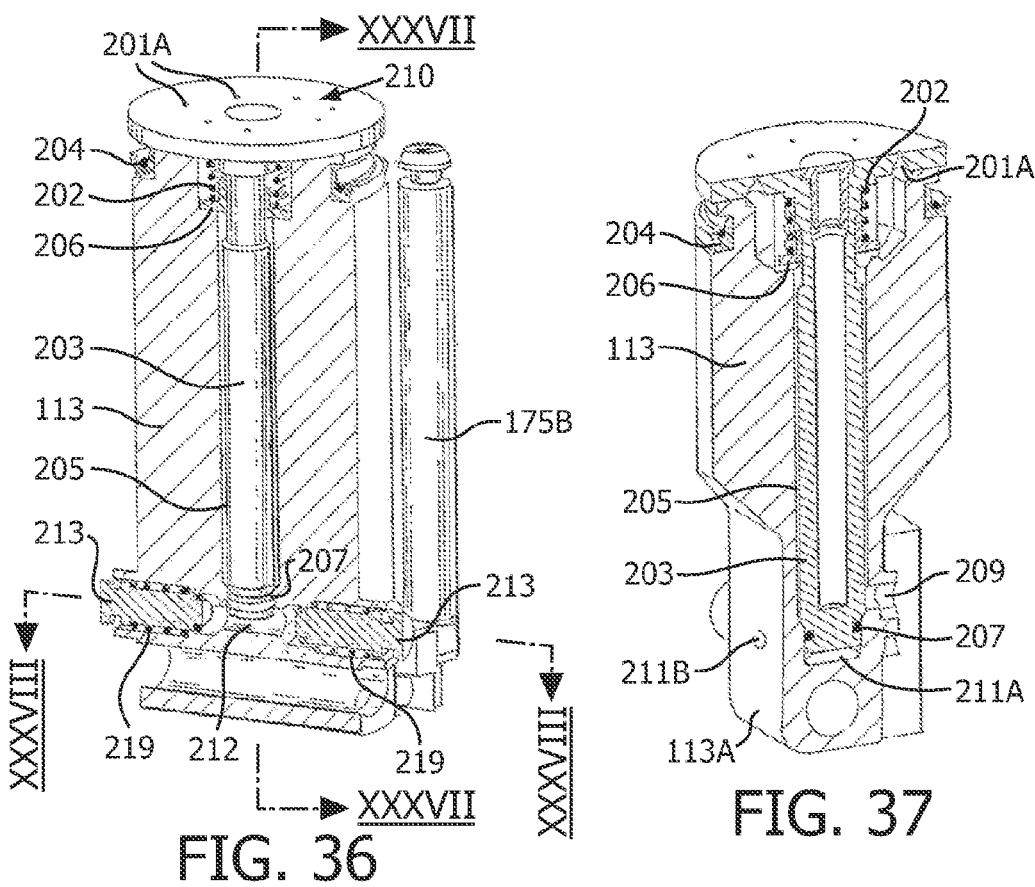
FIG. 36
FIG. 37
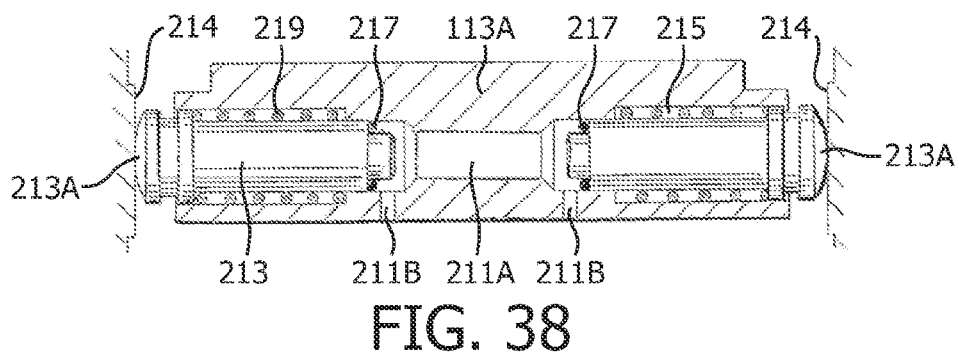
FIG. 38
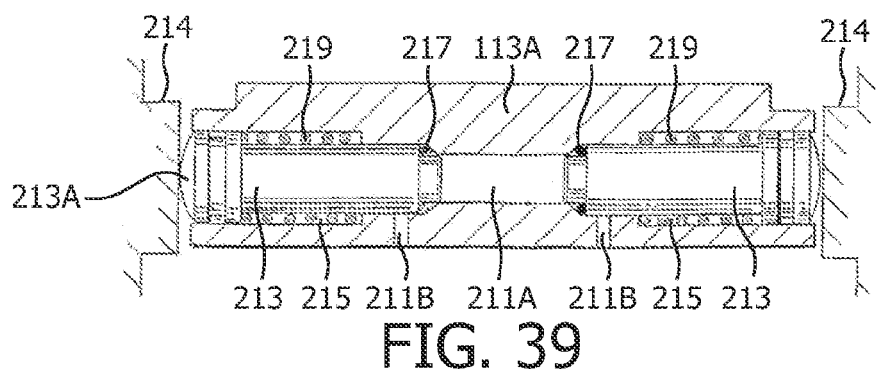
FIG. 39

BREWING UNIT FOR PREPARATION OF BEVERAGES, AND MACHINE COMPRISING SAID BREWING UNIT

TECHNICAL FIELD

The present invention relates to improvements to brewing units for preparation of beverages, especially but not exclusively for preparation of coffee, and more in particular to brewing units designed for use in automatic machines, in which a brewing unit receives a predetermined dose of ground coffee (prepacked or loose) or of other products for preparation of a beverage, and performs a cycle of closing of the brewing chamber, preparation of the beverage via infusion with hot water, and discharge of the spent ground coffee or other spent product.

The invention also relates to a machine for preparation of beverages, comprising a brewing unit of the type mentioned above.

The invention concerns in general machines for domestic or professional use, and also vending machines.

STATE OF THE ART

In electrical machines for the preparation or production of beverages and in particular coffee, so-called brewing units are used, which comprise a plurality of mobile members that define a brewing chamber, in which a dose of loose ground coffee or else coffee packed in the form of capsules, cartridges or the like is charged. After it has been charged with the ground coffee, the brewing chamber is closed, and hot water is made to pass inside it at an adequate pressure for extracting the aromas from the ground coffee and produce the beverage. At the end of the brewing step, the brewing chamber is opened, and the spent ground coffee is discharged.

Some machines of this type, especially the ones designed to function with products prepacked in the form of cartridges, capsules or the like, enable also the production of other types of beverages or foodstuff products, such as tea, chocolate, or the like.

Described in U.S. Pat. No. 4,681,028 is a brewing unit of the type mentioned above, in which the brewing chamber is defined between two portions that are mobile with respect to one another. In greater detail, the brewing unit described in this prior patent comprises a seat or cylinder within which a piston slides. The seat can oscillate and translate with respect to a supporting structure to set itself in a ground coffee-charging position and in a brewing position. The latter position is reached by causing translation of the seat towards and about a counter-piston fixed on the supporting structure. The counter-piston, seat, and piston define a brewing chamber of fixed volume. The opening and closing mechanism is such that, once said closing and brewing position has been reached, the forces acting on the parts forming the brewing chamber due to the pressure of the water supplied in the chamber itself are discharged on the supporting structure without forcing the motor assembly that actuates the opening and closing mechanism. Other brewing devices or assemblies of a similar type are described in ES-A-2156668, FR-A-2663216, U.S. Pat. No. 5,259,296, EP-A-486433, U.S. Pat. Nos. 5,551,988, 6,779,436, 6,807,898, EP-A-1459663, and EP-A-937432.

Described in U.S. Pat. No. 6,101,923 is a rotating brewing unit with a double brewing chamber. The two brewing chambers are used for producing coffee of two different qualities and more specifically, for example, espresso coffee and fresh-brew coffee. The rotating assembly is provided with cams, which control the movement of the piston within the brewing chamber.

Described in EP-A-0380450 is a further brewing unit with a rotating cylindrical chamber co-operating with a counter-piston having a limited movement of oscillation from a resting position to a working position. In the working position, the counter-piston is coupled to the cylindrical chamber to define, together with a piston set within the chamber itself, a brewing volume. The piston has a helical spring, which has the purpose of compensating for any possible variations of the volume of ground coffee contained in the brewing chamber. This brewing unit has a single brewing position with a predetermined volume of the brewing chamber and a system for blocking the brewing chamber in the working position for discharging onto the supporting structure the pressure stresses that are generated inside it. An actuation mechanism is provided for activating and deactivating the blocking device of the brewing chamber.

SUMMARY OF THE INVENTION

According to one aspect, the present invention relates to a brewing unit for the production of coffee or in general for preparation of beverages that will make it possible, with a particularly resistant and reliable structure, to work with variable volumes of the brewing chamber to produce beverages of different qualities (for example, espresso coffee and fresh brew), and/or a variable number of doses of beverage at each individual brewing cycle, for example, just one cup of coffee or else two cups of coffee in a single brewing operation.

According to one embodiment, the brewing unit according to the invention includes a rotating unit with a seat, sliding in which is a piston, and a counter-piston co-operating with said cavity and said piston to define a brewing chamber.

Herein after specific reference will be made to a brewing unit for preparation of coffee. However, it must be understood that the features of the brewing unit according to the invention can be advantageously applied also in other types of machines, for preparing different beverages, or else in machines that are able to produce coffee and also other types of beverages. Consequently, when in the present description and in the attached claims reference is made to coffee and ground coffee, it must be understood that in some embodiments the same brewing unit could be used with products other than ground coffee, possibly in single-dose or multi-dose packages, for preparation of other types of beverages.

Advantageously, in some embodiments a brewing unit is provided for the production or preparation of coffee or other beverages in general, comprising: a seat having a movement of rotation, slidably housed in which is a piston; a counter-piston co-operating with said seat and said piston to define a brewing chamber; cam members for controlling the movements of the seat, of the piston, and of the counter-piston. The seat, the piston and the counter-piston are arranged, designed, and controlled for assuming at least one charging position for charging the product or substance (for example, ground coffee) with which the beverage is to be prepared, at least two distinct brewing positions to which there correspond two different volumes of the brewing chamber, and a discharging position for discharging the spent product or substance, for example the tablet of ground coffee, or else the spent coffee capsule, or cartridge.

In an advantageous embodiment, the charging position is intermediate between the discharging position and the two or more brewing positions.

In one embodiment, the cam members are designed for discharging onto a supporting structure a significant part of the stresses exerted on the piston and on the counter-piston during the brewing step. These stresses are due to the compression of the ground coffee or other product used for preparation of the beverage, and to the pressure of the hot water that is made to pass through the ground coffee for extraction of the substances with which the beverage is prepared. In this way, a particularly effective mechanism of opening and closing of the brewing chamber is obtained, in which it is not necessary to envisage auxiliary blocking members for maintaining the brewing chamber in position during compression and/or supply of the hot water through the ground coffee or other product. By discharging a significant part of the stresses on the supporting structure through the control cams any torsional stresses on the motor shaft are prevented. Advantageously, the shape of the cams is such as to supply an adequate force of reaction to the pressure inside the brewing chamber in all the different possible brewing positions or at least in some of them.

In a possible embodiment, the brewing unit comprises three working positions of the seat, of the piston, and of the counter-piston, to which there correspond three distinct volumes of the brewing chamber.

Preferably, the counter-piston is mobile so as to be inserted in the seat and slide therein.

To obtain a sturdy and compact structure, in one embodiment, the rotating cam is supported between two opposed plates defining a fixed supporting structure, which may possibly be extractable from the machine.

In a possible embodiment, the rotating seat is constrained to, or made of a single piece with a rotating unit presenting a rotation axis supported by a fixed supporting structure. In a possible embodiment, the cam members are either totally or partially fixed with respect to the supporting structure. In a modified embodiment, the cams or else the cam profiles for controlling the mobile members of the brewing unit are in part fixed with respect to the supporting structure and in part mobile, for example rotating about a rotation axis. The movement can be a continuous movement of rotation or preferably a reciprocating movement of rotation, i.e., an oscillating movement in opposite directions.

The cams are preferably groove-shaped cams, i.e. channel-shaped cams.

According to a preferred embodiment, the invention provides a brewing unit for the preparation of hot beverages, in particular coffee, comprising: a seat having a rotation and a translation movement and in which a piston is slidably received; a counter-piston co-operating with said seat and said piston, to define a brewing chamber. The movement of each said piston, counter-piston and seat is controlled by fixed and rotating cam profiles. More specifically, according to some embodiments, the seat is provided with a rotational motion around a first axis and a translation motion along a second axis, said first and second axis being preferably approximately orthogonal to one another. Similarly, the piston slidingly housed in said seat is also provided with a corresponding rotation and translation movement. Preferably, the counter-piston is provided with a translation movement, but preferably has no rotational motion. In some embodiments, each said piston, counter-piston and seat co-act with a respective fixed and rotating cam profiles or pairs of fixed and rotating cam profiles. More specifically, motion of the seat is controlled by at least a fixed cam profile and a movable cam profile. Preferably, to obtain a more sturdy structure, a pair of fixed cam profiles and a pair of movable cam profiles are provided, the profiles of each pair being symmetrical or identical. Similarly, the piston is controlled by a fixed cam profile and a movable cam profile (or a pair of fixed and a pair of movable cam profiles having the same shape) and the counter-piston is controlled by a fixed cam profile and a movable cam profile or a pair of identical fixed cam profiles and movable cam profiles respectively. In some preferred embodiments the movable cam profiles controlling the piston, the counter-piston and the seat are rotating around a common rotation axis. In some embodiments the movable cam profiles are provided on a common rotating cam. If pairs of cam profiles are provided for each movable member (piston, seat and counter-piston) then preferably two rotating cams are provided, each of which is provided with a respective one of the cam profiles of each said pair of cam profiles.

In some embodiments, the piston and seat form a unit which is thus supported by respective feelers, for example in the shape of pins, in corresponding movable and fixed cam profiles. The rotation of the movable cam profiles brings about the rotation and translation of the piston and seat. Since separate cam profiles are provided for the piston and the seat, it is thus possible to impart the same rotation motion to both the piston and the seat, but to have a different translation movement for the two members, such that the piston slides with respect to the seat. It is thus possible, with one and the same actuator, to cause the movement of the seat from a charging position to a brewing position and then towards a discharge position. The piston can slide in the seat such as to assume possible different brewing positions (with larger or smaller volumes of the brewing chamber) and also a position of discharge of the exploited, i.e. the spent coffee powder or of an exhausted coffee cartridge, pod or capsule from the seat. Similarly, the counter-piston is also controlled by one and the same motor or actuator, which controls the movement of the piston and of the seat. An extremely simple and flexible structure is thus obtained, wherein the possibility is achieved of brewing different kinds of coffee (e.g. fresh brew or so called "American coffee"), or else a different number of coffee cups (one or two, for example). At the same time, the possibility is provided to minimize or anyhow to strongly reduce the forces (due to the compression of the coffee and/or to the water pressure in the brewing chamber), which are discharged on the motor shaft, i.e. the shaft which transmits the motion to the rotating cams.

In one embodiment, the cam members comprise a first cam co-operating with the piston for controlling the sliding movement of said piston in the seat. In one embodiment, the rotation of the rotating unit causes sliding along the first cam of a feeler fixed with respect to the piston. Preferably, the cam members comprise a second cam fixed with respect to the supporting structure and co-operating with the counter-piston for controlling the movement of said counter-piston in said seat. In a practical embodiment the piston is driven in movement by the rotating unit, and the feeler of the counter-piston slides along the second cam, whilst said rotating unit drives the counter-piston. In this way, a single motor causes rotation of the rotating unit and the movements of the piston and of the counter-piston. In a preferred embodiment of the invention, the first and second cams are provided on one and/or the other of said two plates. Preferably a first and a second cam are provided on each of the two plates. In practice, that is, each cam is double and comprises a groove on each of the two plates.

In one embodiment, fixed with respect to the rotating unit are drawing members configured so as to draw the counter-piston by means of said rotating unit from a waiting position to a brewing position and to bring the counter-piston back from the brewing position into the waiting position whilst the rotating unit shifts into the discharging position for discharge the spent coffee.

In a modified embodiment, the brewing unit envisages cam members that comprise a first set of cam profiles fixed with respect to a supporting structure, and a second set of cam profiles that are mobile, and preferably rotate, with respect to said supporting structure, for controlling the movements of said seat, said piston, and said counter-piston.

The mobile cam profiles can be provided on separate disks or else preferably on a common rotating cam.

In one embodiment the brewing unit envisages a pair of fixed plates, each having a set of fixed cam profiles that are substantially the same as one another, and a pair of rotating cams, set alongside said fixed plates, each rotating cam having a set of rotating cam profiles that are substantially the same as one another, and in which said seat, said piston, and said counter-piston are set between said two fixed plates.

In one embodiment, the fixed plates support the rotating cams. Preferably, each rotating cam is carried by a fixed plate and set on the outside or on the inside thereof, i.e. the two rotating cams are arranged between the two fixed plates.

In one embodiment, the piston, the seat, and the counter-piston are provided with respective feelers, each of which co-operates with at least one fixed cam profile and one rotating cam profile.

With the fixed and rotating cams it is possible to control rotation and translation movements of the piston and of the seat. In one embodiment, the cams can be provided in such a way that the counter-piston will present, instead, just a translation movement with respect to a fixed load-bearing structure.

Further advantageous embodiments and characteristics of the invention are indicated in the attached claims and will be described here below with reference to some examples of embodiment of the invention.

BRIEF DESCRIPTION OF THE DRAWINGS

A clearer understanding of the invention will be obtained from the description and the attached drawings, which show practical non-limiting embodiments of the invention, applied by way of example to brewing units for the production of ground coffee. More in particular, in the drawings:

FIG. 3 shows a view according to the line III-Ill of FIG. 2;

FIG. 4 is a cross-sectional view according to the line IV-IV of FIG. 3;

FIGS. 19, 20, and 21 show axonometric views of a further embodiment of the brewing unit according to the invention in three different positions of operation, with one of the side plates removed to show the internal mechanism;

FIG. 20A is a cross-sectional view according to XXA-XXA of FIG. 20;

FIGS. 23 and 24 show internal views of the two fixed plates of the brewing device of FIGS. 19 to 22;

FIG. 25 is a cross-sectional view according to XXV-XXV of FIG. 23;

FIG. 26 shows a front view of one of the mobile cams of the brewing device of FIGS. 19 to 25;

FIG. 27 is a cross-sectional view according to XXVII-XXVII of FIG. 26;

FIG. 28 shows a view similar to the view of FIG. 26 of the other of the two mobile cams of the brewing device in this embodiment;

FIG. 29 is a cross-sectional view according to XXIX-XXIX of FIG. 28;

FIG. 30 is a cross-sectional view according to a substantially median plane of the device of FIGS. 19 to 29, according to the line XXX-XXX of FIG. 31, in the position in which the brewing unit is ready to be charged with ground coffee;

FIG. 31 shows a top plan view according to XXXI-XXXI of FIG. 30;

FIG. 32 is a local cross-sectional view according to XXXII-XXXII of FIG. 31;

FIGS. 36 and 37 show axonometric and sectioned views of the piston of the brewing device in a possible embodiment, FIG. 37 being a cross section according to XXXVII-XXXVII of the piston of FIG. 36;

FIGS. 38 and 39 are cross-sectional views according to XXXVIII-XXXVIII of the piston of FIGS. 36, 37 in two different configurations of operation;

DETAILED DESCRIPTION OF EMBODIMENTS OF THE INVENTION

Figure 1:
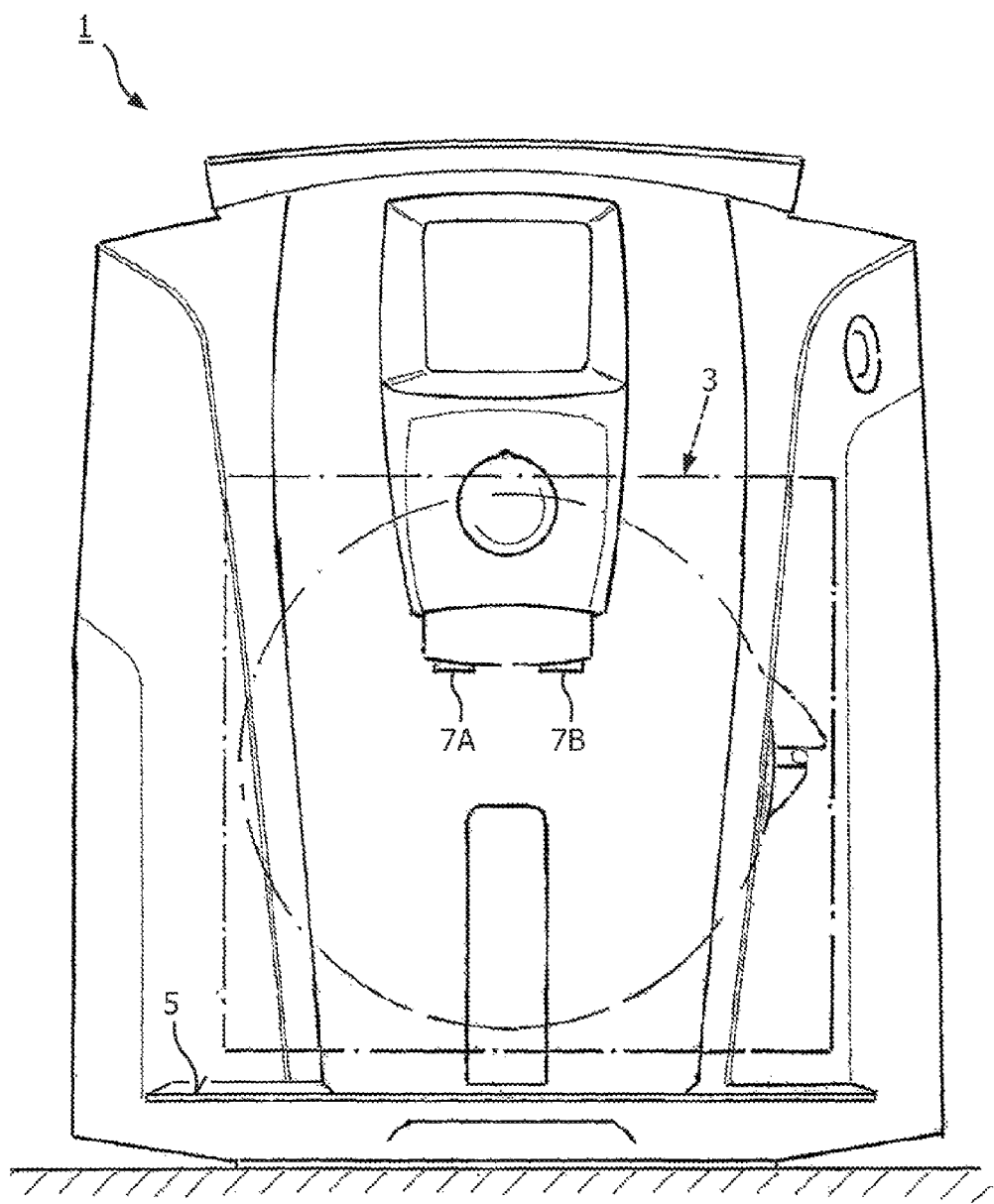
FIG. 1 shows a front view of a coffee machine in which a brewing unit according to the invention can be used.
Figure 2:
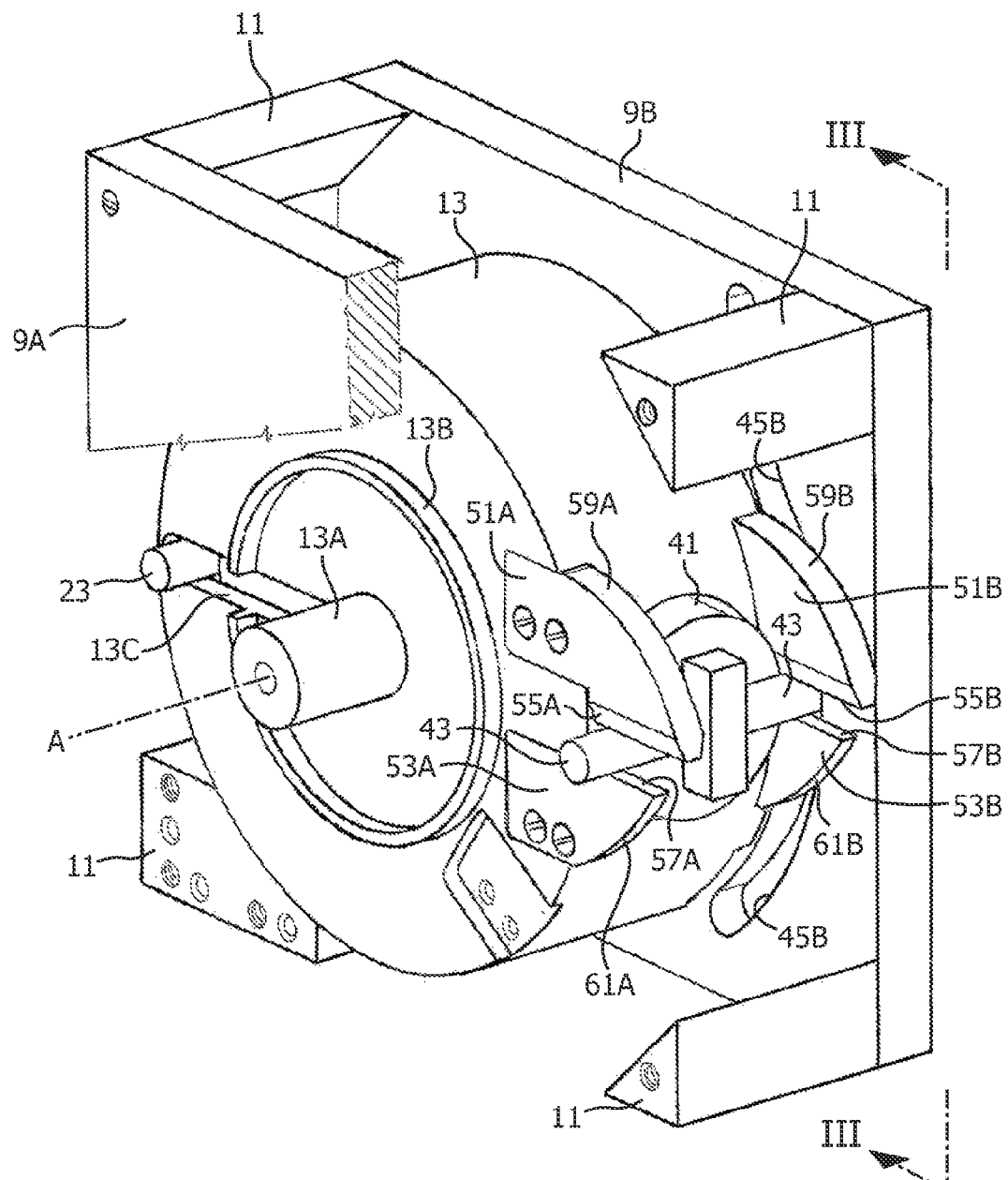
FIG. 2 shows a partially cutaway perspective view of a brewing unit according to the invention in a first embodiment.
Figure 5:
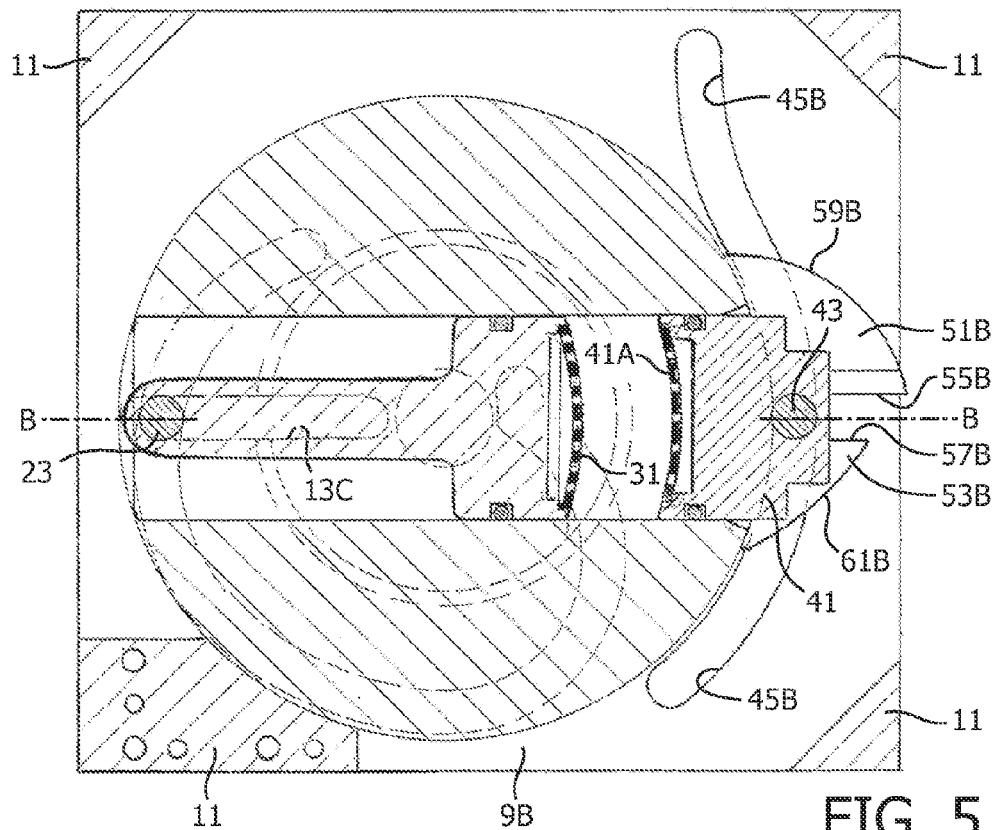
FIG. 5 is a cross-sectional view according to the line V-V of FIG. 3.
Figure 6:
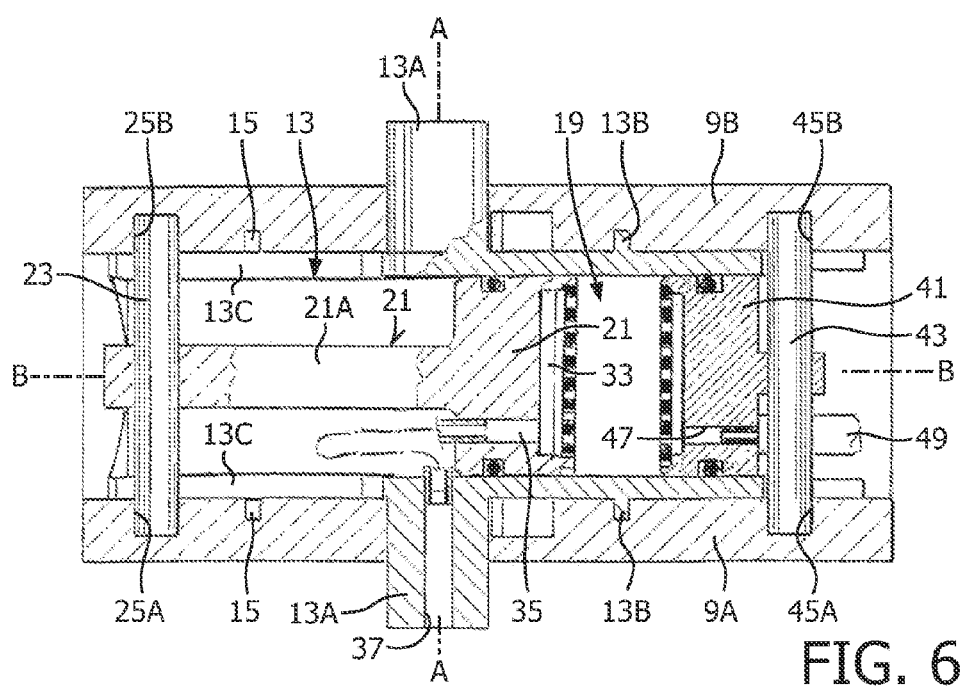
FIG. 6 is a cross-sectional view according to the line VI-VI of FIG. 3.

FIG. 1 is a schematic illustration, in a front view, of an automatic machine for the production of coffee, designated as a whole by 1, to which a brewing unit according to the invention can be applied. The position of the brewing unit, designated as a whole by 3, is indicated in see-through view with a dashed-and-dotted line in the representation of FIG. 1. Designated by 5 is the surface on which the cups, into which the coffee delivered by the machine through delivery nozzles or spouts 7A, 7B is to be collected, are placed. The coffee machine 1 represented in FIG. 1 is a machine for domestic use. It shall, however, be understood that the brewing unit according to the invention can be used also in coffee machines of a professional type and also in automatic distributors or so-called vending machines that typically already today use brewing units similar to the ones used on more advanced automatic machines for domestic use.

Embodiment of FIGS. 1 to 11

A first embodiment of the brewing unit 3 is shown in detail in FIGS. 2 to 11. In this embodiment the brewing unit 3 comprises two plates 9A, 9B, which are substantially the same as one another and are joined by cross members 11 to form a fixed supporting structure, which is mounted within the machine 1. The fixed structure 9A, 9B, 11 can be advantageously extracted from the machine 1 to enable its cleaning, maintenance, replacement, or any other type of intervention that might become necessary.

Supported between the two plates 9A, 9B is a rotating unit 13. The unit 13 is supported via shafts or pins 13A so as to be able to rotate about an axis A-A. One of the pins or axes 13A is connected to an actuation motor, not shown. The coupling can be obtained with a grooved profile or in any other way, possibly with a torque limiter. In a possible embodiment, the rotating unit 13 has two annular projections 13B, co-axial with the rotation axis A-A and which are engaged in annular grooves 15 provided in the two plates 9A and 9B. The annular projections and the corresponding cavities have the purpose of improving guiding of the rotation movement of the rotating unit 13 with respect to the supporting structure.

A seat 19 is provided within the rotating unit 13. In one embodiment, the seat 19 has a cylindrical development with substantially circular cross section.

Housed within the seat 19 is a piston 21, which slides along the axis B-B of the seat 19. The piston 21 has a rod 21A engaged to a transverse pin 23, which develops in a direction substantially orthogonal to the axis B-B and to the rod 21A of the piston 21.

The pin 23 projects from the rotating unit 13 through two slots 13C (see in particular FIG. 2), provided on either side of the rotating unit 13. The axial length of the pin 23 is such that it is engaged at both ends projecting through the slots 13C in corresponding cam profiles 25A, 25B provided in the plates 9A, 9B. The cam profiles 25A, 25B basically constitute grooved cams and form part of cam members that control the movements of the mobile elements defining the brewing chamber of the brewing unit 3. The cam members comprise, in addition to the cam profiles 25A, 25B, further cam profiles for the movement of the counter-piston, described later on.

The cam profiles or grooved cams 25A, 25B are substantially the same as one another, and their shape is shown in detail for example in FIG. 4. In one embodiment, this first cam profile 25A, 25B has a first end 25X set at a first distance from the rotation axis A-A of the rotating unit 13, and a second end 25Y set at a smaller distance from said axis A-A. Between the two ends, the cam profile develops with a curvilinear development that gradually moves away from the rotation axis A-A up to a maximum distance and then approaches again the rotation axis until it reaches the second end 25Y of the cam profile 25A, 25B, at a minimum distance from the rotation axis A-A. Operation of this particular configuration of the cam profile 25A, 25B will be clarified hereinafter with reference to the operating sequence of FIGS. 7 to 11.

The front portion of the piston 21 is provided with a filter 31, for example constituted by a perforated metal cap. Provided on the back of the filter 31 is a cavity 33, in which the coffee produced during the brewing cycle is collected. The cavity 33 is in fluid connection with a pipe 35 for discharging the coffee, provided for example with a flexible tube, which enables a translation movement between the seat 19 and the piston 21 during the various steps of the brewing cycle. The flexible tube 35 is connected to a channel 37, which in turn is in connection with the delivery spout or spouts 7A, 7B of the machine via a circuit not shown and that can be readily designed by a person skilled in the art. Advantageously, in this embodiment, the pipe 37 is coaxial with respect to the rotating unit 13, since it is provided in the rotation pin 13A.

The brewing unit further comprises a counter-piston 41, mobile in the way described hereinafter between a number of operative positions. The counter-piston 41 has a cross section substantially corresponding to the cross section of the seat 19 and of the piston head 21, in the example shown a substantially circular cross section. It is provided with a transverse pin 43, which is substantially parallel to the pin 23 and the opposed ends of which engage in cam profiles 45A, 45B provided in the fixed plates 9A, 9B, respectively. The two cam profiles 45A, 45B are the same as one another and basically constitute grooved cams of which the pin 43 forms the feeler.

In one embodiment, the grooved cams or cam profiles 45A, 45B have an approximately circumferential portion concentric with respect to the rotation axis A-A of the rotating unit 13. Said circumferential portion is radiused to a stretch of cam which develops moving gradually away from the rotation axis A-A and has, for example, a concavity facing the side opposite to the concavity (oriented towards the axis A-A) of the circumferential portion of the cam itself.

The counter-piston 41 has a through pipe 47 (see in particular FIG. 6) connected to a flexible tube 49 for supplying pressurized hot water coming from the boiler (not shown) of the coffee machine 1. The hot water fed through a filter is made to percolate through the compressed ground coffee in the brewing chamber defined within the seat 19 between the top of the piston 21, i.e., the filter 31, and a front filter 41A of the counter-piston 41. Not excluded is the possibility of reversing the hydraulic circuit by supplying hot water under pressure through the piston 21 and drawing off the coffee produced in the brewing chamber through the pipe 47 provided in the counter-piston 41.

The rotating unit 13 comprises a system for engagement of the counter-piston 41 for displacing said counter-piston along a path defined by the pair of cam profiles 45A, 45B. In one embodiment, said drawing system comprises at least one first pair of appendages 51A, 53A and preferably two pairs of appendages 51A, 53A; 51B, 53B that are substantially the same as one another. The arrangement of two pairs of appendages enables engagement in a balanced way of the pin 43 in the proximity of its ends, which can slide within the grooved cams 45A, 45B.

In one embodiment, each of the appendages 51A, 53A; 51B, 53B has a rectilinear edge designated by 55A, 55B for the appendages 51A, 51B and by 57A, 57B for the appendages 53A, 53B. The edges 55A, 57A and 55B, 57B are opposed to one another and define a channel of mutual sliding between the edges themselves and the pin 43. Each appendage 51A, 51B, 53A, 53B has, moreover, a respective curvilinear edge or profile 59A, 61A for the appendages 51A, 53A and 59B, 61B for the appendages 51B, 53B. As may be noted in particular in FIG. 5, the appendages 51A, 51B have a development in a radial direction greater than that of the appendages 53A, 53B for the purposes that will be clarified in hereinafter. The rectilinear edges or profiles 55A, 57A, 55B, 57B, 59A, 61A, 59B, 61B co-operate with the pin 43 of the counter-piston 41 for causing movement thereof along the path that it is necessary to follow in the operating cycle and that is defined by the cam profile 45A, 45B.

The device described so far operates as explained herein after. The brewing cycle starts in the position schematically represented in FIG. 7. In this position, the rotating unit 13 is positioned in such a way that the seat 19 is set in a position that is for example substantially vertical underneath a hopper designated as a whole by T, via which the ground coffee C is charged within the space defined between the side walls of the seat 19 and the front surface, defined by the filter 31, of the piston 21. The ground coffee C can be produced directly by a grinder assembly contained in the machine 1, which grinds coffee beans, or else can be taken from a container of ground coffee, or else again can be charged manually by an operator, for example with the aid of a dosing device.

Figure 7:
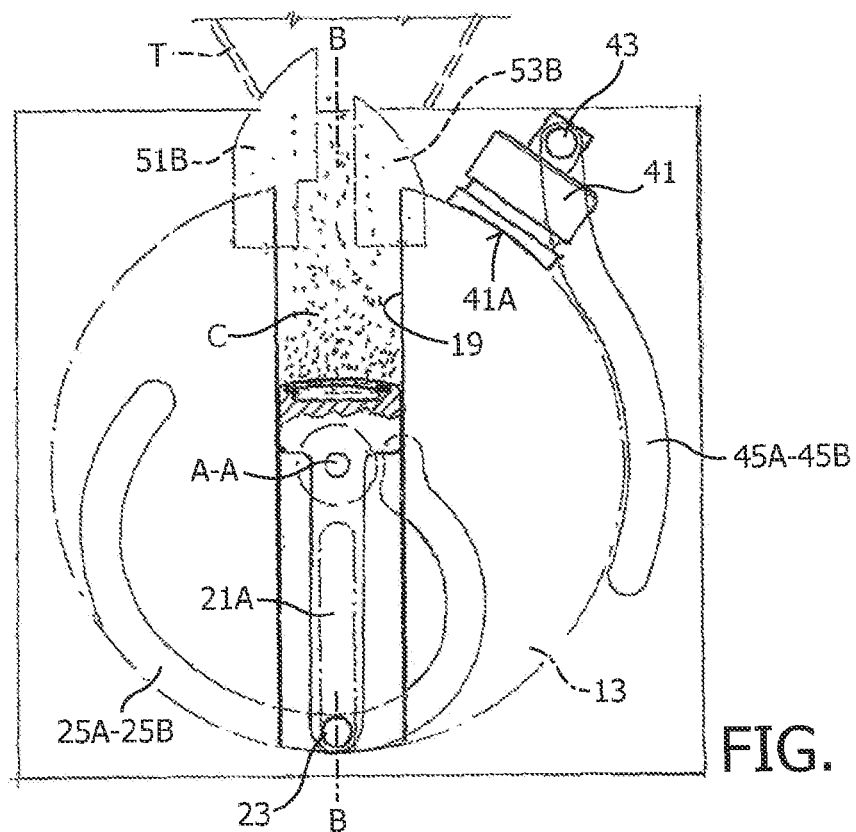
FIGS. 7 to 11 are schematic illustrations of a working sequence of the brewing unit of FIGS. 1 to 6.

As may be seen in FIG. 7, the pin 23 that constitutes the feeler for the cam profiles 25A, 25B is located in a portion of the curve of said cam at a maximum distance from the rotation axis A-A of the rotating unit 13. The counter-piston 41 is in an inoperative position, with the pin 43 (which constitutes the feeler for the cam profiles 45A, 45B) set in the proximity of or in a position corresponding to the top end of the cam profiles 45A, 45B. A member may be provided for blocking the counter-piston 41 in this position. For example, the blocking member can be an elastic member, or else a member with a control actuator. The front surface 41A of the counter-piston 41 can be advantageously curved in order to follow the outer cylindrical profile of the rotating unit 13 and hence remain resting with said outer surface during the subsequent movement of rotation of the rotating unit 13 controlled by the actuation motor (not shown).

Figure 8:
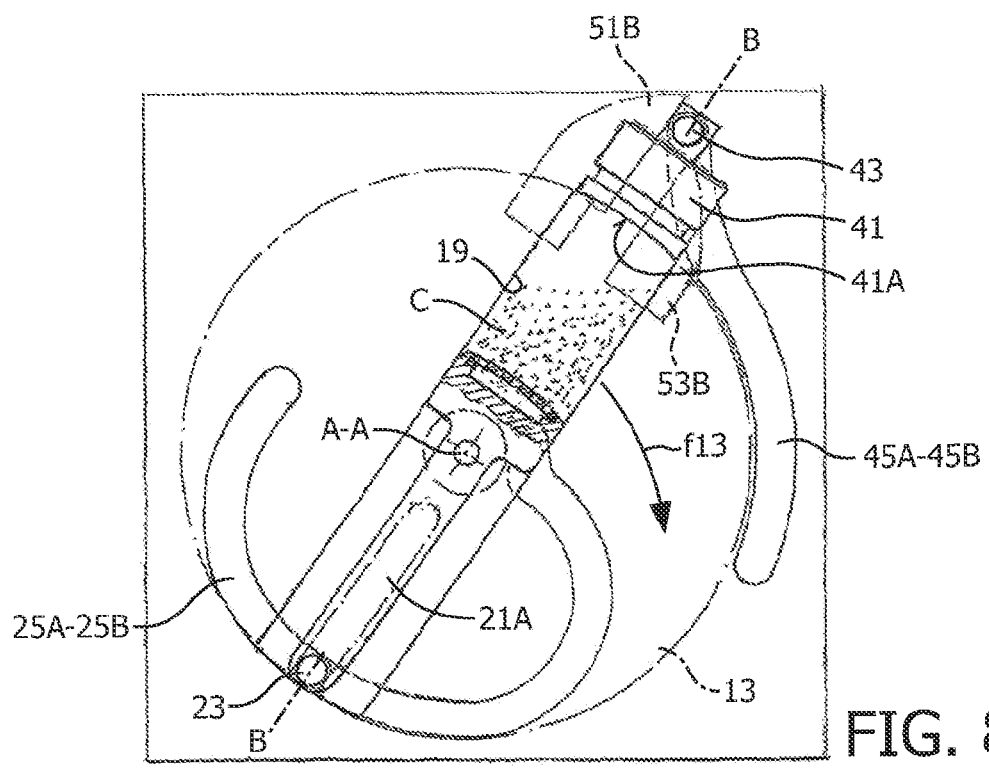
Figure 9:
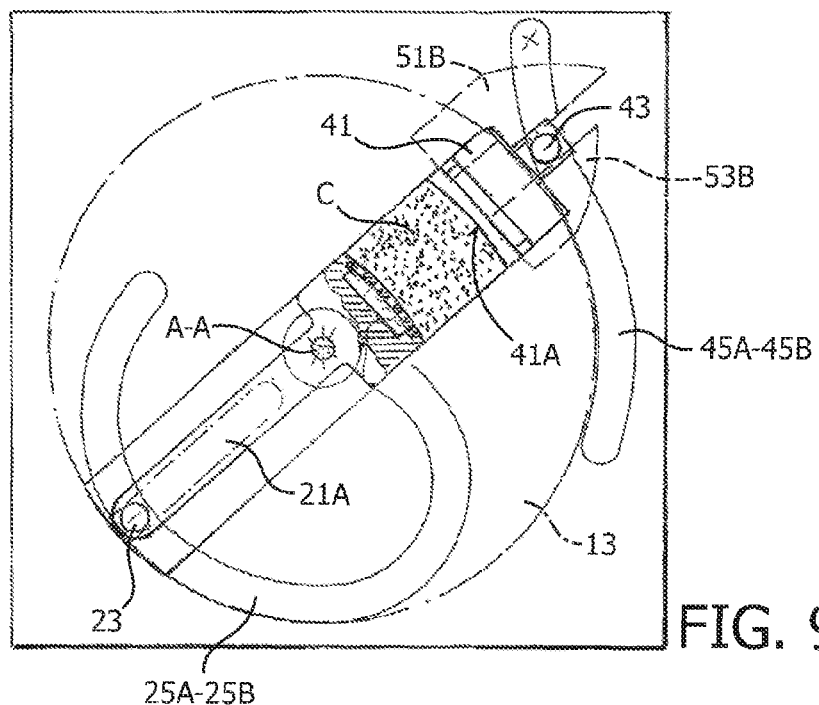

FIG. 8 shows the first rotation step according to the arrow f13 of the rotating unit 13 with the seat 19 and the piston 21 housed and sliding therein.

In the angular position of FIG. 8, the axis B-B of the seat 19 is aligned with the axis of the counter-piston 41, and the edge 55A, 55B of each of the appendages 51A, 51B, which are fixed with respect to the rotating unit 13 comes into contact with the pin 43.

As it proceeds in the rotation according to the arrow f13, the rotating unit 13 draws along with it the counter-piston 41 thanks to the appendages 51A, 51B. The cam profile of the grooves 45A, 45B along which the pin 43 slides driven by the rotation of the rotating unit 13 is such that, as the rotation of the rotating unit 13 proceeds according to the arrow f13 about the axis A-A, the counter-piston approaches the axis A-A penetrating within the seat or cylinder 19 provided in the rotating unit 13.

Figure 10:
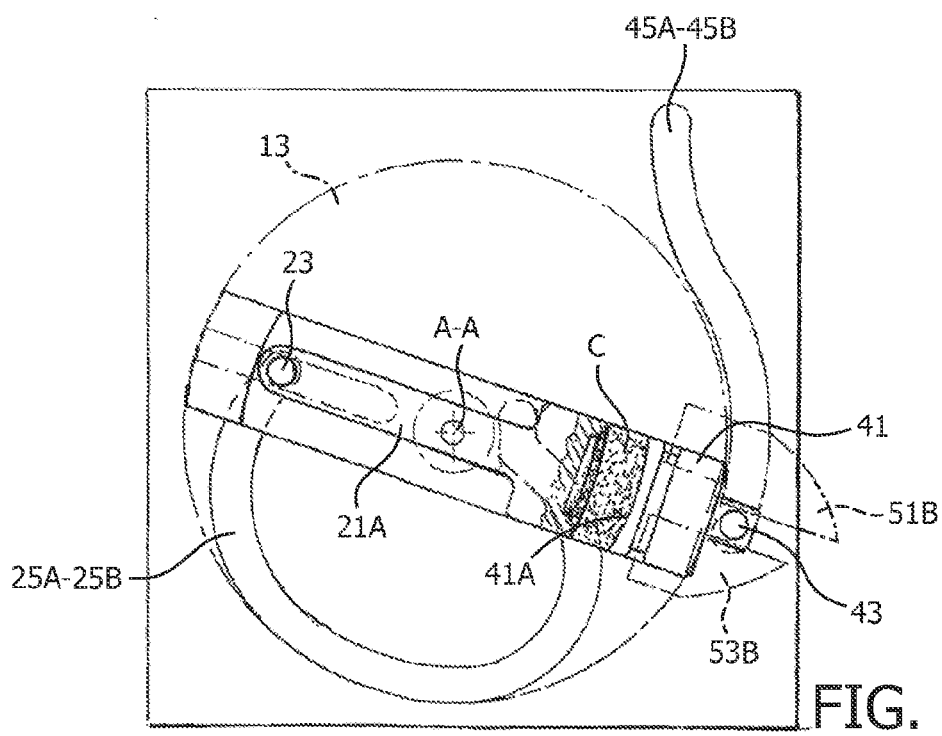

FIG. 10 shows the position of maximum rotation of the rotating unit 13 in the clockwise direction (in the example). In this position, the piston 21 has been pushed via the pin 23 co-operating with the cam grooves 25A, 25B towards the counter-piston, and the latter is located within the seat 19. As may be noted from a comparison between FIGS. 9 and 10, between the angular positions assumed by the brewing unit in these two figures there is a difference of distance between the piston 21 and the counter-piston 41 and hence a difference of volume of the brewing chamber defined between the piston 21, the counter-piston 41, and the cylindrical wall of the seat 19 within which the aforesaid members slide. In both of the positions of FIGS. 9 and 10 the brewing chamber is closed and inside it there is a dose of coffee C compressed as a result of the pressure exerted by the opposed surfaces of the piston 21 and of the counter-piston 41. In all the angular positions intermediate between the ones represented respectively in FIG. 9 and in FIG. 10 there is defined a closed brewing chamber of gradually variable volume.

According to the final angular position assumed by the rotating unit 13, it is thus possible to define a brewing chamber of volume that varies between the maximum volume (FIG. 9) and the minimum volume (FIG. 10). In each of these positions, the brewing step proper can take place with introduction of the water under pressure from the boiler and collection, through the axis A-A, of the coffee produced. Thanks to the particular configuration of the brewing unit with the cam profiles 25A, 25B, 45A, 45B, the pressure exerted by the compression of the coffee and by the water supplied in the brewing chamber on the opposed surfaces of the piston 21 and of the counter-piston 41 is counterbalanced to a large extent by forces of reaction that are generated between the pins 23, 43 and the respective cam profiles 25A, 25B and 45A, 45B described above. Consequently, brewing can take place in any of the angular positions comprised between that of FIG. 9 and that of FIG. 10 without this calling for any particular measures for keeping the rotating unit 13 blocked in position and in particular without the pressure within the brewing chamber generating a torque on the motor shaft that would tend to reverse the motion of rotation of the motor itself and hence that would tend to bring the rotating unit 13 back to the initial position of FIG. 7.

Figure 11:
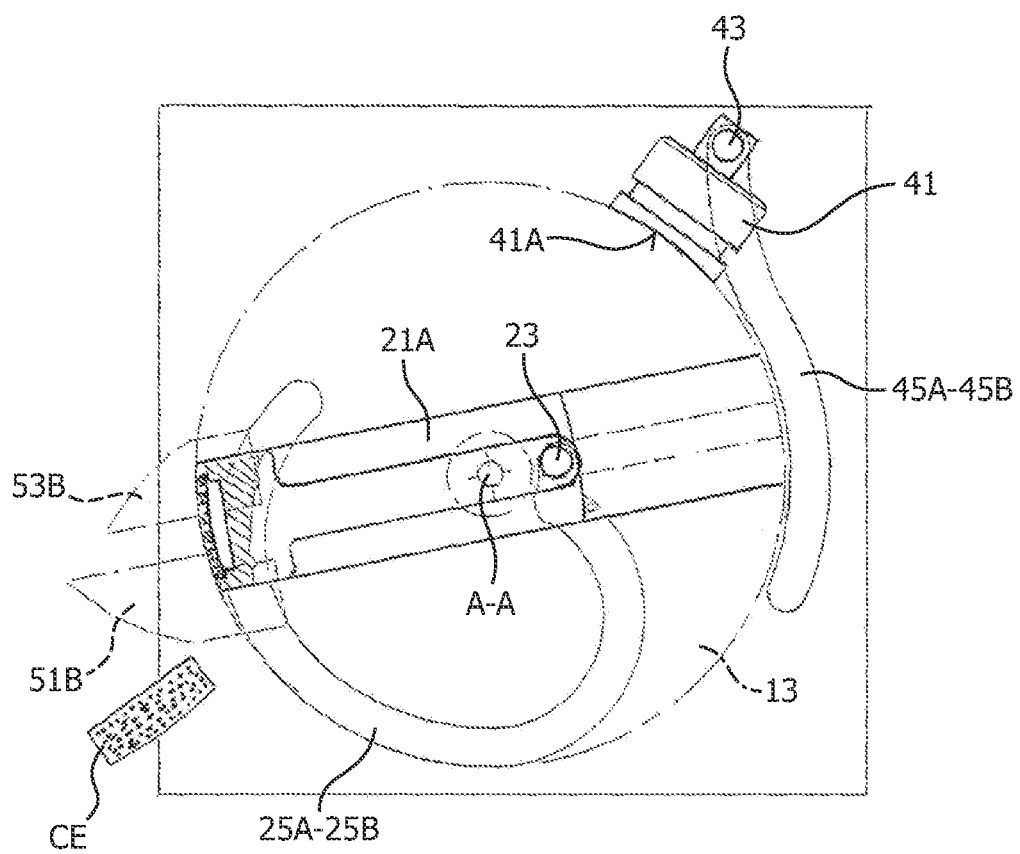

Once the brewing step has been completed, the motion of the rotating unit 13 is reversed, and the unit itself is brought from the brewing position to the discharging position for discharging the spent coffee CE, shown in FIG. 11. In this position, the pin 23 occupies a position corresponding to the end 25Y of the two grooved cams or cam profiles 25A, 25B, and hence the piston itself takes the position of maximum approach to the mouth of the seat 19. In practice, the front surface of the filter 31 is flush with the side cylindrical surface of the rotating unit 13. A scraper provided in this area may be useful for scraping the spent coffee from the surface of the filter 31.

In the return movement (counterclockwise rotation as viewed in the drawing) from the brewing position towards the discharging position of FIG. 11, the rotating unit 13 via the shorter appendages 53A, 53B brings the counter-piston 41 back into its resting position as shown in FIG. 11. This is obtained as a result of the thrust of the rectilinear edges 57A, 57B on the pin 43. The different length of the appendages 51A, 51B and 53A, 53B causes the counter-piston 41 to be released by the appendages 53A, 53B in the resting position of FIG. 11 and to be taken up again by the longer appendages 51A, 51B in the reverse movement from the position of FIG. 7 towards the position of FIGS. 8, 9 and 10.

Embodiment of FIGS. 12 to 18

FIGS. 12 to 18 show a second embodiment of the brewing unit according to the invention. Also the brewing unit of FIGS. 12 to 18, once again designated as a whole by 3, can be inserted in a coffee machine of the type illustrated in FIG. 1 or in other machines even of a professional type or in an automatic dispenser or vending machine, or the like.

In this embodiment, the brewing unit 3 has a pair of fixed plates 109A and 109B joined to one another by cross members 111 so as to form a supporting structure, which can possibly be extracted from the coffee machine. Set between the fixed plates 109A, 109B are a piston 113, a seat 115 where the piston 113 slides, within which the brewing chamber is defined, and a counter-piston 117. These three elements (piston 113, seat 115, and counter-piston 117) have a mutual movement for performing the brewing cycle. As will emerge clearly from what follows, in a possible embodiment, the piston 113 and the seat 115 carry out movements of rotation and translation, whilst in one embodiment the counter-piston 117 performs only movements of translation.

The movement of the three members 113, 115, 117 is controlled by means of cam profiles. Provided on the fixed plates 109A, 109B is a first set of fixed cam profiles. In this embodiment, both plates 109A, 109B have cam profiles, and the fixed cam profiles provided on said plates are specular to one another. Consequently, herein after the profiles of the plate 109B will be described, it being understood that on the plate 109A there are specular profiles. More specifically, the set of fixed cam profiles comprises a first cam profile 121 for controlling movement of the piston 113, a second fixed cam profile 123 for controlling movement of the seat 115, and a third cam profile 125 for controlling movement of the counter-piston 117.

Figure 12:
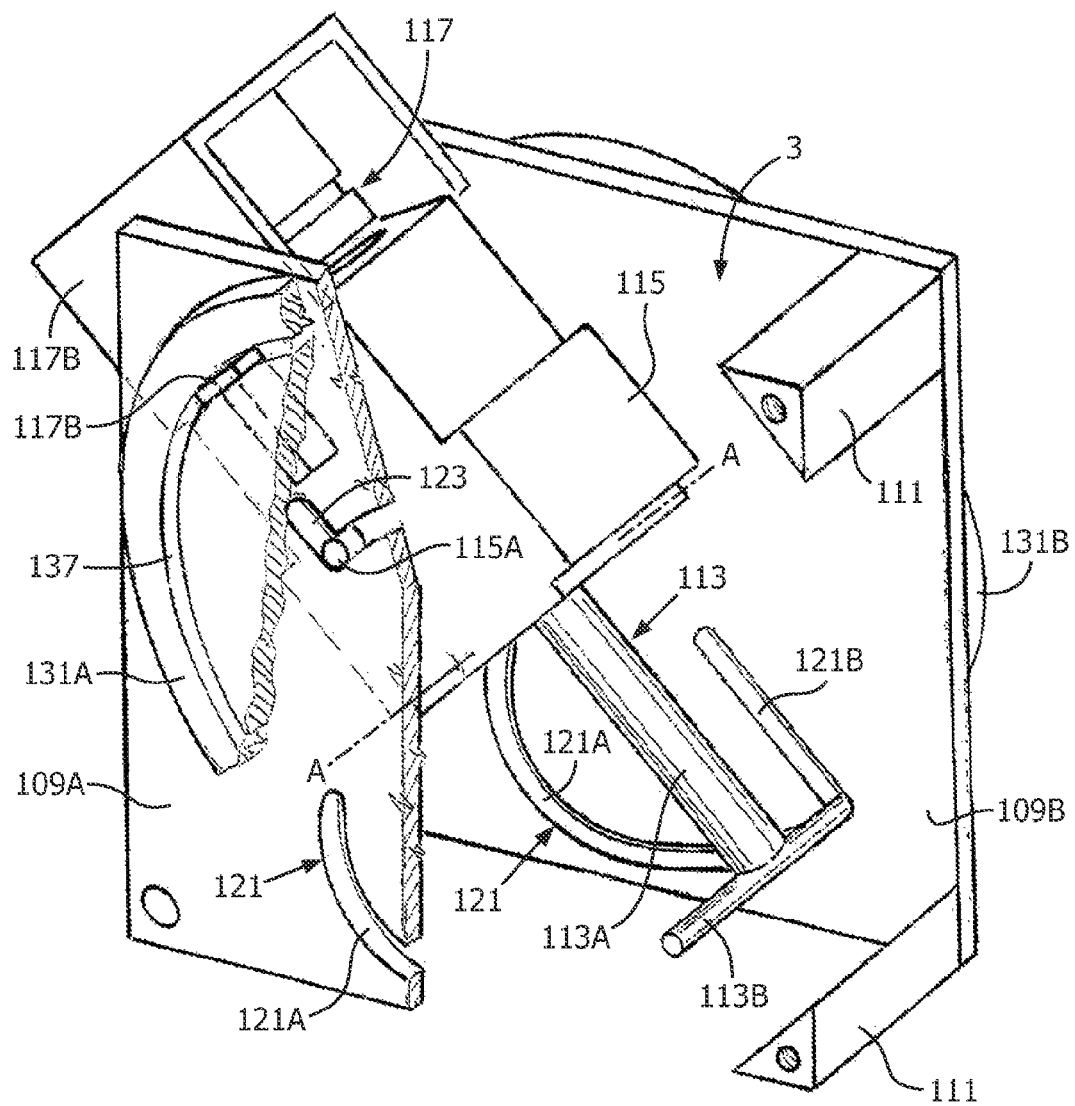
FIG. 12 shows a perspective view with parts removed of a brewing unit according to the invention in a second embodiment.
Figure 12A:
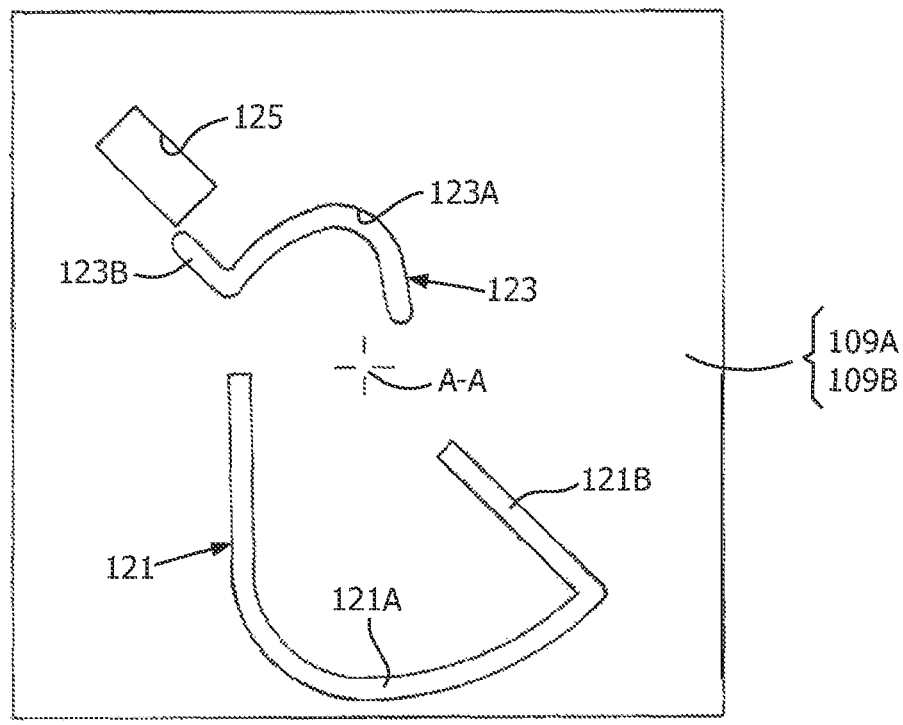
FIG. 12A shows a front view of one of the fixed plates on which the fixed cam profiles of the embodiment of FIG. 12 are provided.

The fixed cam profiles are shown in front view in FIG. 12A, where one of the fixed plates 109A, 109B is represented isolated from the other mechanical parts.

Sliding within the cam profile 121 is a feeler 113B formed by a transverse pin substantially orthogonal to the axis B-B of the piston 113 and of the brewing chamber. The pin 113B is hence orthogonal to the rod 113A of the piston 113. By providing a double channel 121 on the two plates 109A, 109B, the pin 113B is guided at both ends along said grooved cams.

Fixed to the seat 115 are pins 115A, preferably opposed and coaxial to one another, which engage in the two cam profiles 123, which are preferably the same as one another, provided on the two fixed plates 109A, 109B.

Finally, fixed on the counter-piston 117 are opposed and preferably coaxial pins or sliding blocks 117A, which engage in the cam profiles 125 of the two fixed plates 109A, 109B. More precisely, the pins 117A are mounted on a U-shaped bracket 117B fixed with respect to the counter-piston 117 and possibly forming an integral part thereof.

Figure 12B:
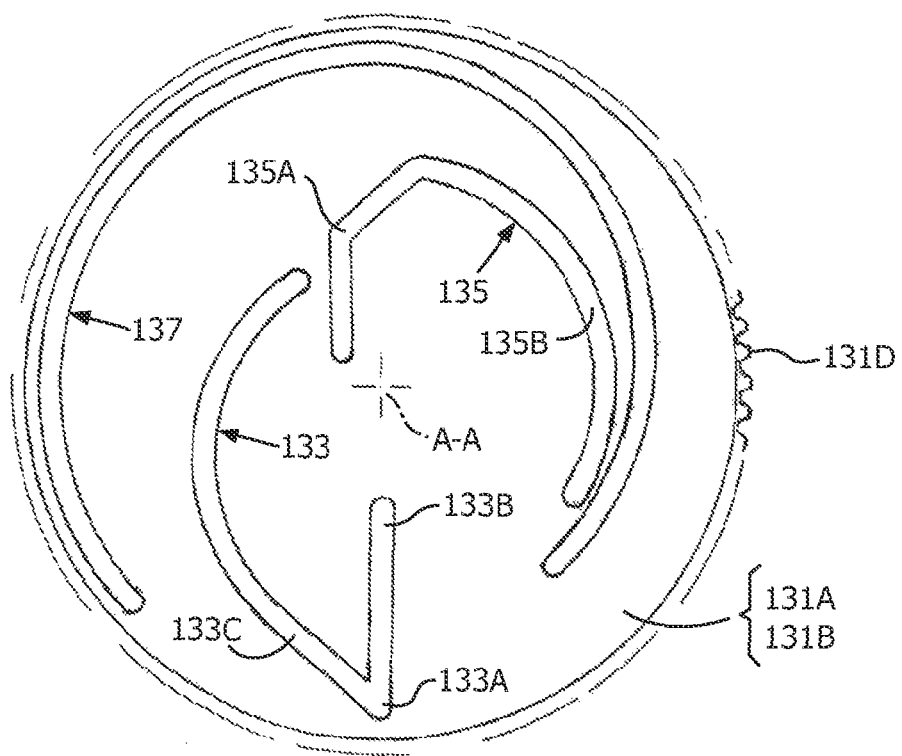
FIG. 12B shows a front view of one of the rotating cams, with the rotating cam profiles.

Set on the outside of the fixed plates 109A, 109B are two disks 131A, 131B constituting cams rotating about a common axis A-A, coinciding with the supporting axis of the plates 109A, 109B. In one embodiment, each rotating cam or disk 131A, 131B carries a set of rotating cam profiles, which are preferably substantially specular to one another. Described herein after are cam profiles of the disk or cam 131B. With particular reference to FIG. 12B (which shows a front view of one of the rotating cams) and to FIG. 13, set on the disk or cam 131B are a first rotating cam profile 133, for controlling the movement of the piston 113, a second rotating cam profile 135 for controlling the movement of the seat 115, and a third rotating cam profile 137 for controlling the movement of the counter-piston 117. As can be clearly understood in particular from FIG. 12, the opposite ends of the pin 113B traverse the fixed plates 109A, 109B so as to engage not only in the two fixed cam profiles 121 but also in the rotating cam profiles 133. Practically the same applies to the two opposed pins 115A fixed with respect to the seat 115, which project through the cam profiles 123 provided on the fixed plates 109A, 109B and engage in the mobile cam profiles 135 provided on the rotating cam disks 131A, 131B. The opposed pins 117A fixed with respect to the counter-piston 117 traverse the grooves or cam profiles 125 of the plates 109A, 109B and also engage in the cam profiles 137 of the rotating cams 131A, 131B.

Basically, each of the members 113, 115 and 117 is engaged, with respective pins acting as feelers, to two pairs of cam profiles, where each pair comprises a fixed profile and a profile rotating about the common axis A-A. In this way, the mutual rotation between the fixed plates 109A, 109B and the disks or rotating cams 131A, 131B controls the translation and/or rotation movement of the members 113, 115, 117, with laws of motion that will be described in detail herein after with reference to the sequence of FIGS. 13 to 18.

Figure 13:
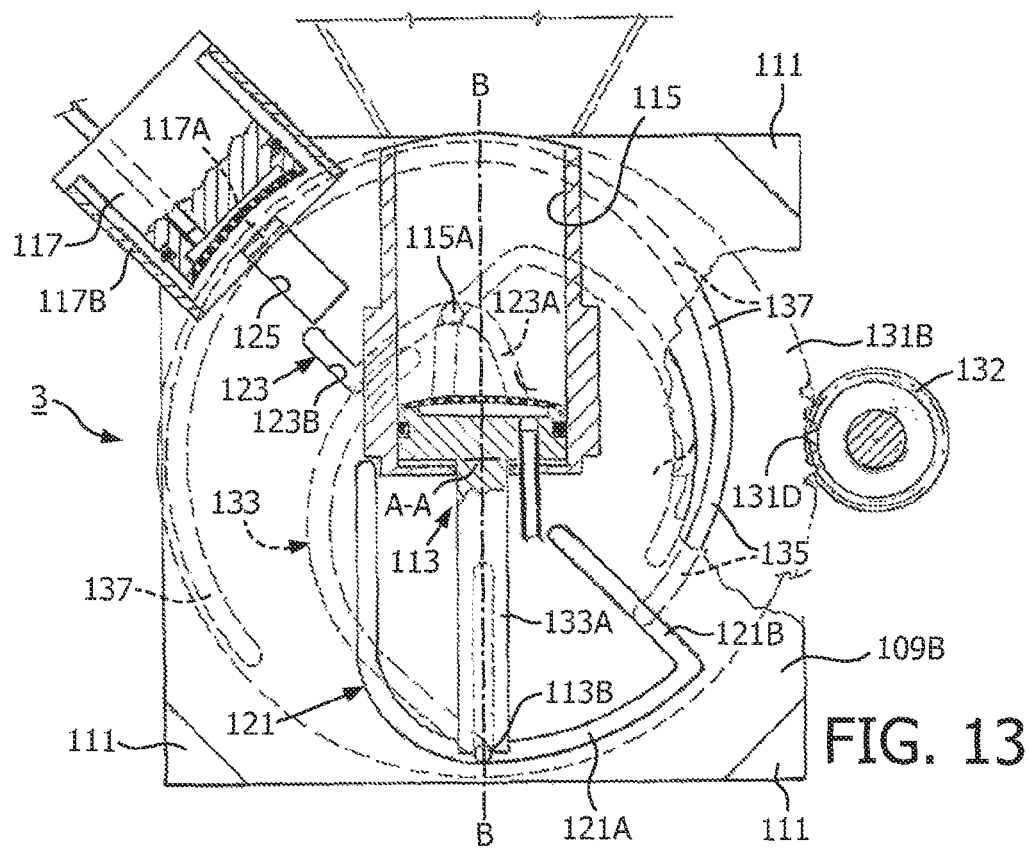
FIGS. 13 to 18 are front and partially cross-sectional views of the brewing unit of FIG. 12 in different positions of operation.

The movement of rotation of the cams 131A, 131B can be obtained for example by providing a perimetral toothing (designated as a whole by 131D in FIG. 13 for the cam 131B) with which a pair of motor-driven pinions engages (one of which is designated by 132 in FIG. 13). Not excluded is an alternative solution, for example with an axial motion transmission.

In the configuration of FIG. 13, the brewing unit 1 is in a first position, in which the coffee is charged in the opened brewing chamber, i.e., in the space defined by the cylindrical wall of the seat 115 and by the end defined by the head of the piston 113. The piston 113 is provided with a filter similar to the filter 31 of the piston 21 of the embodiment shown in FIGS. 1 to 11, and associated thereto is a similar system for collecting and discharging the beverage (coffee) obtained by extraction of the aromas from the ground coffee charged in the brewing chamber. Associated, instead, to the counter-piston 117 is a pipe for supplying the hot water under pressure. Not excluded is the possibility of reversing the arrangement of the supply of the water and of delivery of the coffee.

In the position of FIG. 13, the pin 113B fixed with respect to the piston 113 is engaged in the cam profile or grooved cam 121 in a position corresponding to a curvilinear stretch 121A of the profile 121 itself, which is set at the maximum distance with respect to the rotation axis A-A of the rotating cams or disks 131A, 131B. By passing through the thickness of the fixed plates 109A, 109B the pin 113B is also engaged, as has been mentioned above, in the grooved cams or cam profiles 133 in a position corresponding to a vertex 133A set between a substantially radial rectilinear portion 133B and a substantially rectilinear portion 133C inclined with respect to the radius of said cam profile 133.

The pins 115A fixed with respect to the seat 115 are engaged in a curvilinear portion 123A of respective fixed cam profiles or grooved cams 123 and in a position corresponding to a curve or vertex 135A of the rotating cam profiles or grooved cams 135.

Finally, the pins 117A fixed with respect to the counter-piston 117 are engaged in the rectilinear radial grooved cam or cam profile 125 and in an intermediate point of the cam profile or grooved cam 137 that has substantially the pattern of a portion of a spiral around the rotation axis A-A of the cams 131A, 131B.

Figure 14:
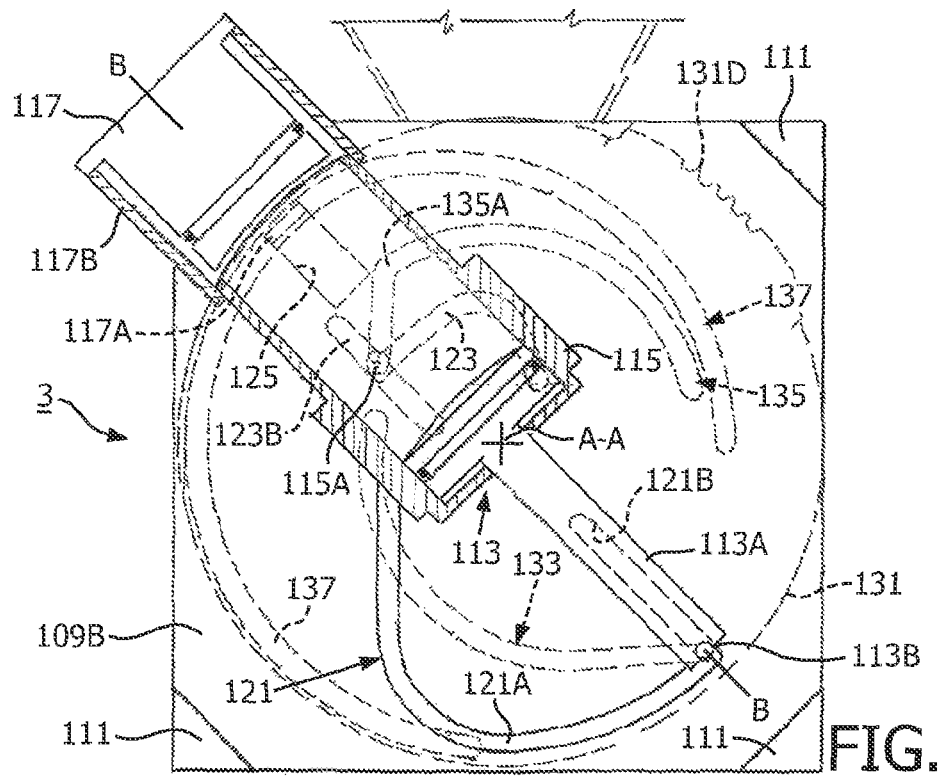

Shown in FIG. 14 is the angular position reached by the brewing unit 1 after a first rotation (in a counter-clockwise direction as viewed in the drawing) towards the brewing position. In this configuration, the axis B-B of the brewing chamber is aligned to the axis of the counter-piston 117, and the latter can be inserted within the seat 115. The angular displacement from the position of FIG. 13 to the position of FIG. 14 is obtained by drawing in rotation, via the disks or rotating cams 131A, 131B, the pins 113B and 115A fixed with respect to the piston 113 and to the seat 115 by engagement of said pins in the cam profiles 133 (for the piston 113) and 135 (for the seat 115). From the position of FIG. 13 to the position of FIG. 14 the pin 113B has been pushed by the cam profile 133 along a path 121A of the cam profile 121 substantially concentric to the axis A-A so that the piston itself has basically performed a simple rotation movement. Similarly, the pins 115A have followed a substantially circular stretch concentric to the axis A-A of the cam profile 123. Consequently, also the seat 115 has performed in this step a movement of substantial rotation without translation about the axis A-A.

Figure 15:
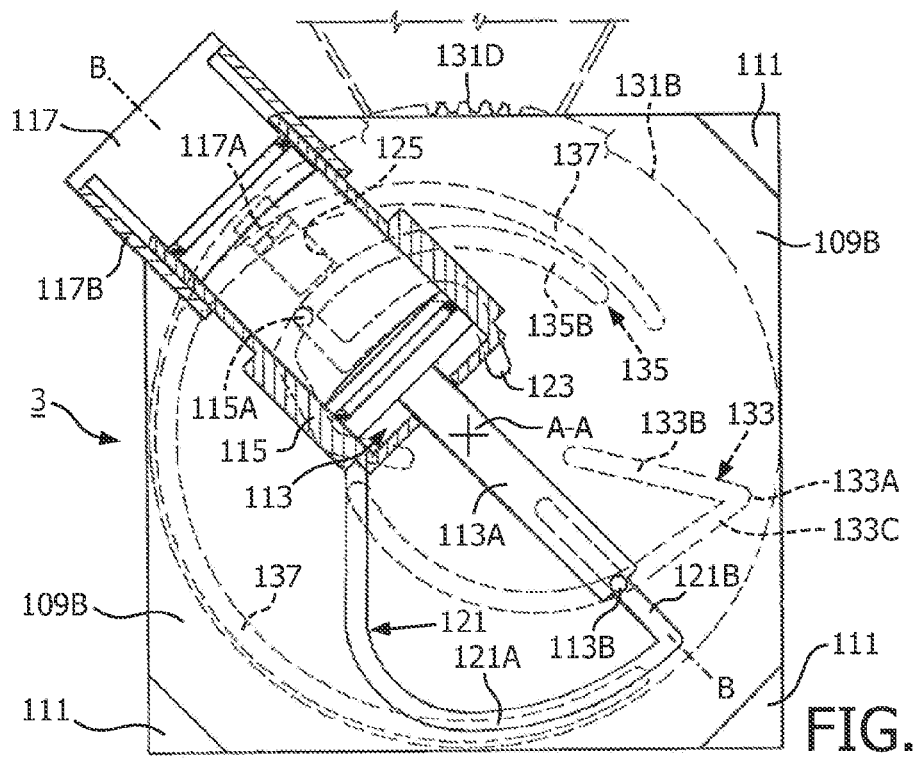

Passing from the position of FIG. 14 to the position of FIG. 15, the rotating cams or cam disks 131A, 131B have performed a further rotation about the axis A-A, which causes, by means of the rotating cam profiles 133, 135 and 137, a translation movement with respect to one another and to the fixed plates 109A, 109B of the three members: piston 113, seat or brewing chamber 115, and counter-piston 117.

As may be noted from a comparison between FIGS. 14 and 15, in particular the piston has performed a translation movement such that the pin 113B is displaced along a radial rectilinear portion 121B of the fixed cam profile 121, said movement being caused by the thrust exerted on said pin by the portion 133C of the rotating cam profile 133. The pair of pins 115A fixed with respect to the seat 115 have moved along a substantially radial rectilinear portion 123B of the fixed cam profile or grooved cam 123 as a result of the thrust on the pins 115A generated by the cam profile or grooved rotating cam 135 and more precisely as a result of the thrust exerted by a curvilinear portion 135B of said profile. The radial movement towards the rotation axis A-A of the cams or disks 131A, 131B of the counter-piston 117 along the rectilinear cam profile 125 has been obtained as a result of the thrust generated by the spiral-shaped rotating cam profile 137.

Figure 16:
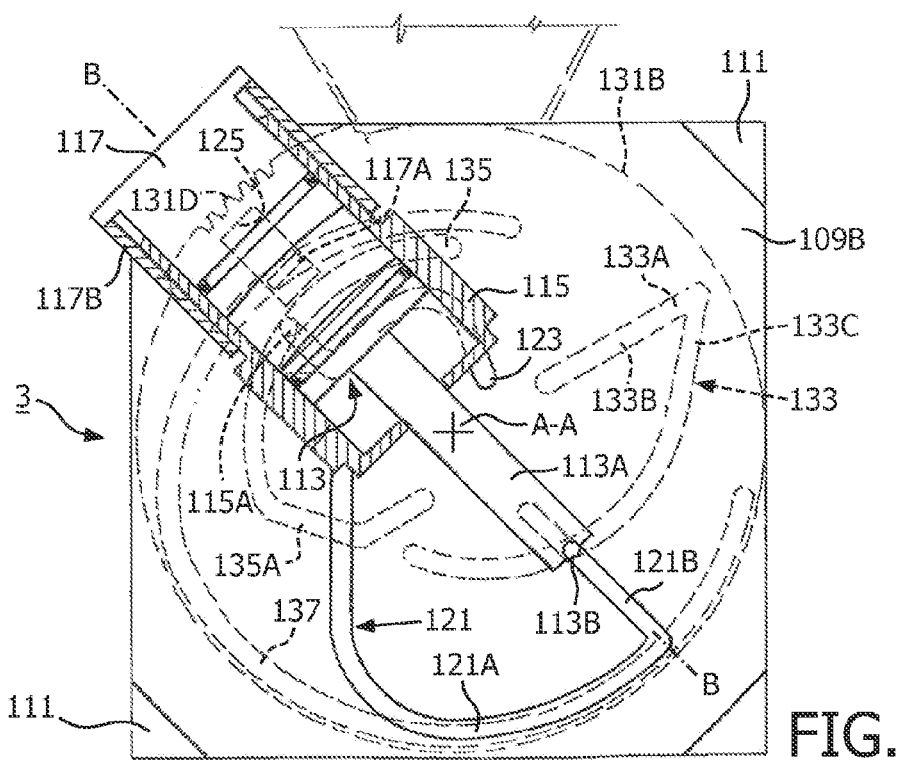
Figure 17:
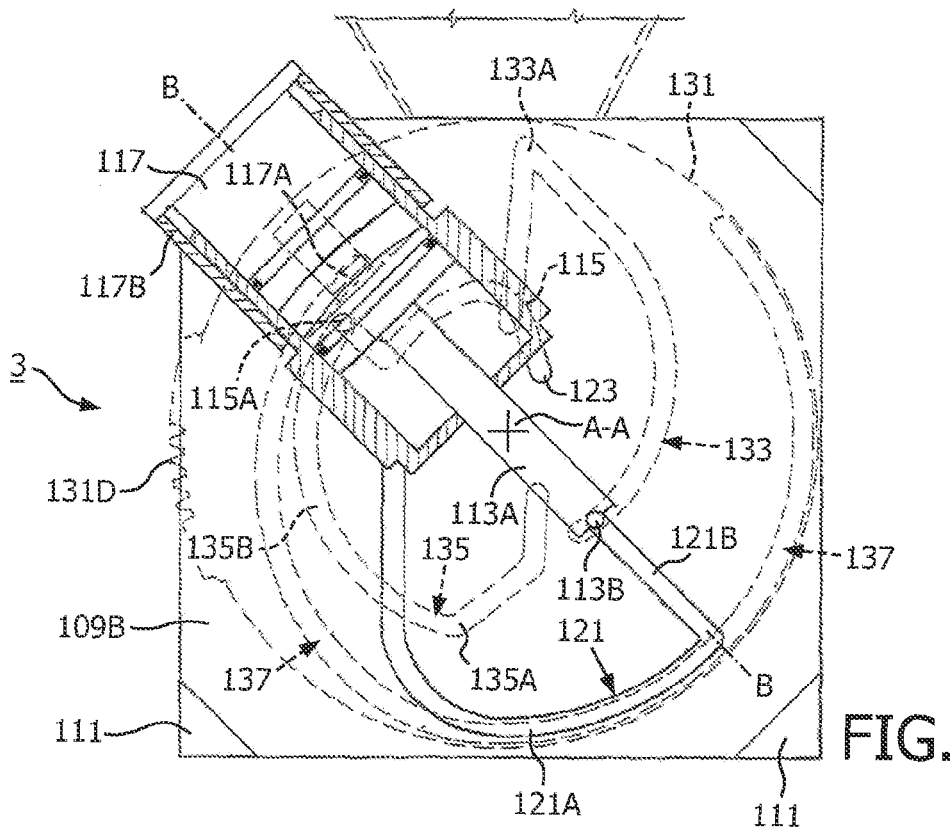

The configuration of FIG. 15 is such that the counter-piston 117 has entered the seat 115 by an amount sufficient to close via respective gaskets the brewing chamber delimited between the opposed front surfaces of the counter-piston 117 and of the piston 113 as well as by the side cylindrical surface of the seat 115. In this position, then, brewing can be carried out. This is the position in which the brewing chamber has the maximum volume possible. The subsequent FIGS. 16 and 17 show two further mutual positions of the elements 113, 115, 117 reached via further mutual translation of said components. The translations of the components 113, 115, 117 are obtained once again as a result of the thrust of the rotating cam profiles or grooved cams 133, 135 and 137 on the pins 113B, 115A and 117A, which are guided along the fixed cam profiles or grooved cams 121, 123 and 125.

More specifically, the configuration of FIG. 16 is obtained with a translation along the common axis B-B both of the counter-piston 117 and of the piston 113 with a mutual approach of the respective front surfaces, whilst the seat 115 remains in a fixed position, which corresponds to the terminal end of the rectilinear portion 123B of the cam profile 123. The position is maintained thanks to the fact that the portion 135B of the rotating cam profile 135 is substantially concentric with respect to the rotation axis A-A. From FIG. 16 to FIG. 17 there has been a further movement of mutual approach of the counter-piston 117 and of the piston 113 once again as a result of a translation movement of both of these elements with respect to the fixed plates 109A, 109B, controlled by a prosecution of the rotation movement in a counter-clockwise direction (as viewed in the drawing) of the rotating cams 131A, 131B.

It follows that also in this case the brewing unit has a plurality of possible brewing positions: in the position of FIG. 15 there is obtained a brewing chamber with the maximum volume; in the position of FIG. 16 the brewing chamber has an intermediate size; and in FIG. 17 the brewing chamber has the minimum size. The latter can be used for example for the production of a single dose of espresso coffee, whilst the position of FIG. 16 can be used for example for simultaneous delivery of two espresso coffees in a single brewing operation. The position of FIG. 15 can be used for the production of fresh brew coffee. In all cases the amount of dosed coffee within the brewing chamber can be regulated in a way in itself known.

It should be noted that the various positions of the brewing unit, corresponding to different volumes of the brewing chamber, are precisely controlled by the shape of the cams and by the angular rotation of the rotating cams, different brewing volumes being defined by different angular positions of the rotating cams 131A, 131B. In quite the same way, in the previously described embodiment (FIGS. 1-11) the volume of the brewing chamber can be precisely controlled by the angular position of the rotating unit 13 thanks to the shape of the cams 45A, 45B; 25A, 25B.

In all the positions a substantial proportion of the forces of reaction on the piston 113 and counter-piston 117 necessary for resisting the internal pressure of the brewing chamber are supplied by the cam profiles, which hence discharge the stresses directly on the fixed structure 109A, 109B, with a substantial reduction in the torsional stresses on the motor shaft that transmits the motion to the rotating cams 131A, 131B.

Once brewing has been performed in one or the other of the possible intermediate positions starting from that of FIG. 15 up to that of FIG. 17, the brewing unit discharges the spent coffee from the brewing chamber. This discharging step involves reversal of the movement of rotation of the cams 131A, 131B until the piston 113 is brought into the seat 115 and the counter-piston 117 is brought into the configuration of FIG. 18. This angular position is reached passing through the coffee charging position (FIG. 13).

Figure 18:
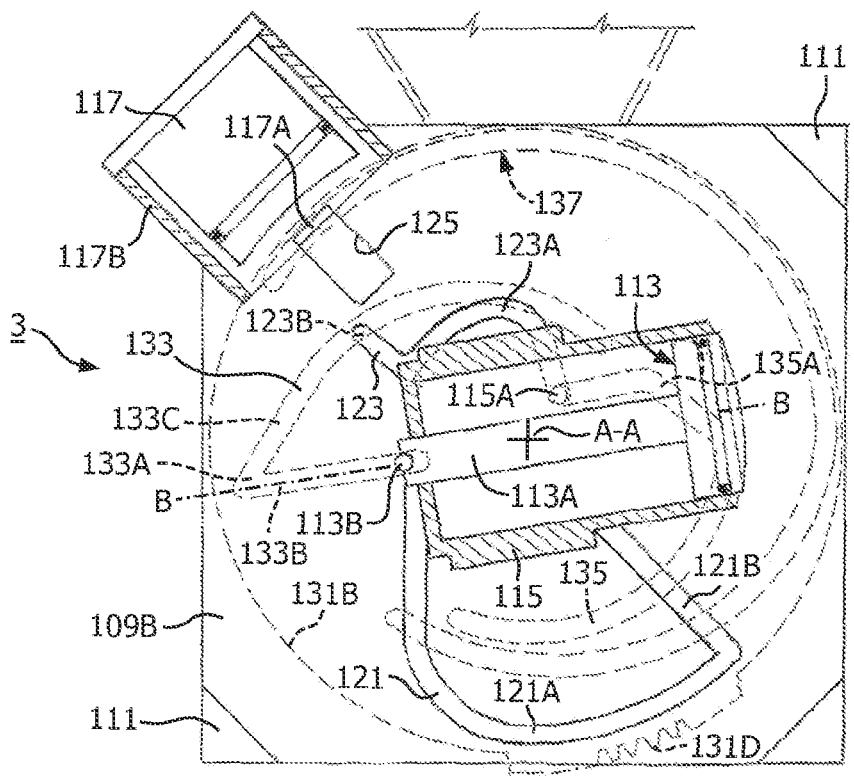
Figure 21:
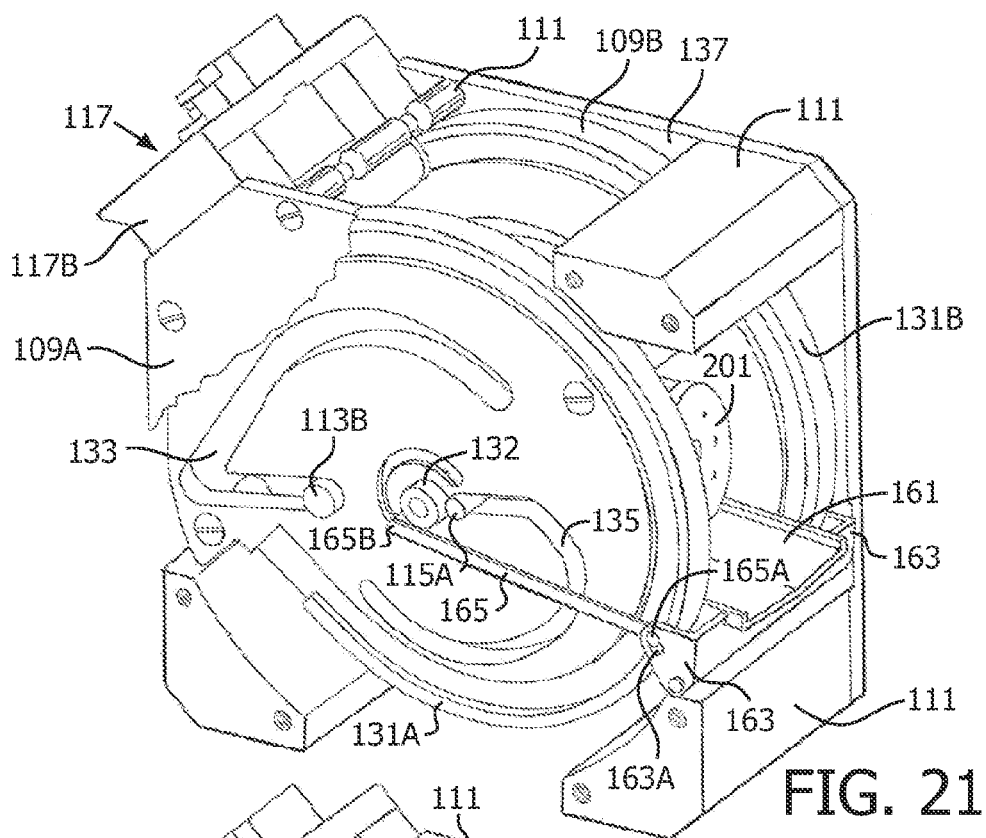
Figure 22:
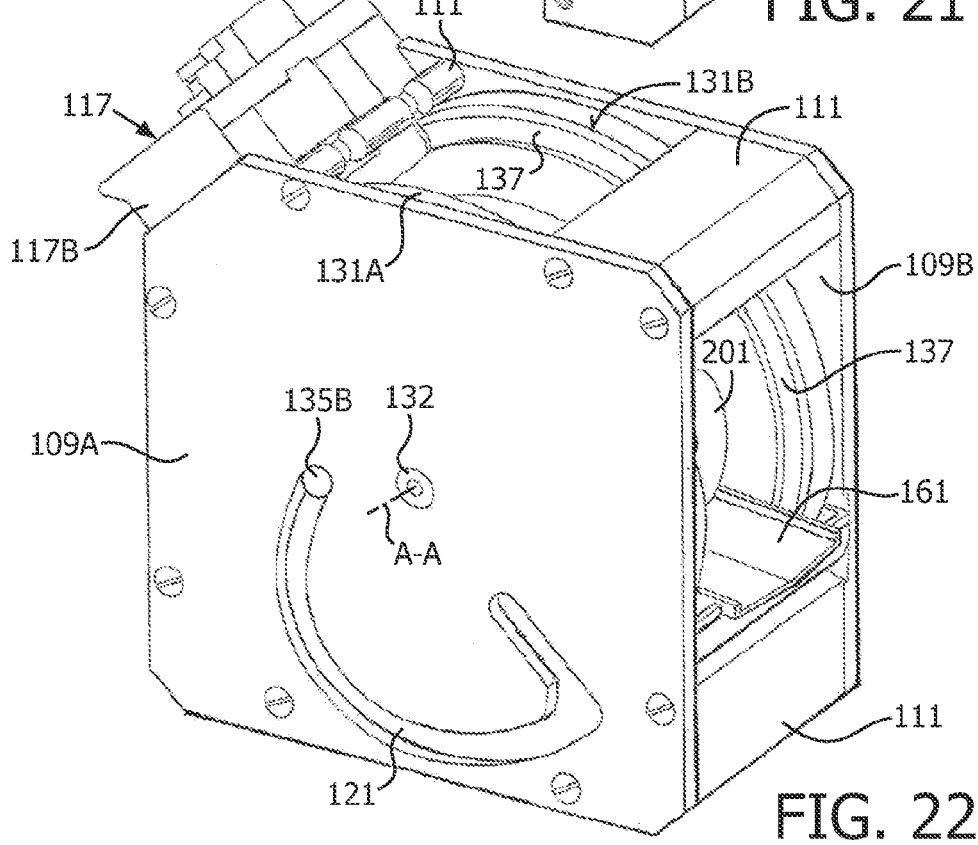
FIG. 22 is a view similar to the view of FIG. 21, but without parts removed.
Figure 33:
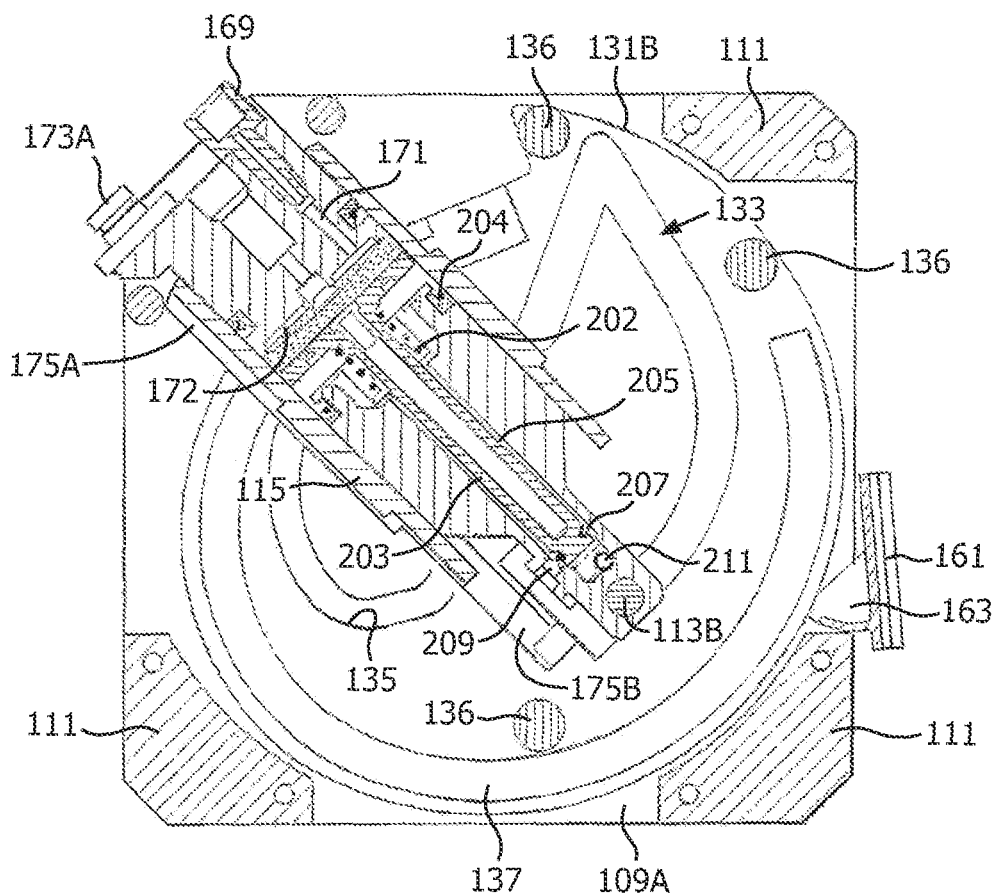
FIGS. 33 and 34 are cross-sectional views similar to those of FIGS. 30 and 32, with the brewing unit in the step of closing of the brewing chamber.
Figure 34:
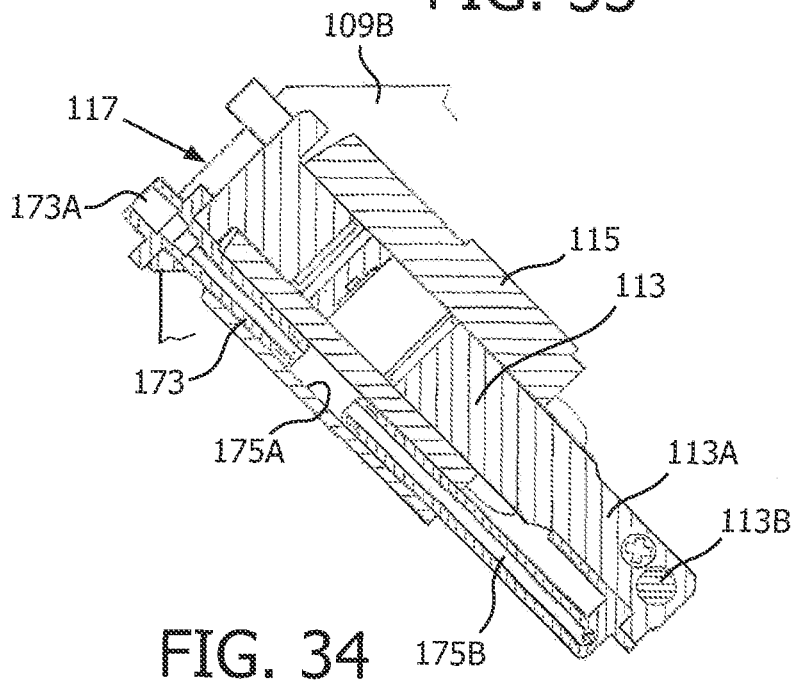
Figure 35:
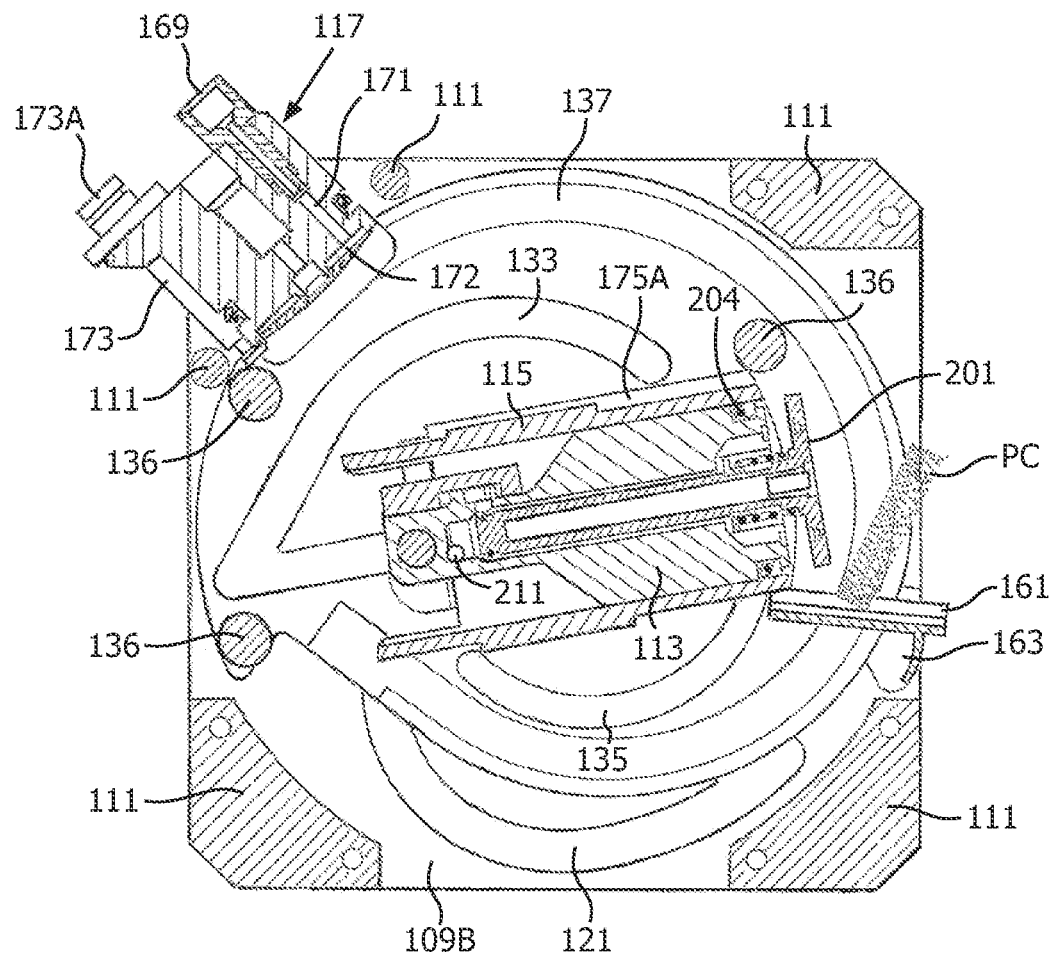
FIG. 35 is a cross-sectional view similar to that of FIGS. 30 and 33, with the brewing unit in the configuration for discharge of a spent cartridge of coffee.
Figure 40:
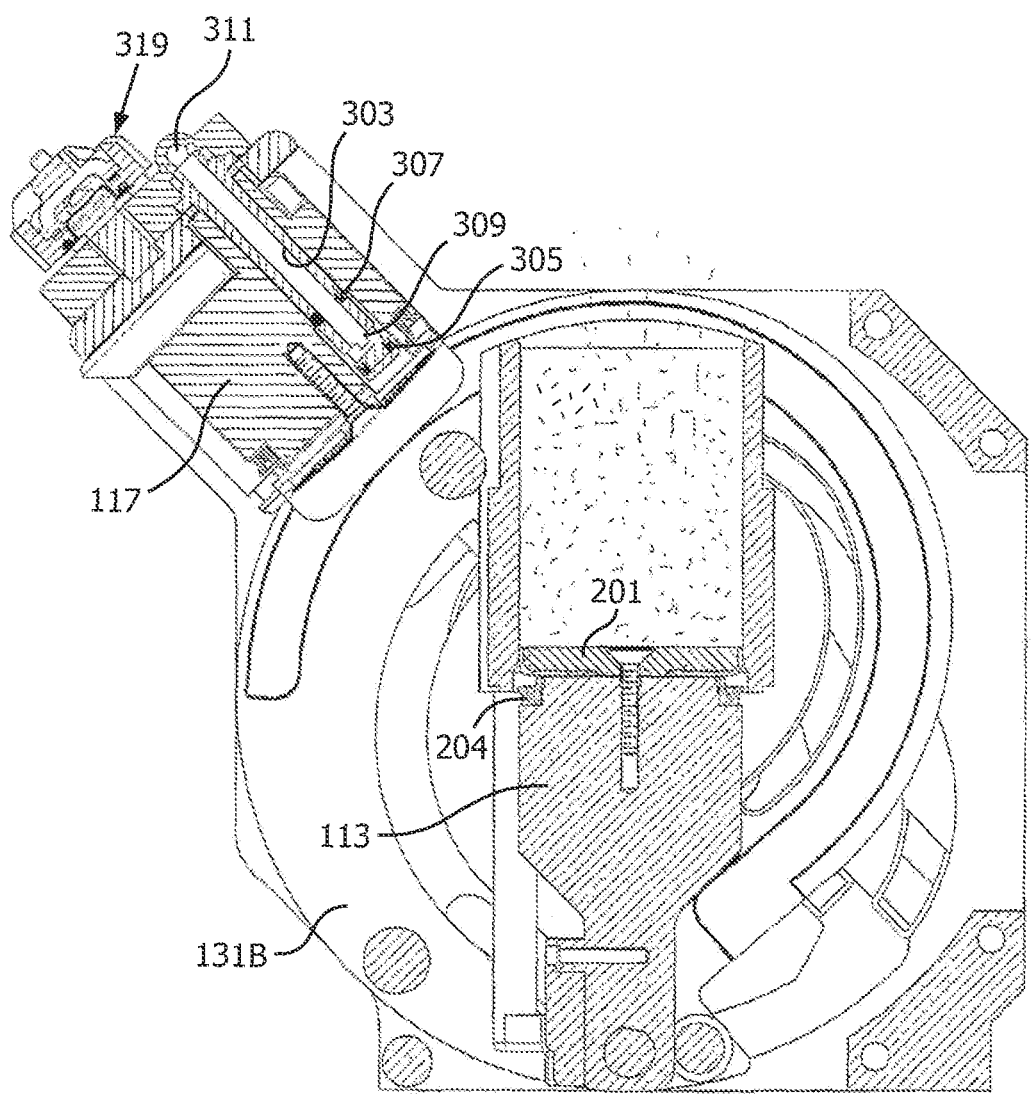
FIGS. 40-45 show cross sections of a further embodiment of the brewing unit according to the invention in different operating positions.

The shape of the fixed and mobile cam profiles is such as to cause, with this reverse rotation movement, the displacement by translation of the counter-piston 117 into the position of maximum distance from the rotation axis A-A, as well as the angular rotation of the seat 115 and of the piston 113 from the position of FIG. 17 to the position of FIG. 18 with a rotation of the axis B-B through an angle a, and the translation both of the seat 115 and of the piston 113 along the axis B-B in such a way that the piston 113 is positioned with its head flush with or slightly projecting from the seat 115 so as to push outside said seat the spent cartridge of compressed ground coffee. In the discharge area a scraper can be provided for facilitating detachment of the coffee from the front surface of the piston 113.

As may be noted in particular from a comparison between FIGS. 13 and 18, in the discharge position the seat 115 has undergone an oscillation or rotation through approximately 80° with respect to the vertical and a translation that has caused recession thereof, whilst the piston has undergone a similar rotation through approximately 80° with respect to the vertical position of FIG. 13 and an advance by translation by an amount substantially corresponding to the axial extension of the seat 115.

A reverse movement through approximately 80° from the position of FIG. 18 brings the brewing unit back into the position of FIG. 13 ready for a new brewing cycle.

Embodiment of FIGS. 19 to 39

FIGS. 19 to 39 show an embodiment similar to that of FIGS. 12 to 18, with some constructional variations, which will be described in greater detail herein after. The same reference numbers designate parts that are the same as or equivalent to those of FIGS. 12 to 18.

In the first place, it may be noted that in the embodiment shown in FIGS. 19-39, the fixed plates 109A, 109B, in which the fixed cam profiles 121, 123 and 125 are provided, are arranged on the outside, whilst the mobile cams 131A, 131B are arranged inside the fixed plates.

The movement to the rotating cams 131A, 131B is supplied, instead of via pinions meshing with gears provided on the cams themselves, by means of an hexagonal shaft 134 (FIGS. 28 and 29) fixed with respect to one of the two cams 131A, 131B, whilst the other cam 131B, 131A (FIGS. 26 and 27) is constrained to the former via cross members 136 and has a, hub 132 that constitutes a coupling and support with the corresponding fixed plate. The hexagonal shaft 134 is coupled to a motor shaft of an electric motor (not shown) forming part of the machine in which the assembly is inserted. It may be understood that the mechanical coupling between the brewing unit and the motor can assume also a different shape, for example with a grooved profile or some other.

The shapes of the cam profiles are substantially similar (see in particular FIGS. 23-29) to those of the previous embodiment and are designated by the same reference numbers. On the other hand, as regards in particular the cam profile 137, it may be noted that it is a double profile (see in particular the cross section local of FIG. 20A), i.e., each cam 131A, 131B has a double groove 137, engaging in which is a corresponding double feeler constrained to the counter-piston 117. In this way, the resistance of the cams to the stresses that are discharged thereon as a result of the pressure that is generated in the chamber during the brewing increases.

In addition, the portion 135B of the cam 135 is not concentric to the rotation axis A-A of the cams so that in the closing movement of the brewing chamber, after the counter-piston and the seat 115 are engaged to one another, when the cams 131A, 131B rotate, the seat 115 is displaced along the axis A-A of the piston and of the counter-piston.

The fixed cam 125 for the counter-piston 117 is larger, and it is engaged not by a pin fixed with respect to the counter-piston 117, but rather directly by the bracket 117B, which in this case has no pins 117A. In this embodiment, in order to engage the bracket 117B of the counter-piston 117 to the double grooved cams 137 an oscillating feeler 117C (FIGS. 20, 20A) for each double groove 137 is envisaged. The oscillating feeler 117C has two opposed appendages 117D that engage one in each of the two grooves of the respective cam 137.

In addition, the brewing unit of FIGS. 19-39 comprises a mechanism for facilitating discharge of the spent product (tablet of ground coffee) after brewing. Said mechanism comprises an oscillating surface 161 hinged via two oscillating arms 163 to the two fixed plates 109A, 109B. The oscillation of the surface 161 is controlled via a tie rod-strut 165, hinged at one end to one of the two oscillating arms 163 via a slot 163A and a pin 165A. At the opposite end, the tie rod-strut 165 has a pin 165B that engages in a cam profile 167. The fixed plate 109A has a rectilinear groove 168 (FIG. 23), in which the tie rod-strut 165 is guided in its movement controlled by the cam 167.

As may be noted from the movement of the brewing unit, shown in FIGS. 19-22 and 30, 33, 35, the cam 167 controls the oscillation movement of the surface 161 in such a way that the tablet of coffee (PC, FIG. 35), or other spent product that comes out from the brewing chamber at the end of the cycle, is discharged into a container set clear of the brewing unit and not shown.

The mechanism described above for discharge of the spent tablets can be used also in the previously described embodiments.

FIGS. 30-35 show in detail the circuit for supplying the hot water to the brewing unit and for delivering the coffee from the brewing chamber, as well as the operation thereof during the brewing cycle. This circuit can be used also in the previously described embodiments.

In particular, associated to the counter-piston 117 is a valve for regulating the counter-pressure, designated by 169, set on a coffee outlet pipe 171, in communication with the compartment provided behind a filter 172, made for example of perforated metal plate, which prevents exit of solid product (e.g., ground coffee) from the brewing chamber during the brewing cycle. The counter-pressure regulating valve 169 can be designed, for example, as described in U.S. Pat. No. 6,382,083.

Fixed with respect to the counter-piston 117 is a connection 173 for supplying hot water coming from a boiler (not shown and of a known type). Designated by 173A is one end of the connector 173, connected to which is the supply pipe coming from the boiler. Fixed with respect to the seat 115 is a first portion 175A of a telescopic pipe, of which designated by 175B is a second portion, fixed with respect to the piston 113. The two portions 175A, 175B of the telescopic pipe are always joined to one another (see in particular FIG. 34), and the portion 175B slides within the portion 175A following the movement of the piston 113 in the seat 115. Instead, the connector 173 can be engaged and disengaged with respect to the portion 175A, depending upon the relative position between the counter-piston 117 and the seat 115. When the connector 173 is engaged in the portion 175A of the telescopic pipe 175A, 175B (FIG. 34), a continuous path for the hot water is formed from the connection 173A to the bottom portion of the stem or pin 113B of the piston 113. Said stem is centrally hollow to enable passage of the hot water along the stem as far as the brewing chamber. This position is assumed when the parts 113, 115 and 117 that form the brewing chamber are aligned axially and engaged to one another. In the position where charging of the product takes place in the brewing chamber (FIGS. 30-32) and in the position where discharge of the spent product takes place (FIG. 35), instead, the connector 173 is disengaged with respect to the telescopic pipe 173A, 173B.

In some embodiments of the invention, the piston 113 can have a configuration of the type shown in particular in FIGS. 36-39. It has a perforated cap 201, fixed with respect to a rod 203 which slides in an axial sliding seat 205 made in the body of the piston 113 and of the stem or rod 113A. The cap 201 is perforated in 201A for enabling passage of the hot water under pressure coming from the telescopic pipe 175A, 175B and the distribution of the water in the ground coffee (or other product for preparation of the beverage) compressed within the brewing chamber defined between the piston 113, the counter-piston 117, and the seat 115. At the end opposite with respect to the cap 201 the rod 203 has an annular gasket 207, for example an O-ring, which provides a seal on the sliding seat 205.

The sliding seat 205 is in communication with the telescopic pipe 175A, 175B via a port 209, provided in the stem 113A of the piston 113.

The cap 201 is elastically loaded by an elastic member, for example a helical compression spring 202, towards a position set at a distance from the body of the piston 113. The body of the piston 113 is provided with a lip seal 204, which provides a seal on the internal cylindrical surface of the seat 115 where the piston slides. When the brewing chamber is closed with the ground coffee inside it, the relative movement between the piston 113 and the counter-piston 117 causes squeezing of the spring 202, and hence the cap 201 bears upon the front part of the body of the piston 113, whilst the gasket 207 moves underneath a port 209, which is in fluid connection with the telescopic pipe 175A 175B. In this way, with the gasket 207 set underneath the port 209, the latter is set in connection with the space with annular cross section between the axial sliding seat 205 and the stem 203 of the cap 201. Said seat has, in fact, a diameter larger than the diameter of the stem 203, the latter being guided via a top bushing 206, and the bottom portion of the sliding seat 205, which has a cross section with smaller diameter, such as to enable sealing with the O-ring 207.

In this way, the water is fed by the connector 173 through the telescopic pipe 175A, 175B and along the annular space between the axial sliding seat 205 and the stem 203 and reaches the space behind the cap 201. Through the holes 201A of the cap 201 the water reaches the brewing chamber and traverses the ground coffee compressed in the brewing chamber.

Once preparation of the beverage is completed, when the brewing chamber is opened, the cap 201 pushed by the helical spring or other equivalent elastic member 202 is displaced moving away from the body of the piston 113. In this way, the annular gasket 207 is displaced above the port 209 and sets the port 209 (and hence the telescopic pipe 175A, 175B and the boiler) in connection with a hollow space 211A provided in the bottom part of the stem 113A of the piston 113. The hollow space 211A is connected to the outside environment via two discharge ports 211B. The residual water in the supply pipe between the boiler and the port 209 is in this way discharged towards the outside, and the increase in volume of the brewing chamber due to the relative movement between the piston 113, the seat 115, and the counter-piston 117 before opening of the brewing chamber does not cause a suction effect within the hydraulic circuit. The pressure within the brewing chamber reaches the atmospheric pressure thanks to the connection obtained through the seat 205, the port 209, the space 211A, and the ports 211B. The gasket 207, in fact, is set (when the compression spring 202 is not squeezed) in a position of the seat 205 in which the latter has a diameter greater than the diameter of the gasket 207, With the mechanism described above it is possible to set the brewing chamber in connection with the boiler thanks to the pressure exerted by the compressed ground coffee on the cap 201, said pressure overcoming the elastic forces of the spring 202 and hence causing displacement of the gasket 207 underneath the port 209. At the same time, the fact that said pressure ceases, upon opening of the brewing chamber, enables discharge of the residual water in the hydraulic pipe between the piston 113 and the boiler. In the absence of further arrangements, a system thus devised would not enable a washing and/or heating cycle of the brewing chamber in the absence of coffee, since under the thrust of the spring 202 the cap 201 would remain raised from the body of the piston 113 even with the brewing chamber closed, and hence the gasket 207 would not close the passage between the port 209 and the underlying hollow space 211, in communication with the external environment via the ports 211B.

In order to enable also washing and heating operations to be performed or in any case to allow the flow of water through the brewing chamber in the absence of ground coffee, in some embodiments of the invention associated to the piston 113 are two sliders 213 (see in particular FIGS. 38, 39) housed in sliding seats 215, transverse with respect to the axial sliding seat 205 and made in the bottom part of the body or stem of the piston 113. The sliding seats 215 are in connection at the front with the hollow space 211A, and the ports 211B intersect said sliding seats. The sliders 213 are provided with annular gaskets 217 set in the proximity of the ends of the sliders 213 facing the space 211A. Said annular gaskets 217 are set in such a way that, depending upon the axial position assumed by the sliders 213 in the respective transverse sliding seats 215, they open or close the connection between the hollow space 211A and the ports 211B. In FIG. 38 the sliders 213 are pushed towards the outside by the respective springs 219 and are in a position such that the gaskets 217 do not close the passage between the hollow space 211A and the relief or discharge ports 211B. In FIG. 39, instead, the sliders 213 have been pushed axially within the sliding seats 215, and the gaskets 217 close the passage between the hollow space 211A and the discharge or relief ports 211B.

In order to control the sliding movement of the sliders 213, these are provided with external ends 213A acting on which are front cam profiles (designated as a whole by 214 for simplicity of illustration just in FIGS. 38 and 39) fixed with respect to the rotating cams 131A, 131B, for pushing the sliders within their seats. The reverse movement is obtained via helical springs 219. The cam profiles for controlling the movement of the sliders 213 are set on the cams 131A, 131B in such a way that the sliders 213 are in the closing position (in which they interrupt the connection towards the outlet ports 211B), when the brewing chamber is closed and whatever the closing position of the chamber, as well as whatever the condition of the chamber (whether full or empty).

In this way it becomes possible to cause circulation of hot water through the brewing chamber even without ground coffee being present therein. Instead, when the brewing chamber is not in the closed position, the ports 211B are in connection with the water supply pipe and enable bleeding-off of the residual water from the circuit.

Embodiment of FIGS. 40 to 45

FIGS. 40-45 show cross sections of a further embodiment of a brewing unit similar to the embodiment of FIGS. 19 onwards. Same or corresponding parts are designated with the same reference numbers and are not described in detail again. The embodiment of FIGS. 40-45 differs from the embodiment of FIGS. 19 onwards in two respects.

Figure 41:
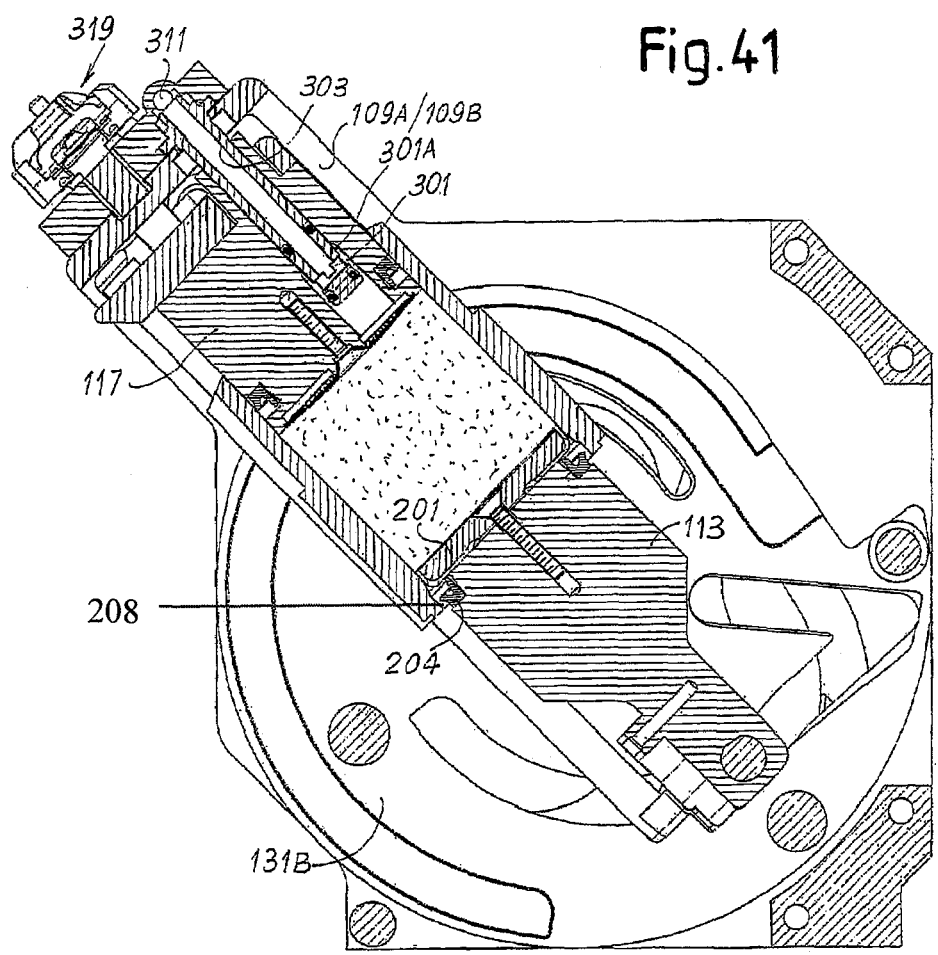
Figure 42:
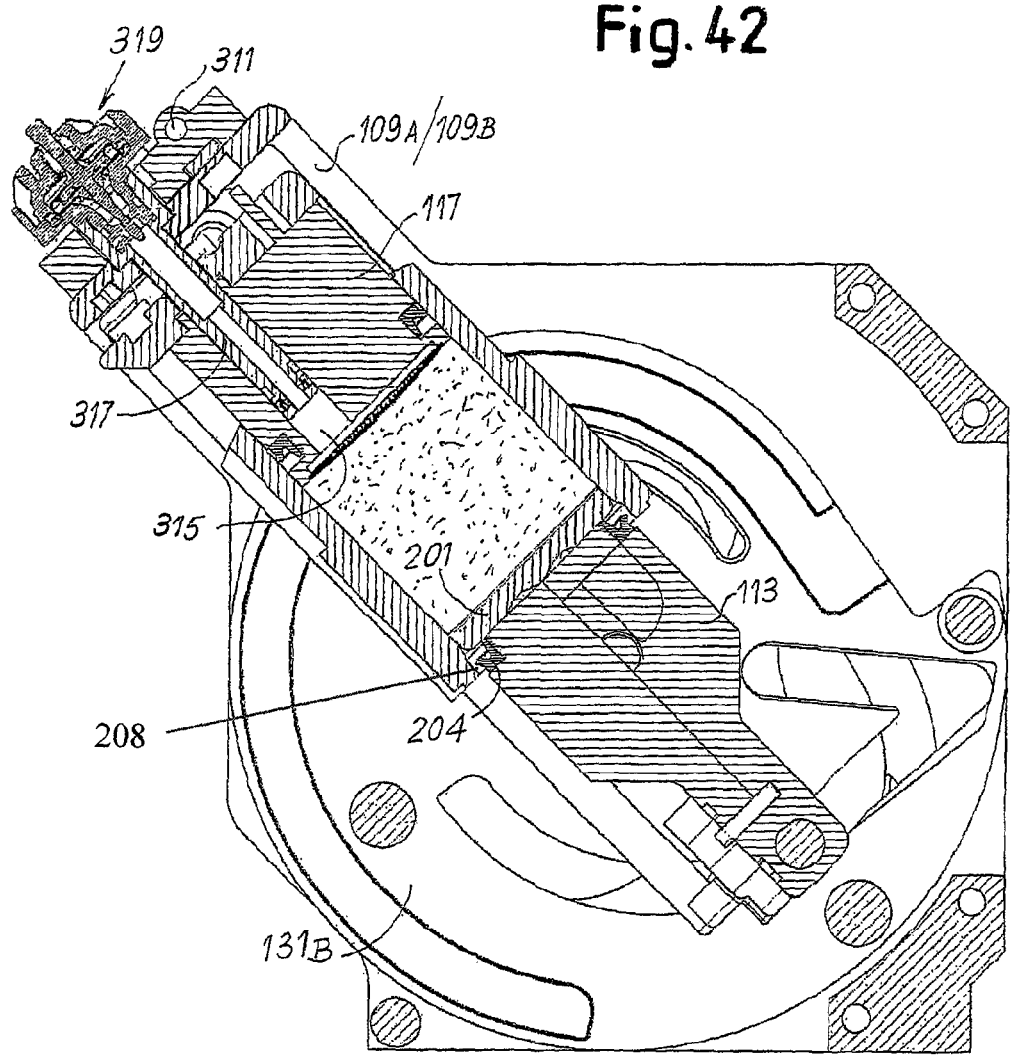

According to a first aspect, the brewing unit shown in FIGS. 40-45 is provided with an additional operating position, best shown in FIGS. 41 and 42. Said additional operating position is intermediate between the coffee charging position shown in FIG. 40 and a brewing position shown in FIG. 43. In said intermediate position, the seal 204 surrounding the body of piston 113 does not create a seal with the seat 115, such that an annular aperture 208 is created between piston 113 and seat 115. If hot water is fed towards the brewing chamber in this position, the coffee powder present in the brewing chamber generates a counter-pressure impeding the water flow. As a consequence, water flows through the annular aperture 208 surrounding the piston 113 and thus heats the entire water duct from the water heater to the bottom of the brewing chamber.

Figure 43:
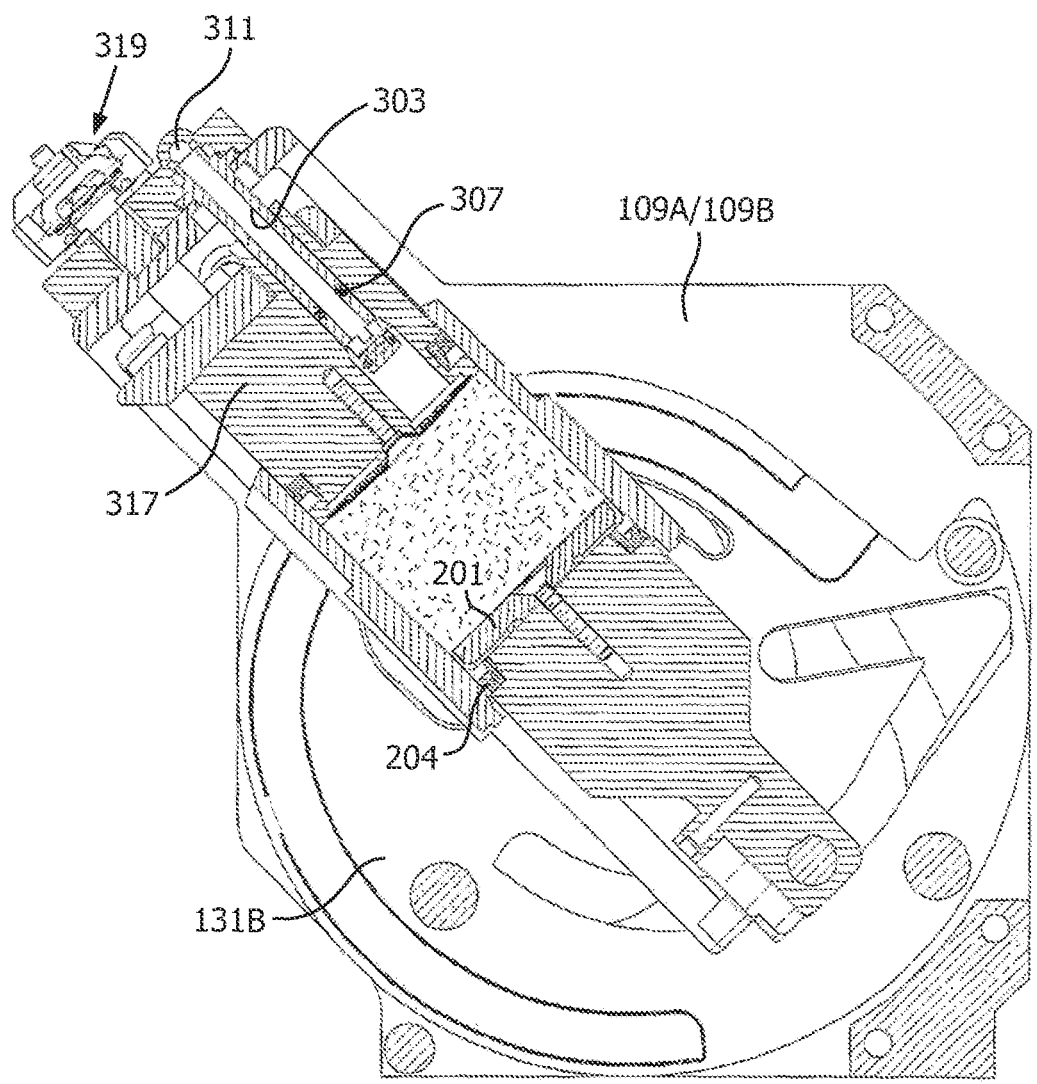
Figure 44:
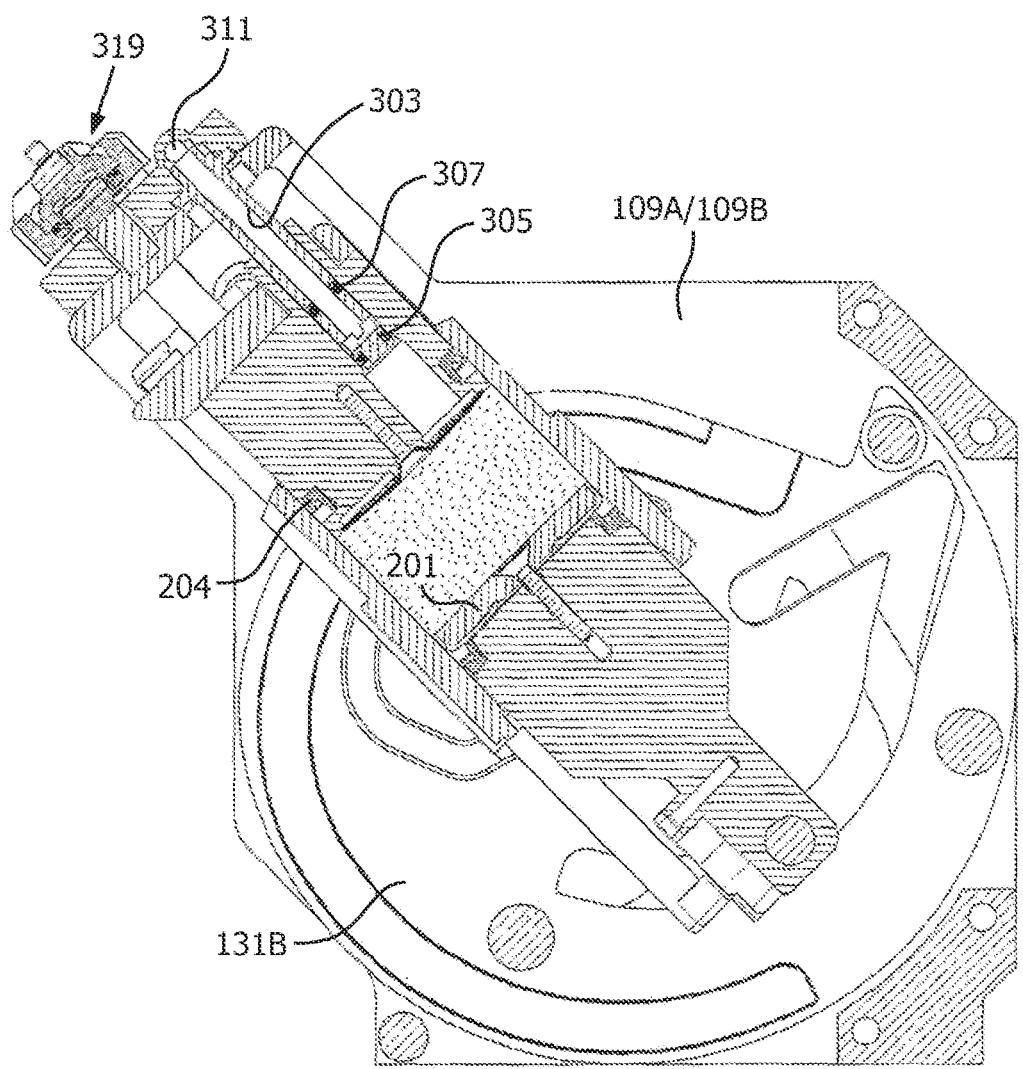
Figure 45:
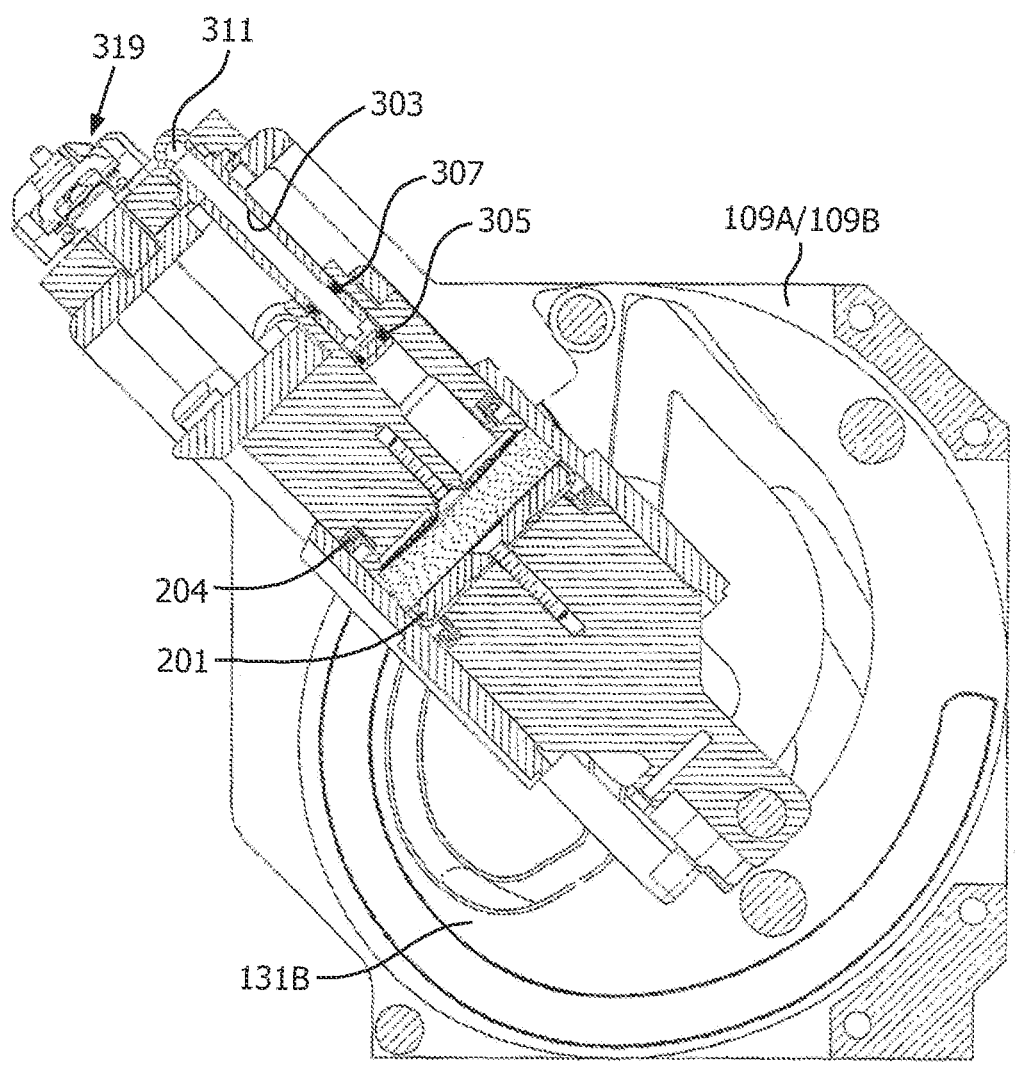

Once sufficient hot water has been fed to heat the brewing unit, the latter takes one of the coffee dispensing positions shown in FIGS. 43, 44, 45. Continued water flow now passes through the compressed coffee powder contained in the brewing chamber and extracts the beverage from the coffee powder. The three positions shown in FIGS. 43, 44 and 45 correspond to three different dispensing conditions: in FIG. 43 regular coffee (so-called filter coffee or "American coffee") is produced, with a rather low water pressure and slightly compressed coffee powder; the position of FIG. 44 is one in which two espressos (or a double espresso) are produced during one and the same brewing cycle; and finally, FIG. 45 shows the position taken by the brewing unit to produce a single espresso.

As mentioned previously, an adjustable counter-pressure valve can be provided on the exit port, in fluid connection with the brewing chamber, in order to maintain the desired pressure in the brewing chamber. In the embodiment of FIGS. 40-45 a dual-port arrangement is provided, for optimal pressure control. This dual-port arrangement, which will be described here below, can be used also in any one of the previously described embodiments. In order to show the dual port arrangement, the cross section of FIG. 42 is taken at a position slightly different from the cross-section of the remaining FIGS. 40,41, 43, 44, 45. These latter figures show the first beverage outlet port provided in the body of counter-piston 117, said port being formed by a duct 301. The duct 301 has a first portion with a larger diameter and a second portion with a smaller diameter, the two portions being connected to one another at a transition zone 301A. A pipe 303 stationarily supported with respect to the structure 109A, 109B is telescopically arranged in duct 301, such that when the counter-piston 117 moves with respect to the structure 109A, 109B the pipe 303 and the duct 301 slide one with respect to the other. The duct 303 is provided with a first annular seal 305 and a second annular seal 307, arranged near the distal end and at an intermediate position of pipe 303, respectively. The distal end of the pipe 303 is closed at the front and is provided with radial apertures 309, said apertures being provided behind the seal 305.

The pipe 303 can thus place the interior of the brewing chamber in fluid communication with a coffee outlet duct 311 arranged on top of the structure 109A, 109B. When the brewing unit takes the position shown in FIG. 43, the apertures 309 are positioned between the brewing chamber and the transition zone 303A of the duct 303, such that the coffee beverage produced in the brewing chamber can flow through the apertures 309 into the duct 303 and therefrom to the outlet duct 311. The flow cross section is such that substantial zero over-pressure is generated at the exit of the brewing chamber.

A second beverage dispensing port is provided in the body of counter-piston 117, as shown in FIG. 42 at 315. The second beverage dispensing port 315 is formed by a duct into which a pipe 317 is telescopically arranged. Similar to pipe 303, also pipe 317 is integrally supported by the structure 109A, 109B. The duct 315 and pipe 317 arrangement fluidly connect the interior of the brewing chamber with a counter-pressure valve 319. This valve can be adjustable and can be designed as disclosed in U.S. Pat. No. 6,382,083, the content of which is incorporated herein by reference.

When the brewing chamber closes in the position shown in FIG. 43, the coffee flows through duct 301, 303, which offers less flow resistance. If, conversely, the brewing chamber closes in the position shown in FIGS. 44 or 45, flow through ducts 301, 303 is prevented, because the apertures 309 are placed beyond the seal 305 and the latter closes against the narrower portion of the duct 301. Consequently, under the thrust of the water-feeding pump of the machine, the coffee is forced to flow through port 315, pipe 317 and counter-pressure valve 319.

Therefore, depending upon the position taken by the brewing chamber, different counter-pressure conditions are generated and a beverage of different qualities is produced.

Counter-Pressure Adjustment Valve of FIGS. 46A-46D

FIGS. 46A-46D show a novel counter-pressure valve for a brewing unit according to the invention. The valve is shown in isolation but it should be understood that said valve can be arranged on the outlet duct through which the coffee beverage produced in the brewing chamber of the brewing unit is dispensed. Said valve can be arranged for example on the coffee-outlet pipe 171 (FIG. 30).

The counter-pressure valve 400 is provided with a coffee dispensing duct 401 in fluid connection with the brewing chamber and carried by the counter-piston of the brewing unit, such as the counter-piston 117. The duct 401 can be telescopically sliding within a coffee-outlet pipe such as pipe 171, such that the counter-piston 117 can move with respect to the supporting structure on which the counter-pressure valve 400 is supported.

The counter-pressure valve 400 includes an external housing 403. According to some embodiments, for design purposes said external housing 403 is comprised of two portions 403A, 403B. A slider 405 is slidingly housed in the housing 403. Said slider 405 can slide according to double arrow f405 to selectively take one of several operating positions as disclosed herein below. In some embodiments the slider 405 has a threaded end 405A which can be engaged by a manual actuator member or a servo-motor or the like (not shown) to control the sliding movement of said slider and accurately positioning the slider in a selected one of a plurality of axial positions in the housing 403.

Along its side wall the housing 403 has a coffee inlet port 407 in fluid communication with the duct 401, a coffee outlet port 409 in fluid communication with a spout or nozzle from which coffee is dispensed, and a pressure relief port 411. Additionally, a front air-intake port 412 is provided in a front position. The inner diameter of the portion 403A of housing 403 is variable stepwise, with a larger diameter in the section where the relief port 411 is arranged, an intermediate diameter where the coffee inlet port 407 is positioned and a smaller diameter in the foremost area.

The slider 405 has an axial cavity 413 ending with a front opening 413A and in fluid communication with two sets of radial apertures 415, 417 longitudinally distanced from one another. Sealing rings 419, 421, 423 are arranged on the outer surface of the slider, acting in correspondence of the three portions of variable diameter of the housing portion 403A. The front opening 413A of the slider 405 is closed by a shutter or closing member 427 elastically stressed against the slider 405 by a helical compression spring 429. Said spring 429 is retained between the shutter 427 and a front sliding pin 431 provided with a sealing ring 433, which closes the front air-intake port 412. The pin 431 is provided with an abutting ring 431A and terminal portion projecting from the housing 403, shaped such as to provide a guiding effect in the air-intake port 412 but allowing the ingress of air when the pin 431 is moved to the left (in the drawings), in order to place the interior of the housing 403 and of the slider 405 in communication with the environment, for the purposes to be explained later on.

Figure 46A:
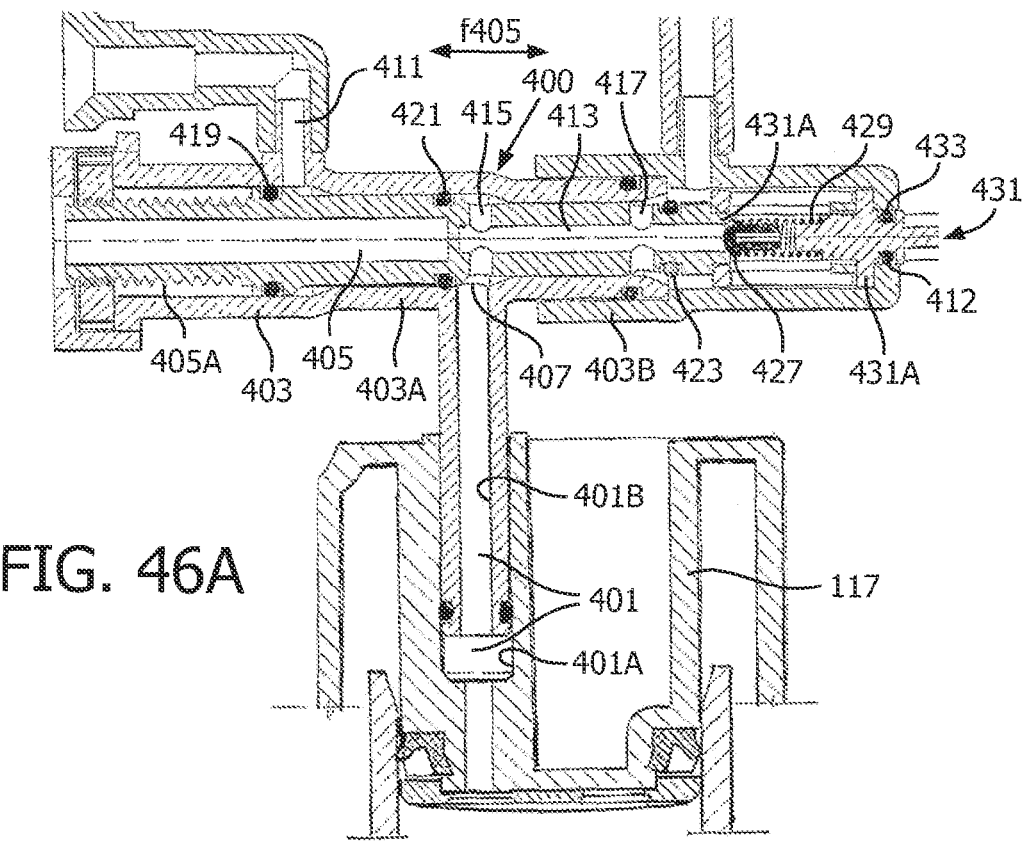
FIGS. 46A-46D show a counter-pressure adjustment valve in various possible operating positions.

The valve 400 so far described operates as follows. In FIG. 46A the slider 405 is positioned in its right-most position (with reference to the figures), i.e. with the spring 429 in its maximum compression position. The sealing ring 423 is moved beyond the section of housing portion 403 having the intermediate inner diameter, and the radial apertures 417 are thus in fluid communication (through the cavity of housing portion 403B) with the coffee outlet port 409. The coffee inlet port 401 is in fluid communication, via radial apertures 415, with the inner axial cavity 413 of the slider 405. The coffee can thus flow from the inlet port 401 towards the outlet port 409. The pressure in the duct 401 is therefore substantially equal to the environment pressure (i.e. brewing takes place at substantially zero counter-pressure). Coffee flow through relief port 411 is prevented by sealing ring 421 and the spring 429 keeps both the front opening 413A as well as the air-intake port 412 in a closed position.

Figure 46B:
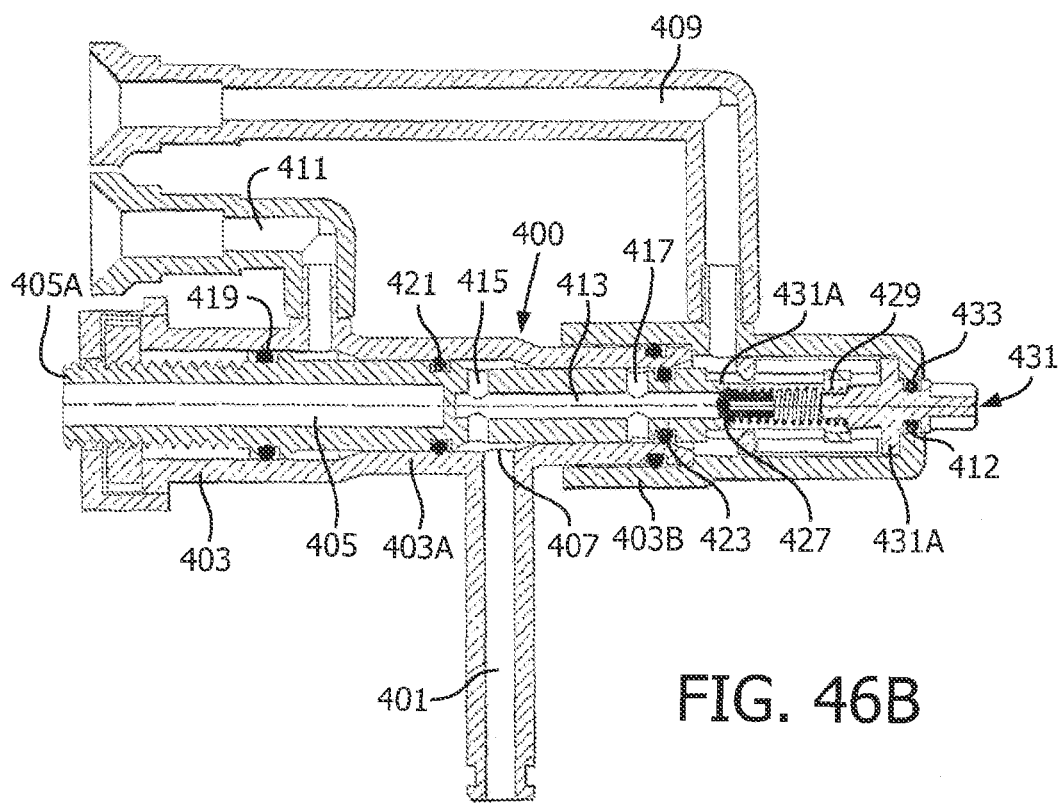
Figure 46C:
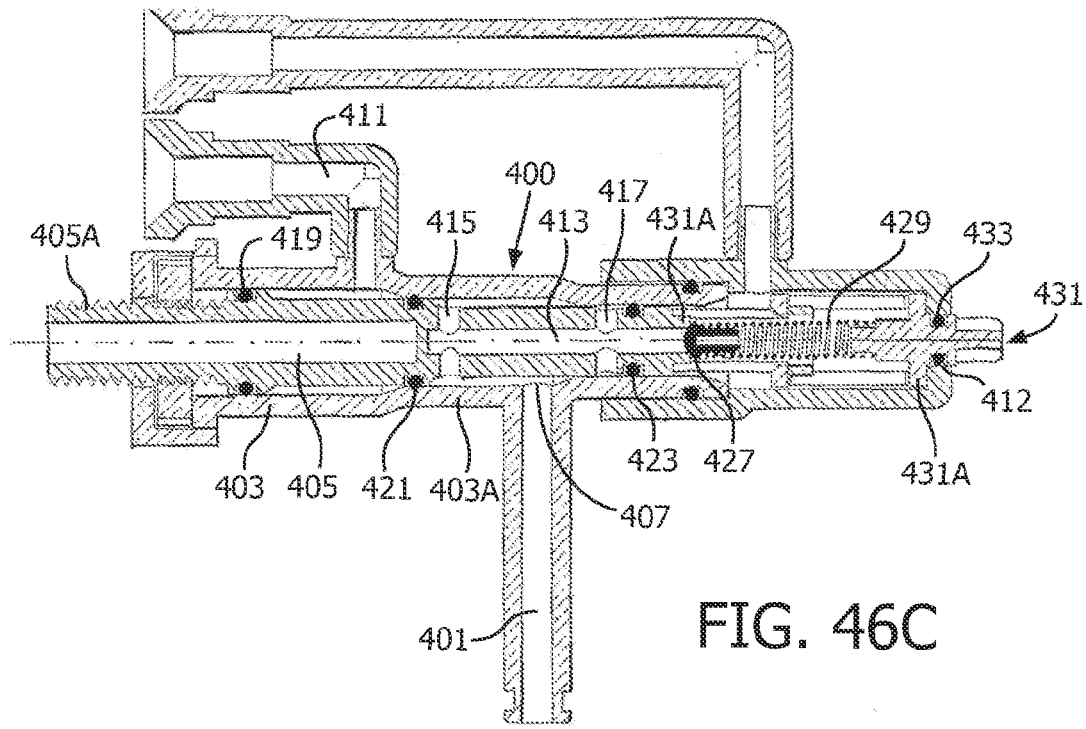

In FIG. 46B the slider 405 is moved slightly towards the left (in the drawings) such that the radial apertures 415 and 417 are in fluid communication with the duct 401 and the inner cavity 413 of the slider 405. The spring 429 is slightly less compressed than in FIG. 46A. Water flows through the brewing chamber and coffee thus brewed flows through duct 401, radial openings 415, 417, axial cavity 413 and outlet port 409 when the counter-pressure at the exit of the brewing chamber, i.e. in the duct 401, reaches a value defined by the force exerted by spring 429, i.e. when the pressure generates on the shutter 427 a force higher than the force exerted by the spring 429.

In FIG. 46C the slider 405 is again moved slightly more towards the left (in the drawings) with respect to FIG. 46B, such that the spring 429 is less compressed and therefore the counter-pressure at which the coffee flows through the duct 401 is less than in FIG. 46B (but higher than in FIG. 46A, where no counter-pressure is required). Both in FIGS. 46B and 46C the relief duct 411 and the air-inlet port 412 are closed.

Thus, the position of FIG. 46A is the one in which regular coffee is brewed, at substantially no counter-pressure, such that a lighter beverage with no cream is obtained. A stronger or lighter espresso coffee is obtained with the valve 400 adjusted in the position of FIG. 46B and 46C respectively.

The position of the slider 405 can be manually or automatically selected by the user. In some embodiments this can be achieved by a screw mechanism or the like. In some preferred embodiments selection of the counter-pressure can be achieved with a servo-actuator, under the command of the user via a suitable user interface, such as a touch screen, one or more buttons or the like. Preferably the position of the counter-pressure valve 400 can be correlated to the volume of the brewing chamber such that the most appropriate brewing-chamber volume is selected for each counter-pressure set by the user on the valve 400.

Figure 46D:
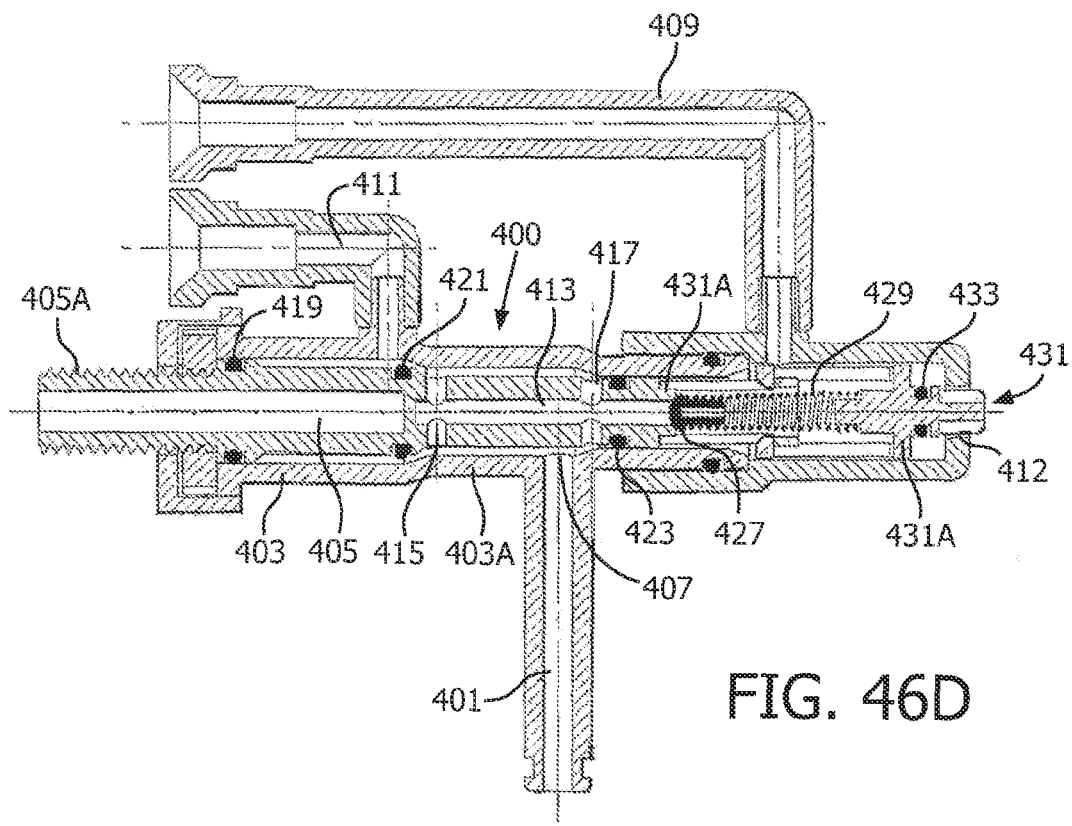

At the end of a brewing cycle, irrespective of which position was taken by the slider 405 of the valve 400, the slider is moved in the position of FIG. 46D, i.e. entirely moved to the left side (in the drawings). In this position the air-intake port 412 is open and an air flow passage is created through the interior of the housing portion 403B, the axial cavity 413 of slider 405, the radial apertures 415 and relief port 411. In this manner the pressure inside the brewing chamber is relieved and air enters the hydraulic circuit of the brewing unit, allowing opening of the brewing chamber.

Embodiment of FIGS. 47-50

FIGS. 47-50 show a further embodiment of the brewing unit according to the invention. This embodiment is similar to that shown in FIGS. 19-35, but the fixed cam profiles are differently shaped in order to achieve a slightly different sequence in the movement of the brewing unit. The main difference is that in the embodiment of FIGS. 47-50 the position on which the spent coffee powder is discharged from the brewing chamber is on the opposite side of the discharging position in the previously described embodiments (FIGS. 19-35 in particular) with respect to the coffee-charging position.

Since the brewing unit according to FIGS. 47-50 is substantially similar to the previous embodiments in many respects, mainly the features differing from the previous embodiments will be described here below, while those features which are similar, identical or equivalent to those of the previous embodiments will not be described in greater detail. It should further be noted that the brewing unit according to FIGS. 47-50 can be provided with any one of the previously described counter-pressure regulating valves.

Figure 47:
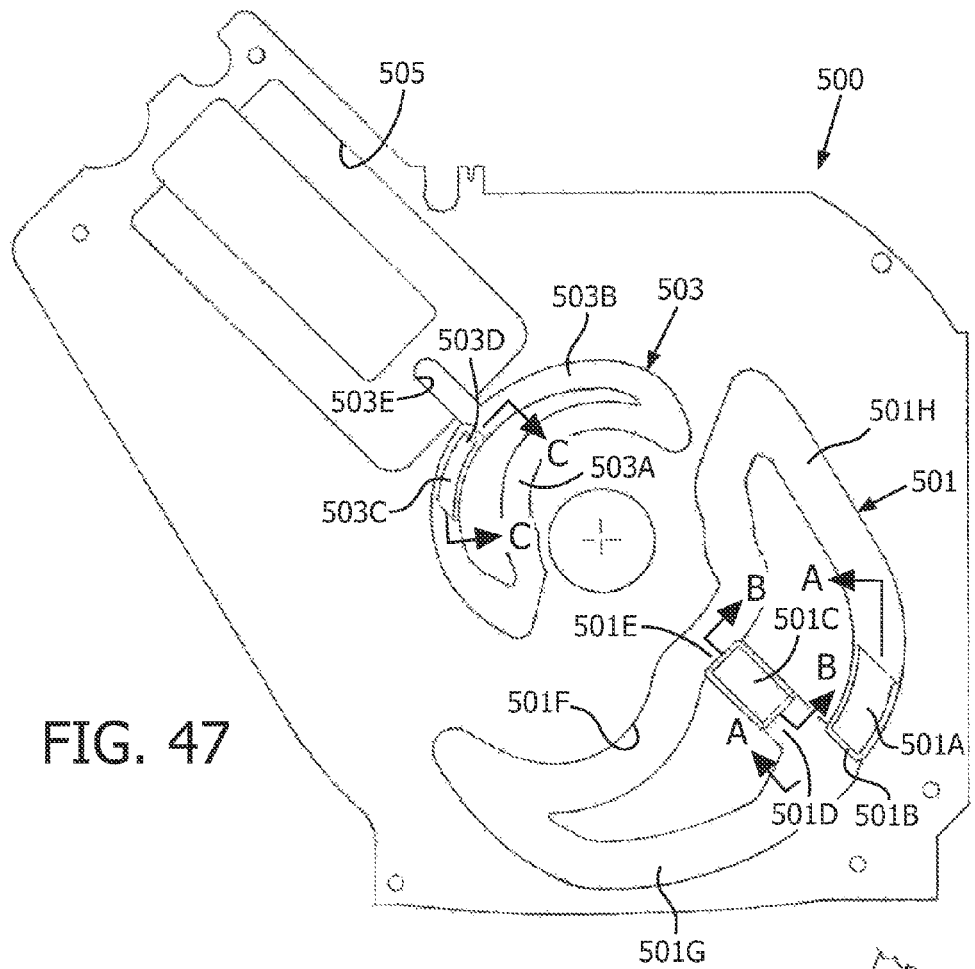
FIG. 47 shows a front view of one of two fixed plates on which fixed cam profiles of a further embodiment of the unit according to the invention are provided.

In the embodiment of FIGS. 47-50 the brewing unit is again comprised of a pair of fixed plates, on which three fixed cam profiles are provided, each fixed plate being combined with a rotating cam, on which rotating cam profiles are arranged. FIG. 47 shows a front view of one of the fixed plates, designated 500. The opposite fixed plate is substantially symmetrical, at least as far as the cam profiles, to be described herein after, are concerned.

The fixed plate is provided with three fixed cam profiles 501, 503 and 505, having functions much the same as those of fixed cams 121, 123 and 125 of FIGS. 19-35. More specifically, the cam profile 501 controls the movement of the piston of the brewing chamber, the cam profile 503 controls the movement of the seat into which the piston of the brewing chamber slides and the cam profile 505 controls the movement of the counter-piston. In this embodiment, however, the cam profiles 501 and 503 are mainly shaped as closed channels, i.e. endless curves wherein the corresponding tappet or pin slides.

Figures 47A, 47B, 47C:
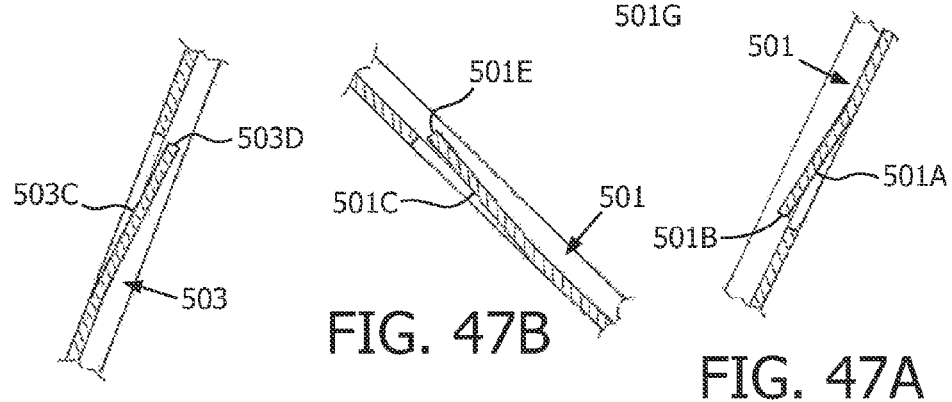
FIGS. 47A, 47B, 47C show local cross sections according to lines A-A, B-B and C-C of FIG. 47.

Moreover, each of said cam profiles 501 and 503 have spring tongues which project inside the channels in order to prevent some movements of the tappets or pins which are solid to the piston and the seat of the brewing chamber. More specifically the cam profile 501 has a first tongue in the shape of a laminar spring 501A with a free end 501B projecting inside the channel defining the cam profile 501. The shape of said elastic or spring tongue 501A is best shown in the cross-section of FIG. 47A. As will be more clearly explained later on, the elastic tongue 501A limits the motion of the pin, which controls the movement of the piston. A second elastic tongue in the shape of a laminar spring 501C is arranged along a central channel portion 501D of the cam profile 501. The tongue 501C has a free end 501E and its shape is best shown in the cross-section of FIG. 47B. The central channel portion 501D connects a lower cam channel portion to an upper cam channel portion of cam profile 501. The upper channel portion is designated 501F as a whole and has a substantially outwardly concave shape. The lower channel portion has a substantially outwardly convex shape and is comprised of two sections 501G and 501H, the elastic tongue 501A being arranged such that the pin sliding in the channel 501 is prevented from moving from section 501G to section 501H and it is forced to move from section 501G into the intermediate cam portion 501D.

Figure 48:
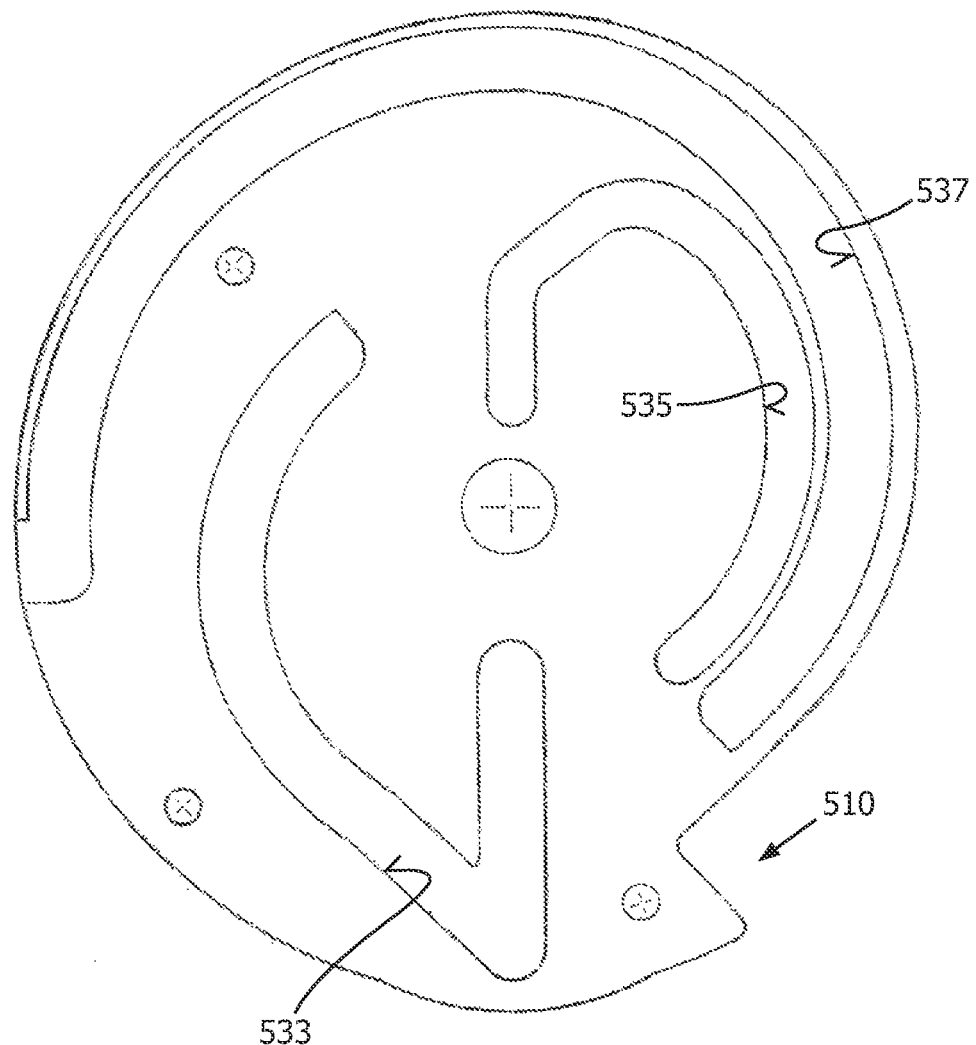
FIG. 48 shows a front view of one of the two rotating cams with respective rotating cam profiles corresponding to the fixed profiles of FIG. 47.

Similarly, the fixed cam profile 503 has a lower cam profile section 503A having a shape with a concavity facing outwardly and oriented towards the center axis A-A of the brewing unit, around which the rotating cams 510 rotates under the control of a motor (not shown). The closed path of the cam profile 503 is completed by an outwardly convex-shaped upper profile section or portion 503B along which a tongue 503C in the shape of a laminar spring is arranged. The free end 503D of said tongue projects inside the channel-shaped cam profile 503, as best shown in the cross-section of FIG. 47C. A substantially rectilinear cam-profile section 503E extends from the section 503B towards the cam profile 505, starting from a position substantially corresponding to the free end of the tongue 503C. The tongue 503C prevents the respective tappet or pin, moving along the cam profile 503, from moving along the section 503B from the right to the left beyond the rectilinear portion 503D and forces said pinto enter said rectilinear portion 503D of the cam profile, as will be explained in more detail later on FIG. 48 shows a front view of one of the two rotating cams on which the rotating cam profiles are provided. The rotating cam is designated 510. Three rotating cam profiles are formed on said rotating cam. Said rotating cam profiles are labelled 533, 535 and 537 and have substantially the same shape and function as the cam profiles 133, 135, 137 of FIGS. 26, 28. Therefore a detailed description of said cam profiles will not be provided.

Similar to the embodiment of FIGS. 19-35, also in the embodiment of FIGS. 47-50 the brewing unit includes (see in particular FIGS. 49A-49D) a rotating and translating piston 543, similar to piston 113, said piston being housed in a rotating and translating seat 545, corresponding to seat 115, and a counter-piston 547, corresponding to counter-piston 117. A pin or tappet 543B, corresponding to pin 113B, is solid to the piston 543, said pin forming a feeler engaging the fixed cam profiles 501 of the two opposite fixed plates 500 and the two rotating cam profiles 533 of the rotating cams 510. Similarly, the seat 545 is provided with opposite pins or feelers 545A, engaging the two opposite fixed cam profiles 503 and the two rotating cam profiles 535. The counter-piston 547 is engaged to the fixed earn profiles 505 and has tappets or feelers 547C engaging the rotating cam profiles 537.

Figure 49A:
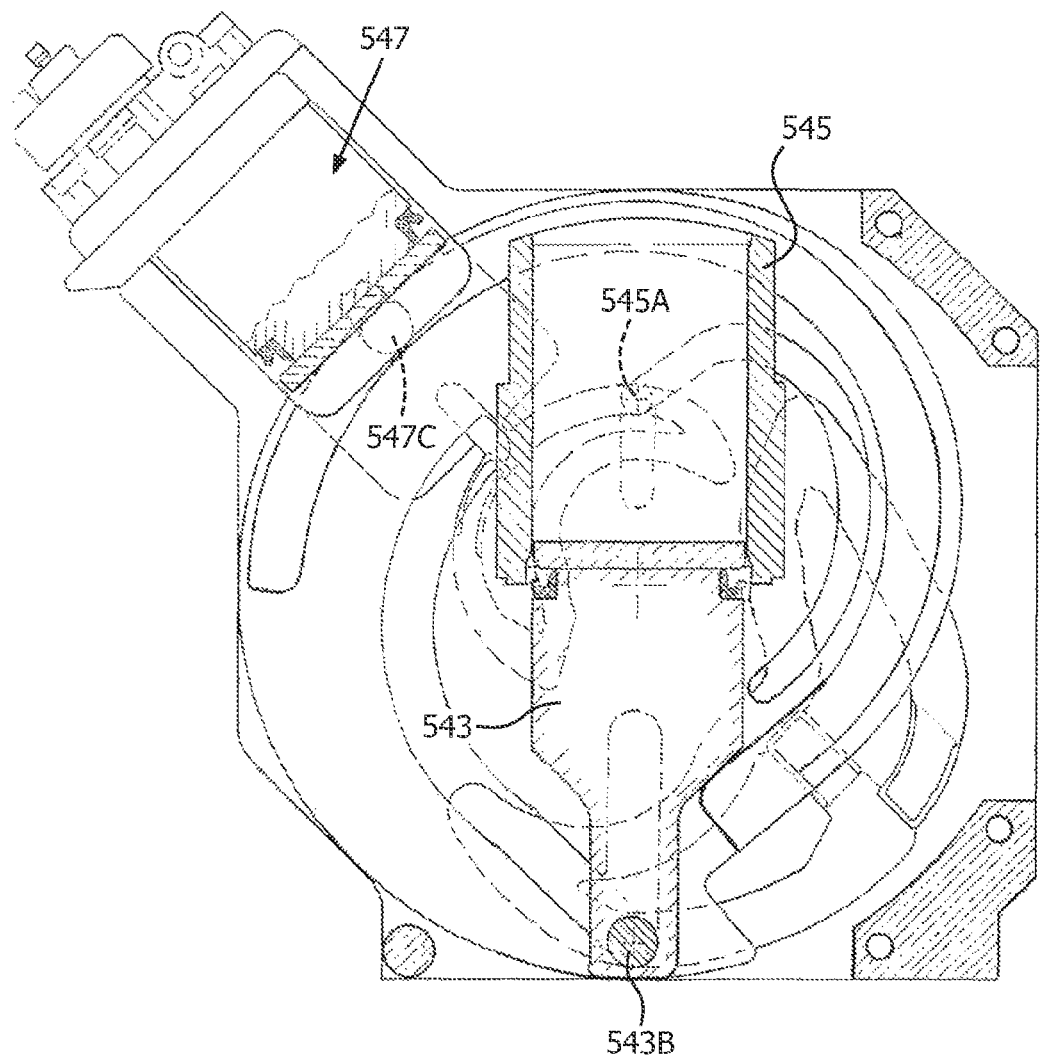
FIGS. 49A-49D show cross sections of the unit including the fixed and rotating cam profiles of FIGS. 47-48 in different angular positions.
Figure 49B:
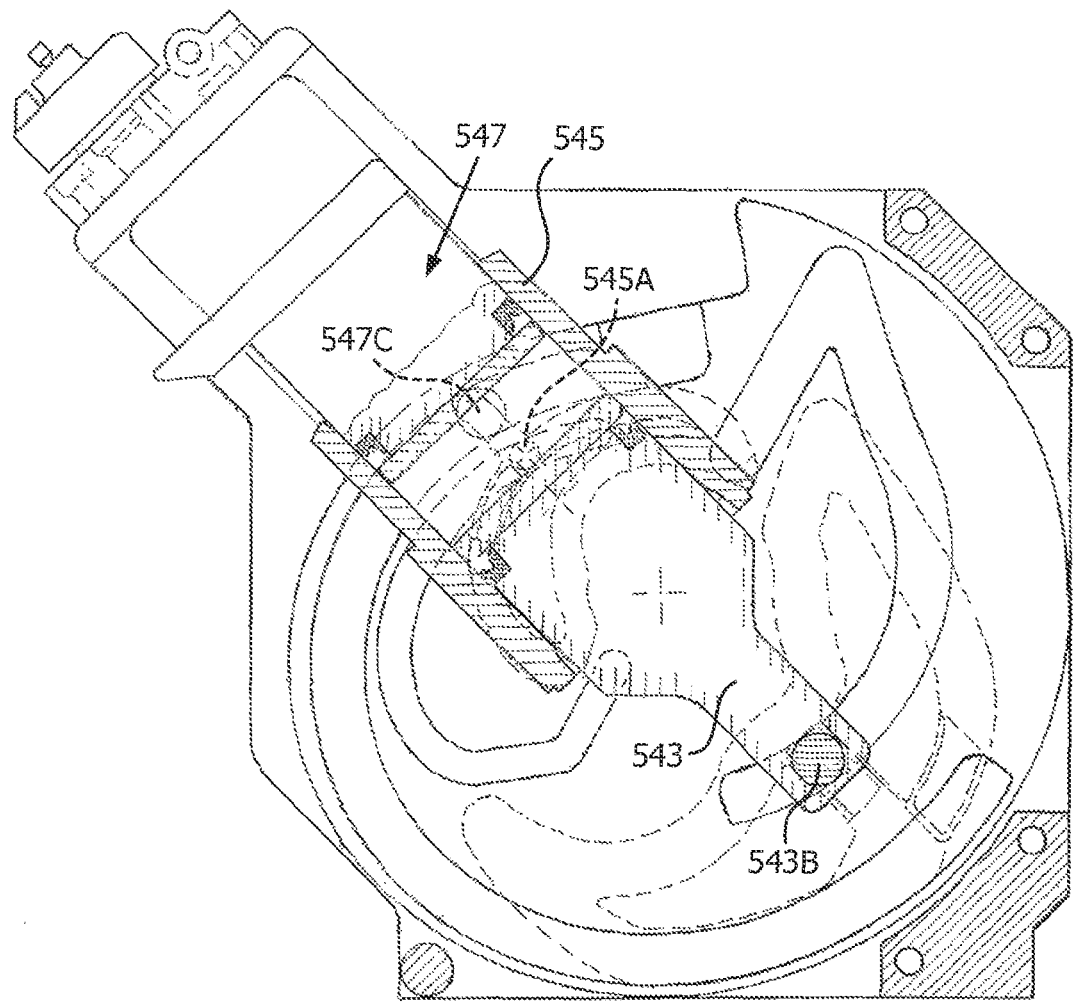
Figure 49C:
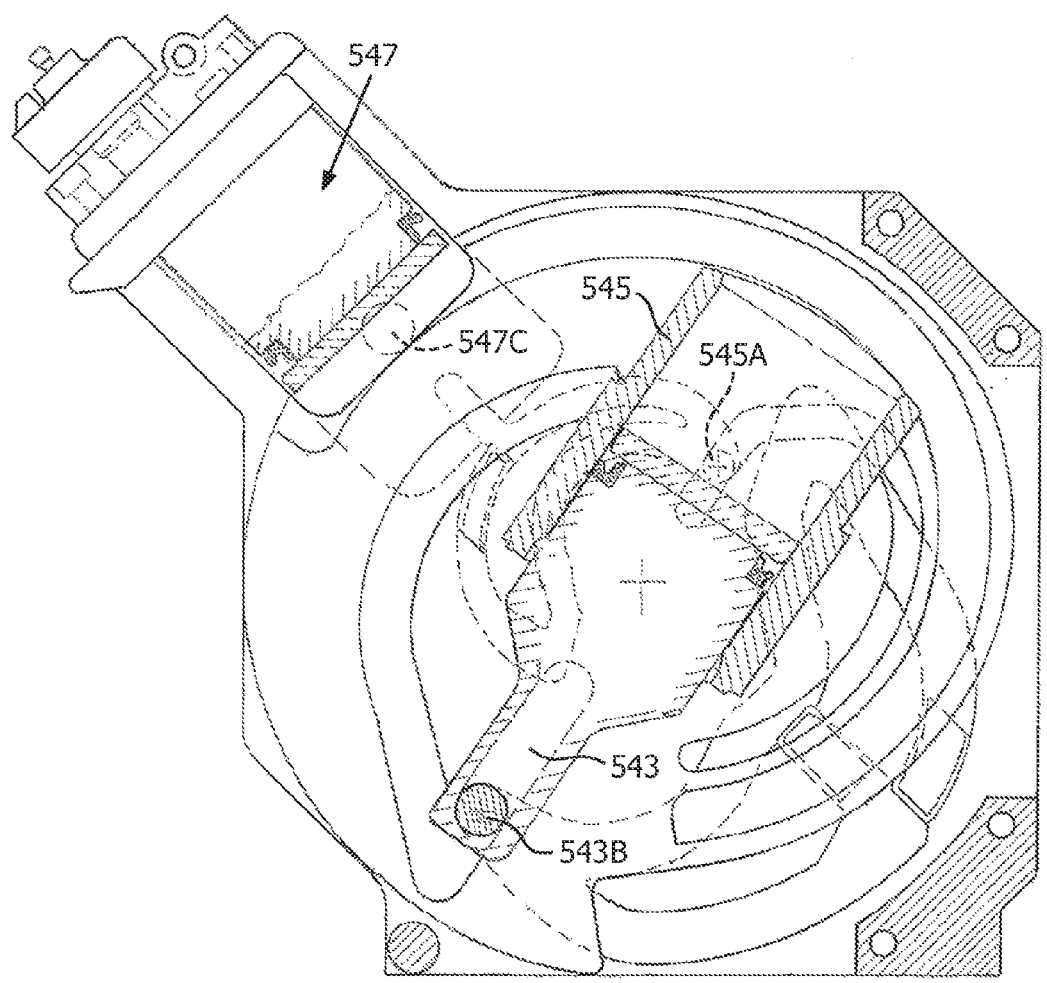
Figure 49D:
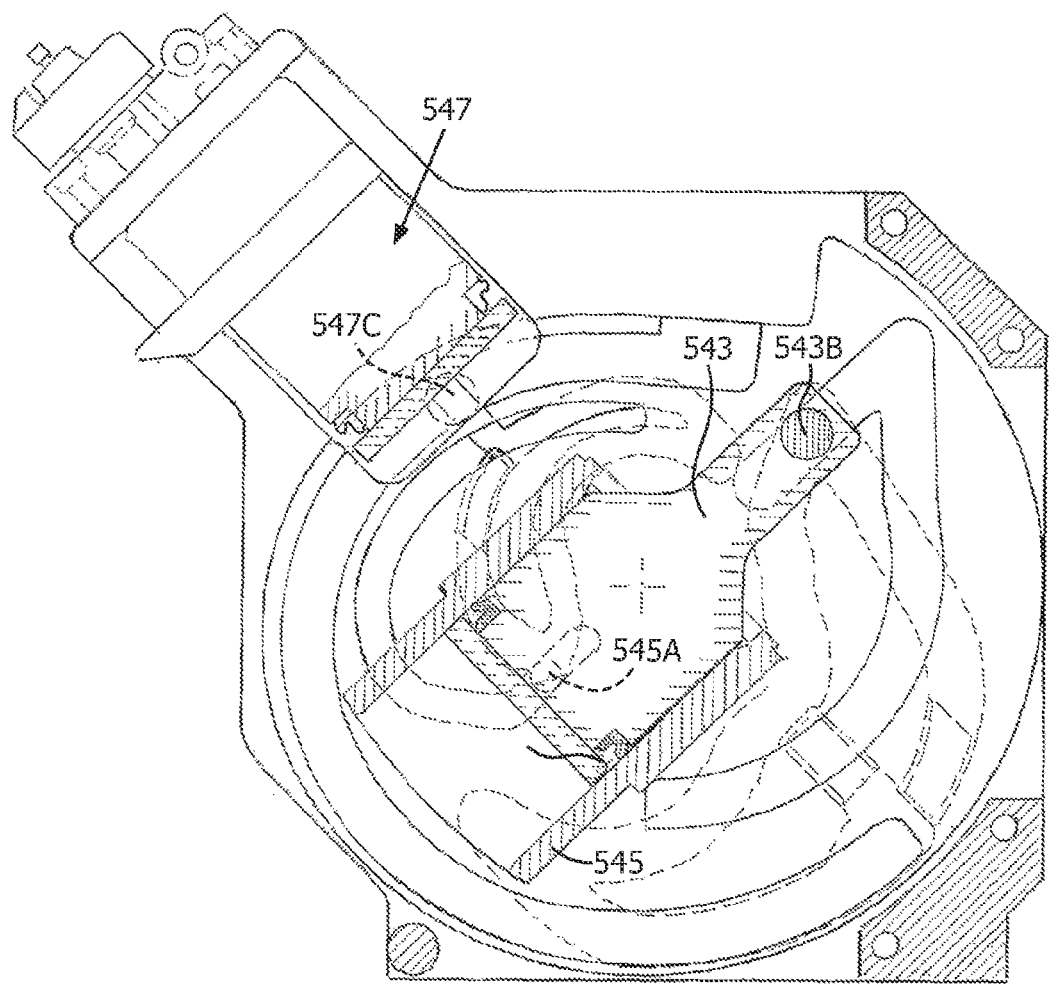
Figure 50:
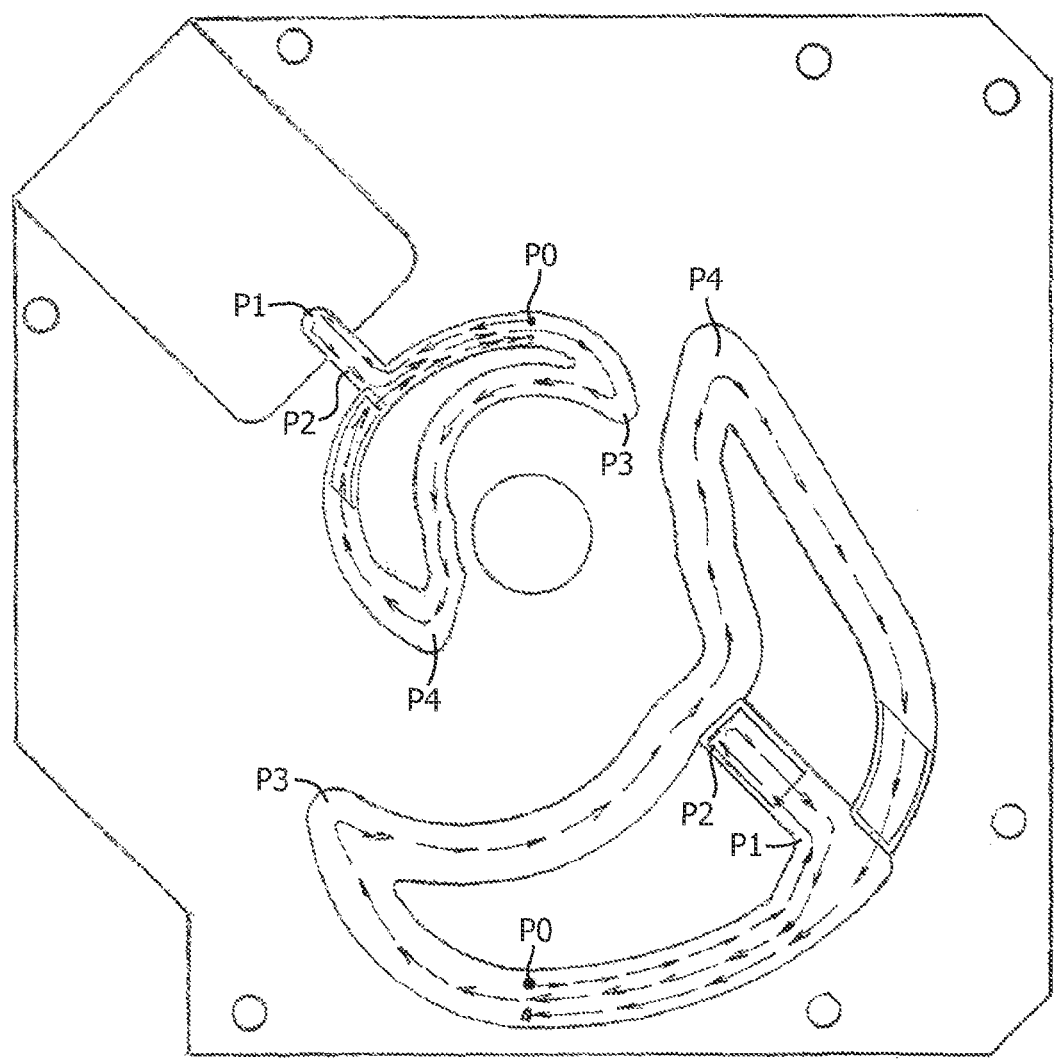
FIG. 50 shows the trajectory of the pins driving the piston and the seat along the respective cams of FIG. 47

The operation of the brewing unit thus described will now be discussed in more detail, reference being made to the sequence of FIGS. 49A-49D and to the diagram of FIG. 50, showing the moving trajectory of pins 543B and 545A.

In FIG. 49A the brewing unit is in the charging position. The seat 545 is in a substantially vertical position and the piston 543 is in the lower position inside the seat, closing the bottom thereof. The desired quantity of coffee powder is charged in the seat 545 from a dispensing duct, not shown. The pins 543B are located in position P0 along section 501G of the cam 501. The pins 545A solid to the seat 545 are in position P0 along the section 503B of cam 503.

Once the coffee has been charged in the seat of the brewing chamber, the seat 545 and the piston 543 are moved by rotating the cams 510 towards the brewing position, shown in FIG. 49B. The brewing position varies according to the quality of coffee or number of coffees required, as already described earlier. Points P1 on cam section 501D indicates for example the position of the pins 543B in when filter coffee is brewed, point P1 on cam section 503E being the corresponding position of the pins 545A. P2 on cam section 501D indicates possible positions of pins 543B when a single or a double espresso is brewed, the corresponding positions of pins 545A being represented by point P2 along section 503E of cam 503.

The brewing position is selected by properly rotating the cams 510 and the corresponding rotating cam profiles. Due to the shape of the intermediate cam portions or sections 501D and 503E, the piston 543 and the seat 545 move rectilinearly along their axes which, in the brewing position, are coincident with the axis of counter-piston 547. The latter is forcedly moved with a corresponding rectilinear trajectory by fixed cam profiles 505 and rotating cam profiles 537. The pins 543B are prevented from moving along the cam portion or cam section 501H by the elastic tongue 501A, while the pins 545A are prevented to move along the cam section or cam portion 503C by the elastic tongue 503C.

Once brewing has been completed, the spent coffee powder must be discharged. In order to achieve the discharging position, the piston 543 and seat 545 are first moved towards and beyond the charging position, into an intermediate position shown in FIG. 49C. This movement is necessary to transfer the pins 543B from the lower cam portion 501G to the upper cam portion 501F and to transfer the pins 545A from the upper cam portion 503B to the lower cam portion 503A. In FIG. 50 the positions of the pins 543B and 545A in the relevant cams 501 and 503 corresponding to the brewing chamber position of FIG. 49B are shown at P3.

Once the position of FIG. 49B has been reached, the rotation of plates 510 and of the respective rotating cams is reversed, and the pins 543B, 545B start moving along the upper portion or section 501F of cam 501 and the lower portion or section 503A of cam 503 respectively, until the final discharge position of FIG. 49D is achieved. The elastic tongue 501C in each cam profile 501 prevents the respective pin 543B from entering the intermediate section 501D of the cam and forces it to follow the upper section 501F. In the discharge position of FIG. 49D the seat 545 is oriented towards a spent-coffee collecting chute or the like (not shown) and the piston 543 is moved towards the opening of the seat to push the coffee outside said seat. The position of the pins 543B and 545A in the respective cam profiles when the brewing unit is in the discharge position of FIG. 49D are shown at P4 in FIG. 50.

From the discharge position the brewing unit is brought in the charging position again (FIG. 49A) by reversing the rotation of the rotating cams 510.

In FIG. 50 arrows connecting the various points P1-P4 show the motion of the pins.

It is understood that the drawings merely show non-limiting embodiment of the invention, which can vary as regards forms and arrangements without thereby departing from the scope of the idea underlying the invention. The possible presence of reference numbers in the annexed claims has the purpose of facilitating reading thereof with reference to the description and to the drawings, and in no way limits the scope of protection represented by the claims.

The invention claimed is:

1. A brewing unit for the preparation of a beverage, comprising:
    a piston;
    a seat having a rotation movement and being configured to slideably receive the piston for sliding movement of the piston;
    a counter-piston cooperating with said seat and said piston to define a brewing chamber, the brewing chamber being defined when the counter-piston, the seat and the piston are axially aligned; and
    cam members for controlling movements of said seat, said piston, and said counter-piston,
    wherein said seat, said piston and said counter-piston can assume, with respect to one another, at least one charging position for charging a product for the preparation of the beverage, at least two distinct brewing positions corresponding to two different volumes of the brewing chamber, and a discharging position for discharging a spent product, and
    wherein the cam members comprise fixed cam profiles fixed to a supporting structure and moveable cam profiles moveable with respect to the supporting structure.

2. The brewing unit according to claim 1, wherein said seat is constrained to a rotating unit configured to rotate by a rotation around a rotation axis supported by the supporting structure, wherein said cam members are fixed with respect to said supporting structure, and
    wherein said cam members comprise:
        a first cam cooperating with said piston for controlling the sliding movement of said piston in said seat, the rotation of the rotating unit causing sliding, along said first cam, of a feeler that is fixed with respect to the piston; and
        a second cam fixed with respect to said supporting structure and cooperating with said counter-piston, said second cam controlling the movement of said counter-piston in said seat, said counter-piston being provided with a feeler, which slides along said second cam.

3. The brewing unit according to claim 2, wherein said rotating unit comprises driving members cooperating with said counter-piston.

4. The brewing unit according to claim 3, wherein said driving members are arranged to drive said counter-piston via said rotating unit from a waiting position to the brewing positions, and to drive back said counter-piston from the brewing positions into the waiting position while the rotating unit shifts into the discharging position for discharging the spent product.

5. The brewing unit according to claim 3, wherein said driving members comprise two opposed appendages, fixed with respect to the rotating unit and projecting from a substantially circular edge of said rotating unit, and wherein each of said two opposed appendages has a substantially rectilinear first edge, the two substantially rectilinear edges of the two opposed appendages facing one another and defining surfaces for engagement and driving of the counter-piston in opposite directions, said two opposed appendages having extensions in a radial direction that are different from one another, and one appendage of the two opposed appendages, that is set further back with respect to a direction of rotation of the rotating unit from the charging position to the brewing positions, being radially more extended than the other.

6. The brewing unit according to claim 5, wherein each of said two opposed appendages has a second convex curvilinear edge.

7. The brewing unit according to claim 2, wherein said first cam and said second cam are provided on at least one of two opposed plates defining the supporting structure.

8. The brewing unit according to claim 7, wherein said first cam and said second cam are provided both on a same one of the two opposed plates.

9. The brewing unit according to claim 7, comprising two sets of each of said first cam and said second cam, each comprising two substantially equal grooves, provided on the two opposed plates.

10. The brewing unit according to claim 2, wherein said piston has a pin substantially orthogonal to an axis of said seat in which the piston slides, guided in a substantially rectilinear slot provided in a wall of said rotating unit and developing in a direction substantially parallel to the axis of said seat.

11. The brewing unit according to claim 10, wherein said pin constitutes a feeler for said first cam.

12. The brewing unit according to claim 2, wherein said counter-piston is fixed with respect to a transverse pin cooperating with driving members fixed with respect to said rotating unit.

13. The brewing unit according to claim 12, wherein said transverse pin, which is fixed with respect to the counter-piston, constitutes a feeler cooperating with said second cam.

14. The brewing unit according to claim 2, wherein said counter-piston is driven in movement by said rotating unit, the feeler of the counter-piston sliding along said second cam when the counter-piston is driven by said rotating unit, and wherein a single motor causing the rotation of the rotating unit and the movements of the piston and of the counter-piston.

15. The brewing unit according to claim 2, wherein said rotating unit has a substantially cylindrical shape, coaxial to the rotation axis of the rotating unit.

16. The brewing unit according to claim 1, wherein said cam members comprise a first set of cam profiles, which are fixed with respect to the supporting structure, and a second set of cam profiles, which rotate with respect to said supporting structure, for controlling the movements of said seat, said piston, and said counter-piston.

17. The brewing unit according to claim 16, comprising a pair of fixed plates forming the supporting structure, each fixed plate having a set of cam profiles, fixed with respect to one another, which are substantially mirror-symmetrical, and a pair of rotating cams, set alongside said pair of fixed plates, each rotating cam having a set of rotating cam profiles, which are substantially mirror-symmetrical with respect to one another, and wherein said seat, said piston, and said counter-piston are arranged between said pair of fixed plates.

18. The brewing unit according to claim 17, wherein said pair of rotating cams are supported by said pair of fixed plates.

19. The brewing unit according to claim 17, wherein said pair of rotating cams are set within said pair of fixed plates.

20. The brewing unit according to claim 16, wherein: said seat comprises a first feeler cooperating with a first fixed cam profile and a first rotating cam profile; said piston comprises a second feeler cooperating with a second fixed cam profile and a second rotating cam profile; said counter-piston comprises a third feeler cooperating with a third fixed cam profile and a third rotating cam profile; and movement of said second set of cam profiles with respect to the first set of cam profiles controlling movements of rotation and translation of the piston, the seat, and the counter-piston.

21. The brewing unit according to claim 20, wherein said first set of cam profiles and said second set of cam profiles are configured to control: a first movement of rotation of the seat and of the piston from the charging position for charging the product to a position of alignment with the counter-piston; a second movement of mutual translation of said piston, seat, and counter-piston, along a common axis of translation, said second movement bringing the piston, the seat, and the counter-piston into the brewing positions, to which the different volumes of the brewing chamber correspond, delimited by said piston, said counter-piston, and said seat; and a third movement of rotation, in a direction opposite to the first movement of rotation, and of mutual translation of said seat and said piston, to bring said seat and said piston into the discharging position for discharging of the spent product.

22. The brewing unit according to claim 16, wherein said second set of cam profiles are provided on a common rotating cam.

23. The brewing unit according to claim 16, wherein said piston, said seat, and said counter-piston are provided with respective feelers, each of which cooperating with at least one of the first set of cam profiles and one of the second set of cam profiles.

24. The brewing unit according to claim 16, wherein shapes of said first and said second set of cam profiles are at least one of grooves and channels.

25. The brewing unit according to claim 16, wherein said piston and said seat have movements of rotation and of translation and said counter-piston has a movement of translation with respect to a fixed load-bearing structure.

26. The brewing unit according to claim 16, wherein: said seat and said piston have a movement of rotation about a first common rotation axis and a movement of translation along a second common translation axis, substantially orthogonal to the first common rotation axis; said second common translation axis turns about the first common rotation axis to assume a plurality of angular positions; and said counter-piston has a movement of translation to be inserted in said seat when said seat has assumed an angular position of alignment with said counter-piston.

27. The brewing unit according to claim 16, wherein said first set of cam profiles include a first cam profile for controlling the sliding movement of the piston and a second cam profile for controlling the rotation movement of the seat, said first cam profile and said second cam profile comprising channels in a shape of closed curves and moving prevention members, the moving prevention members preventing a movement of corresponding feelers associated to said piston and said seat in predetermined positions along said first cam profile and said second cam profile.

28. The brewing unit according to claim 1, wherein said piston has an elastically loaded cap, the elastically loaded cap being pushed by an elastic member to move away from a body of the piston when a product for the preparation of the beverage is in the brewing chamber, and said elastically loaded cap being pushed against the body of the piston.

29. The brewing unit according to claim 28, wherein said elastically loaded cap is fixed with respect to a stem, which, moving as a single piece with the elastically loaded cap, provides a hot water supplying port for supplying hot water in connection alternatively with the brewing chamber and with at least one port for communication with an outside of the brewing unit.

30. The brewing unit according to claim 29, comprising sliders that close the connection between the hot water supplying port and said at least one port for communication with the outside when the brewing chamber is in at least one brewing position of the at least two brewing positions.

31. The brewing unit according to claim 1, wherein said cam members are configured to discharge on the supporting structure a part of stresses exerted on the piston and on the counter-piston in the brewing positions, wherein the stresses are exerted from a pressure inside the brewing chamber, and wherein a shape of the cams supply a force of reaction to the pressure inside the brewing chamber.

32. The brewing unit according to claim 1, further comprising three brewing positions of said seat, said piston and said counter-piston, corresponding to three distinct volumes of the brewing chamber.

33. The brewing unit according to claim 1, wherein said counter-piston is mobile for being inserted and sliding in said seat.

34. The brewing unit according to claim 1, wherein said seat is supported between two opposed plates defining the supporting structure.

35. The brewing unit according to claim 1, further comprising a discharging surface for discharging the spent product when said piston and said seat are in the discharging position.

36. The brewing unit according to claim 1, wherein a pressure-regulator valve is arranged on an outlet pipe for outlet of the beverage from the brewing chamber, the outlet pipe being provided in a body of the counter-piston and fluidly connecting an interior of the brewing chamber with the pressure-regulator valve.

37. The brewing unit according to claim 1, further comprising a brewing chamber-preheating position being an intermediate position between the charging position and the brewing positions,
wherein the counter-piston, the seat and the piston are axially aligned,
wherein the piston is partially slidably received in the seat,
wherein a seal surrounding a body of the piston does not seal a surface between the piston and an internal cylindrical surface of the seat leaving a discharging aperture between the piston and the seat, and
wherein hot water flows through the discharging aperture and along the piston without entering the brewing chamber.

38. The brewing unit according to claim 1, further comprising a first beverage dispensing port and a second beverage dispensing port, said first and second beverage dispensing ports being in fluid communication with said brewing chamber when said brewing unit is in the brewing positions, wherein said first beverage dispensing port comprises a sealing arrangement and said second beverage dispensing port comprises a counter-pressure valve, wherein in a first brewing position said sealing arrangement is open for dispensing said beverage through said first beverage dispensing port, wherein in a second brewing position said sealing arrangement is closed for preventing beverage from flowing through said first beverage dispensing port, and wherein in the second brewing position the beverage flows through said second dispensing port and said counter-pressure valve.

39. The brewing unit according to claim 1, further comprising an adjustable counter-pressure valve in fluid communication with an interior of said brewing chamber and comprising a slider slidingly arranged in a housing, said housing comprising a beverage inlet and outlet ports and a pressure relieve port, wherein said slider is movable into any one of the at least two distinct brewing positions, each of the at least two distinct of brewing positions corresponding to a different counter-pressure in said brewing chamber.

40. An automatic machine for the production of beverages including a brewing unit, the brewing unit comprising:
a piston;
a seat having a rotation movement and being configured to slideably receive the piston for sliding movement of the piston;
a counter-piston cooperating with said seat and said piston to define a brewing chamber, the brewing chamber being defined when the counter-piston, the seat and the piston are axially aligned; and
cam members for controlling movements of said seat, said piston, and said counter-piston,
wherein said seat, said piston and said counter-piston can assume, with respect to one another, at least one charging position for charging a product for the preparation of the beverage, at least two distinct brewing positions corresponding to two different volumes of the brewing chamber, and a discharging position for discharging a spent product, and
wherein the cam members comprise fixed cam profiles fixed to a supporting structure and moveable cam profiles moveable with respect to the supporting structure.

* * * * *